US006417915B1

(12) United States Patent
Suzuki et al.

(10) Patent No.: US 6,417,915 B1
(45) Date of Patent: Jul. 9, 2002

(54) SYSTEM FOR RUPTURING MICROCAPSULES FILLED WITH A DYE

(75) Inventors: Minoru Suzuki, Tochigi; Hiroshi Orita; Hiroyuki Saito, both of Saitama; Katsuyoshi Suzuki; Koichi Furusawa, both of Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/122,087

(22) Filed: Jul. 24, 1998

(30) Foreign Application Priority Data

| | | |
|---|---|---|
| Jul. 25, 1997 | (JP) | 9-215779 |
| Oct. 7, 1997 | (JP) | 9-290356 |
| Apr. 15, 1998 | (JP) | 10-104579 |

(51) Int. Cl.[7] ........ G03B 27/00; B41J 2/315

(52) U.S. Cl. ........ 355/400; 355/405; 355/406; 400/120.1

(58) Field of Search ........ 355/400, 406, 355/405, 27, 37; 396/583, 32; 430/138, 203, 253; 400/120.01

(56) References Cited

U.S. PATENT DOCUMENTS 4,151,397 A 4/1979 Boor, Jr. et al.

(List continued on next page.)

FOREIGN PATENT DOCUMENTS

| | | |
|---|---|---|
| EP | 0184132 | 6/1986 |
| EP | 0219130 | 4/1987 |
| EP | 0331890 | 9/1989 |
| FR | 2601467 | 1/1988 |
| GB | 2189895 | 11/1987 |
| GB | 2193687 | 2/1988 |
| GB | 2293576 | 4/1996 |
| GB | 2294907 | 5/1996 |
| JP | 61137787 | 6/1986 |
| JP | 62174195 | 7/1987 |
| JP | 1202496 | 8/1987 |
| JP | 62191194 | 8/1987 |
| JP | 1110979 | 4/1989 |
| JP | 4-4960 | 1/1992 |

OTHER PUBLICATIONS

English Language Translation of Japanese Unexamined Patent Publication (KOKAI) No. HEI 1-110979 (A) to Seiko Epson Corporation, entitled "Thermal Transfer Recording Medium", published Apr. 27, 1989.

*Primary Examiner*—David M. Gray
*Assistant Examiner*—Peter B. Kim
(74) *Attorney, Agent, or Firm*—Greenblum & Bernstein, P.L.C.

(57) ABSTRACT

In an image-forming system, an image-forming substrate is used, which has a sheet of paper, and a layer of microcapsules coated over the sheet of paper. The layer of microcapsules includes at least one type of microcapsules filled with an ink. A shell wall of each microcapsule is formed of resin, which exhibits a temperature/pressure characteristic such that each of the microcapsules is squashed under a predetermined pressure when being heated to a predetermined temperature, thereby discharging the dye out of the shell wall. A printer, having a roller platen and a thermal head, forms an image on the substrate. The platen locally exerts the pressure on the microcapsule layer. The thermal head selectively heats a localized area of the microcapsule layer, on which the pressure is exerted by the platen, to a temperature in accordance with an image-information data, such that the microcapsules in the microcapsule layer are selectively squashed and an image on the microcapsule layer.

48 Claims, 42 Drawing Sheets

U.S. PATENT DOCUMENTS 4,399,209 A 8/1983 Sanders et al.
4,440,846 A 4/1984 Sanders et al.
4,644,376 A 2/1987 Usami et al.
4,844,632 A 7/1989 Minowa
4,879,566 A 11/1989 Hanabusa
4,981,834 A 1/1991 Sakojiri et al.
5,005,028 A 4/1991 Tamura et al.
5,015,552 A 5/1991 Tamura et al.
5,104,767 A 4/1992 Nakamura
5,246,811 A * 9/1993 Higuchi ...................... 430/138
5,555,009 A 9/1996 Hevenor et al.
5,573,885 A * 11/1996 Inui et al. ................... 430/138
5,712,066 A 1/1998 Yoshinaga et al.
5,884,114 A * 3/1999 Iwasaki ...................... 355/406
6,109,800 A * 8/2000 Suzuki et al. .......... 400/120.02
6,161,971 A * 12/2000 Suzuki et al. .......... 400/120.01

* cited by examiner

FIG.31

| IMAGE-PIXEL SIGNALS | CONTROL SIGNAL |
|---|---|
| CS=0<br>MS=0<br>YS=1 | DAY(H) |
| CS=1<br>MS=0<br>YS=1 | DAY(H) |
| CS=0<br>MS=1<br>YS=1 | DAY(H) |
| CS=1<br>MS=1<br>YS=1 | DAB(H) |
| CS=0<br>MS=0<br>YS=0 | DAY(L) &DAB(L) |
| CS=1<br>MS=0<br>YS=0 | DAY(L) &DAB(L) |
| CS=0<br>MS=1<br>YS=0 | DAY(L) &DAB(L) |
| CS=1<br>MS=1<br>YS=0 | DAY(L) &DAB(L) |

FIG.48

| IMAGE-PIXEL SIGNALS CS, MS, YS | CONTROL SIGNAL DA1 TO DA4 | 3-BIT SIGNAL $DVB_n$ | HIGH-FREQUENCY VOLTAGE |
|---|---|---|---|
| CS=0 MS=0 YS=0 | LOW-LEVEL (WHITE) | $DVB_n$ [000] | $f_{v0}$ (NO OUTPUT) |
| CS=1 MS=0 YS=0 | DA1 (CYAN) | $DVB_n$ [100] | $f_{v4}$ |
| CS=0 MS=1 YS=0 | DA2 (MAGENTA) | $DVB_n$ [011] | $f_{v3}$ |
| CS=1 MS=1 YS=0 | DA2 (BLUE) | $DVB_n$ [100] | $f_{v4}$ |
| CS=0 MS=0 YS=1 | DA3 (YELLOW) | $DVB_n$ [010] | $f_{v2}$ |
| CS=0 MS=1 YS=1 | DA3 (RED) | $DVB_n$ [011] | $f_{v3}$ |
| CS=1 MS=0 YS=1 | DA4 (GREEN) | $DVB_n$ [001] | $f_{v1}$ |
| CS=1 MS=1 YS=1 | DA4 (BLACK) | $DVB_n$ [100] | $f_{v4}$ |

SYSTEM FOR RUPTURING MICROCAPSULES FILLED WITH A DYE

BACKGROUND OF THE INVENTION

1. Field of the Invention

The present invention relates to an image-forming system for forming an image on an image-forming substrate, coated with a layer of microcapsules filled with dye or ink, by selectively breaking or squashing the microcapsules in the layer of microcapsules. Further, the present invention relates to such an image-forming substrate and an image-forming apparatus, which forms an image on the image-forming substrate, used in the image-forming system.

2. Description of the Related Art

An image-forming system per se is known, and uses an image-forming substrate coated with a layer of microcapsules filled with dye or ink, on which an image is formed by selectively breaking or squashing microcapsules in the layer of microcapsules.

For example, in a conventional image-forming system using an image-forming substrate coated with a layer of microcapsules in which a shell of each microcapsule is formed from a photo-setting resin, an optical image is formed as a latent image on the layer of microcapsules by exposing it with light rays in accordance with image-pixel signals. Then, the latent image is developed by exerting a pressure on the layer of microcapsules. Namely, the microcapsules, which are not exposed to the light rays, are broken and squashed, whereby dye or ink seeps out of the broken and squashed microcapsules, and thus the latent image is visually developed by the seepage of dye or ink.

Of course, in this conventional image-forming system, each of the image-forming substrates must be packed so as to be protected from being exposed to light, resulting in wastage materials. Further, the image-forming substrates must be handled such that they are not subjected to excess pressure due to the softness of unexposed microcapsules, resulting in an undesired seepage of dye or ink.

Also, a color-image-forming system, using an image-forming substrate coated with a layer of microcapsules filled with different color dyes or inks, is known. In this system, the respective different colors are selectively developed on an image-forming substrate by applying specific temperatures to the layer of color microcapsules. Nevertheless, it is necessary to fix a developed color by irradiation, using a light of a specific wavelength. Accordingly, this color-image-forming system is costly, because an additional irradiation apparatus for the fixing of a developed color is needed, and electric power consumption is increased due to the additional irradiation apparatus. Also, since a heating process for the color development and an irradiation process for the fixing of a developed color must be carried out with respect to each color, this hinders a quick formation of a color image on the color-image-forming substrate.

SUMMARY OF THE INVENTION

Therefore, an object of the present invention is to provide an image-forming system, using an image-forming substrate coated with a layer of microcapsules filled with dye or ink, in which an image can be quickly formed on the image-forming substrate at a low cost, without producing a large amount of waste material.

Another object of the present invention is to provide an image-forming substrate used in the image-forming system.

Yet another object of the present invention is to provide an image-forming apparatus used in the image-forming system.

In accordance with an aspect of the present invention, there is provided an image-forming system comprising an image-forming substrate that includes a base member, and a layer of microcapsules, coated over the base member, containing at least one type of microcapsules filled with a dye. A shell of wall of each of the microcapsules is formed of resin that exhibits a temperature/pressure characteristic such that, when each of the microcapsules is squashed under a predetermined pressure at a predetermined temperature, discharge of the dye from the squashed microcapsule occurs. The system further comprises an image-forming apparatus that forms an image on the image-forming substrate, and the image-forming apparatus includes a pressure applicator that locally exerts the predetermined pressure oh the layer of microcapsules, and a thermal heater that selectively heats a localized area of the layer of microcapsules, on which the predetermined pressure is exerted by the pressure applicator, to the predetermined temperature in accordance with an image-information data, such that the microcapsules in the layer of microcapsules are selectively squashed, and an image is produced on the layer of microcapsules.

In accordance with another aspect of the present invention, there is provided an image-forming system comprising an image-forming substrate that includes a base member, and a layer of microcapsules, coated over the base member, containing at least one type of microcapsules filled with a dye. A shell of wall of each of the microcapsules is formed of resin that exhibits a temperature/pressure characteristic such that, when each of the microcapsules is squashed under a predetermined pressure at a predetermined temperature, discharge of the dye from the squashed microcapsule occurs. The system further comprises an image-forming apparatus that forms an image on the image-forming substrate, and the image-forming apparatus includes an array of piezoelectric elements laterally aligned with each other with respect to a path along which the image-forming substrate passes. Each of the piezoelectric elements selectively generates an alternating pressure when being electrically energized by a high-frequency voltage, and the alternating pressure has an effective pressure value that corresponds to the predetermined pressure. The apparatus further includes a platen member that is in contact with the array of piezoelectric elements, and an array of heater elements provided on the respective piezoelectric elements included in the array of piezoelectric elements, each of the heater element being selectively heatable to the predetermined temperature.

In accordance with yet an aspect of the present invention, there is provided an image-forming system comprising an image-forming substrate that includes a base member, and a layer of microcapsules, coated over the base member, containing at least one type of microcapsules filled with a dye. A shell of wall of each of the microcapsules is formed of resin that exhibits a temperature/pressure characteristic such that, when each of the microcapsules is squashed under a predetermined pressure at a predetermined temperature, discharge of the dye from the squashed microcapsule occurs. The system further comprises an image-forming apparatus that forms an image on the image-forming substrate, and the image-forming apparatus includes a platen member laterally provided with respect to a path along which the image-forming substrate passes, a carriage that carries a thermal head, movable along the platen member, a resilient biasing unit incorporated in the carriage to press the thermal head against the platen member with the predetermined pressure, and a resilient biasing unit incorporated in the carriage to press the thermal head against the platen member with the predetermined pressure. The thermal head selectively heats a localized area of the layer of microcapsules, on which the predetermined pressure is exerted by the resilient biasing unit, to the predetermined temperature in accordance with an image information data, such that the microcapsules included in the layer of microcapsules are selectively squashed and an image is produced on the layer of microcapsules.

In accordance with still yet an aspect of the present invention, there is provided an image-forming substrate comprising a base member, and a layer of microcapsules, coated over the base member, containing at least one type of microcapsules filled with a dye, wherein a shell of wall of each of the microcapsules is formed of resin that exhibits a temperature/pressure characteristic such that, when each of the microcapsules is squashed under a predetermined pressure at a predetermined temperature, discharge of the dye from the squashed microcapsule occurs.

Preferably, the layer of microcapsules is covered with a sheet of protective transparent film. The base member may comprise a sheet of paper. Optionally, the base member comprises a sheet of film, and a peeling layer is interposed between the sheet of film and the layer of microcapsules.

The resin of the shell wall may be a shape memory resin, which exhibits a glass-transition temperature corresponding to the predetermined temperature. Also, the shell wall, formed of the shape memory resin, may be porous, whereby an amount of dye to be discharged from the shell wall is adjustable by regulating the predetermined pressure.

Also, the shell wall of the microcapsules may comprise a double-shell wall. In this case, One shell wall element of the double-shell wall is formed of a shape memory resin, and the other shell wall element thereof is formed of a resin, not exhibiting a shape memory characteristic, such that the temperature/pressure characteristic is a resultant temperature/pressure characteristic of both the shell wall elements.

Further, the shell wall of the microcapsules may comprise a composite-shell wall including at least two shell wall elements formed of different types of resin, not exhibiting a shape memory characteristic, such that the temperature/pressure characteristic is a resultant temperature/pressure characteristic of the shell wall elements.

The layer of microcapsules may include a first type of microcapsules filled with a first dye and a second type of microcapsules filled with a second dye. A first shell wall of each of the first type of microcapsules is formed of a first resin that exhibits a first temperature/pressure characteristic such that, when the shell wall is squashed under a first pressure at a first temperature, discharge of the first dye from the squashed microcapsule occurs. A second shell wall of each of the second type of microcapsules is formed of a second resin that exhibits a second temperature/pressure characteristic such that, when the shell wall is squashed under a second pressure at a second temperature, discharge of the second dye from the squashed microcapsule occurs. Preferably, the first temperature is lower than the second temperature, and the first pressure is higher than the second pressure.

Also, the layer of microcapsules may include a first type of microcapsules filled with a first dye, a second type of microcapsules filled with a second dye, and a third type of microcapsules filled with a third dye. A first shell wall of each of the first type of microcapsules is formed of a first resin that exhibits a first temperature/pressure characteristic such that, when the shell wall is squashed under a first pressure at a first temperature, discharge of the first dye from the squashed microcapsule occurs. A second shell wall of each of the second type of microcapsules is formed of a second resin that exhibits a second temperature/pressure characteristic such that, when the shell wall is squashed under a second pressure at a second temperature, discharge of the second dye from the squashed microcapsule occurs. A third shell wall of each of the third type of microcapsules is formed of a third resin that exhibits a third temperature/pressure characteristic such that, when the shell wall is squashed under a third pressure at a third temperature, discharge of the third dye from the squashed microcapsule occurs. Preferably, the first, second and third temperatures are low, medium and high, respectively, and the first, second and third pressure are high, medium and low, respectively.

Preferably, the first, second, and third dyes exhibit three-primary colors, for example, cyan, magenta and yellow, respectively. In this case, the layer of microcapsules may further include a fourth type of microcapsules filled with a black dye. A fourth shell wall of each of the fourth type of microcapsules may be formed of a resin that exhibits a temperature characteristic such that the fourth shell wall plastified at a fourth temperature which is higher than the first, second and third temperatures. Optionally, the fourth shell wall may be formed of another resin that exhibits a pressure characteristic such that the fourth shell wall is physically squashed under a fourth pressure which is higher than the first, second and third pressures.

Furthermore, the present invention is directed to various image-forming apparatuses, one of which is constituted so as to produce an image on any one of the above-mentioned image-forming substrates, as stated in detail hereinafter.

BRIEF DESCRIPTION OF THE DRAWINGS

These object and other objects of the present invention will be better understood from the following description, with reference to the accompanying drawings in which:

FIG. 31 is a table showing a relationship between digital cyan, magenta and yellow image-pixel signals, inputted to the control signal generator of FIG. 30, and two kinds of control signals, outputted from the control signal generator of FIG. 30;

FIG. 48 is a table showing a relationship between three-primary color digital image-pixel signals, inputted to a control signal generator of FIG. 47, and four kinds of control signals, outputted from the control signal generator, and a relationship between the three-primary color digital image-pixel signals, inputted to a 3-bit control signal generator of FIG. 47; five kinds of 3-bit control signals, outputted from the 3-bit control signal generator and inputted to the high-frequency voltage power source; and five kinds of high-frequency voltages, outputted from the high-frequency voltage power source;

DESCRIPTION OF THE PREFERRED EMBODIMENTS

Figure 1:
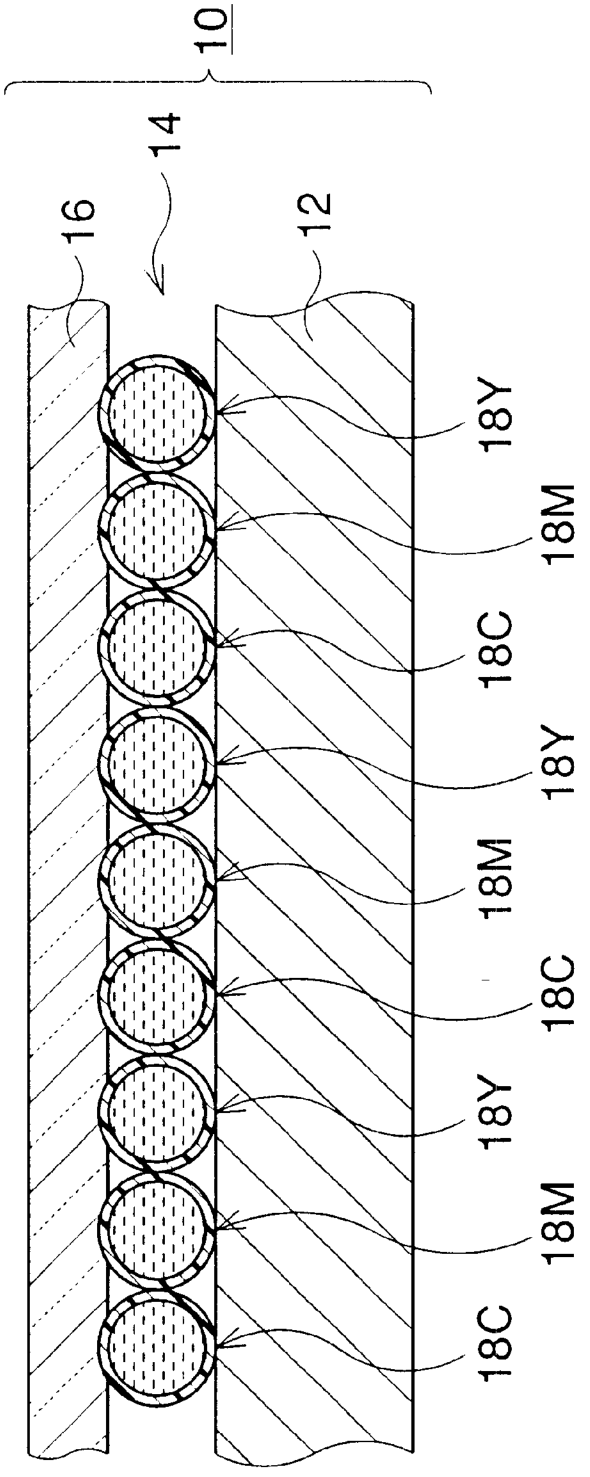
FIG. 1 is a schematic conceptual cross sectional view showing a first embodiment of an image-forming substrate, according to the present invention, comprising a layer of microcapsules including a first type of cyan microcapsules filled with a cyan ink, a second type of magenta microcapsules filled with a magenta ink and a third type of yellow microcapsules filled with a yellow ink.

FIG. 1 shows a first embodiment of an image-forming substrate, generally indicated by reference 10, which is used in an image-forming system according to the present invention. In this first embodiment, the image-forming substrate 10 is produced in a form of paper sheet. In particular, the image-forming substrate 10 comprises a sheet of paper 12, a layer of microcapsules 14 coated over a surface of the sheet of paper 12, and a sheet of protective transparent film 16 covering the layer of microcapsules 14.

In the first embodiment, the layer of microcapsules 14 is formed from three types of microcapsules: a first type of microcapsules 18C filled with cyan liquid dye or ink, a second type of microcapsules 18M filled with magenta liquid dye or ink, and a third type of microcapsules 18Y filled with yellow liquid dye or ink, and these microcapsules 18C, 18M and 18Y are uniformly distributed in the layer of microcapsules 14. In each type of microcapsule (18C, 18M, 18Y), a shell of a microcapsule is formed of a synthetic resin material, usually colored white. Also, each type of microcapsule (18C, 18M, 18Y) may be produced by a well-known polymerization method, such as interfacial polymerization, in-situ polymerization or the like, and may have an average diameter of several microns, for example, 5$\mu$.

Note, when the sheet of paper 12 is colored with a single color pigment, the resin material of the microcapsules 18C, 18M and 18Y may be colored by the same single color pigment.

For the uniform formation of the layer of microcapsules 14, for example, the same amounts of cyan, magenta and yellow microcapsules 18C, 18M and 18Y are homogeneously mixed with a suitable binder solution to form a suspension, and the sheet of paper 12 is coated with the binder solution, containing the suspension of microcapsules 18C, 18M and 18Y, by using an atomizer. In FIG. 1, for the convenience of illustration, although the layer of microcapsules 14 is shown as having a thickness corresponding to the diameter of the microcapsules 18C, 18M and 18Y, in reality, the three types of microcapsules 18C, 18M and 18Y overlay each other, and thus the layer of microcapsules 14 has a larger thickness than the diameter of a single microcapsule 18C, 18M or 18Y.

In the first embodiment of the image-forming substrate 10, for the resin material of each type of microcapsule (18C, 18M, 18Y), a shape memory resin is utilized. For example, the shape memory resin is represented by a polyurethane-based-resin, such as polynorbornene, trans-1, 4-polyisoprene polyurethane. As other types of shape memory resin, a polyimide-based resin, a polyamide-based resin, a polyvinylchloride-based resin, a polyester-based resin and so on are also known.

Figure 2:
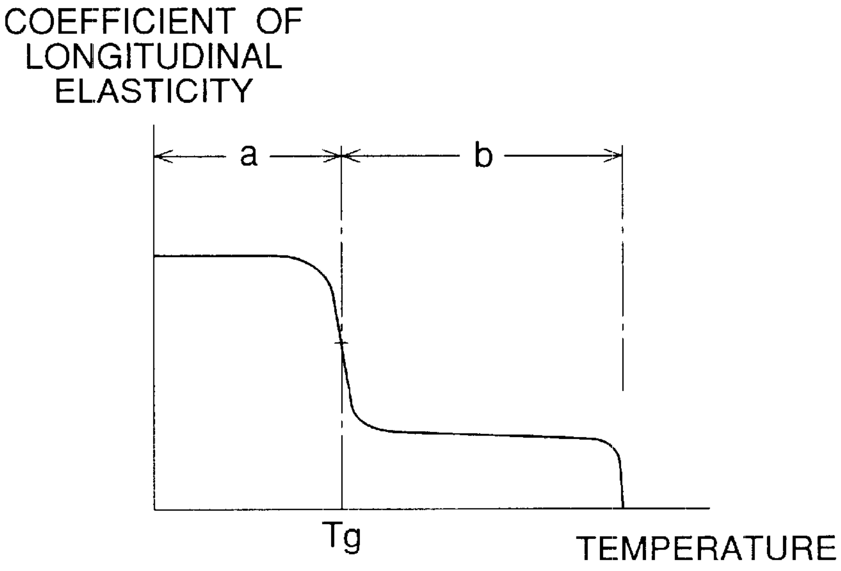
FIG. 2 is a graph showing a characteristic curve of a longitudinal elasticity coefficient of a shape memory resin.

In general, as shown in a graph of FIG. 2, the shape memory resin exhibits a coefficient of longitudinal elasticity, which abruptly changes at a glass-transition temperature boundary $T_g$. In the shape memory resin, Brownian movement of the molecular chains is stopped in a low-temperature area "a", which is less than the glass-transition temperature $T_g$, and thus the shape memory resin exhibits a glass-like phase. On the other hand, Brownian movement of the molecular chains becomes increasingly energetic in a high-temperature area "b", which is higher than the glass-transition temperature $T_g$, and thus the shape memory resin exhibits a rubber elasticity.

The shape memory resin is named due to the following shape memory characteristic: after a mass of the shape memory resin is worked into a shaped article in the low-temperature area "a", when such a shaped article is heated over the glass-transition temperature $T_g$, the article becomes freely deformable. After the shaped article is deformed into another shape, when the deformed article is cooled to below the glass-transition temperature $T_g$, the other shape of the article is fixed and maintained. Nevertheless, when the deformed article is again heated to above the glass-transition temperature $T_g$, without being subjected to any load or external force, the deformed article returns to the original shape.

In the image-forming substrate or sheet 10 according to this invention, the shape memory characteristic per se is not utilized, but the characteristic abrupt change of the shape memory resin in the longitudinal elasticity coefficient is utilized, such that the three types of microcapsules 18C, 18M and 18Y can be selectively broken and squashed at different temperatures and under different pressures, respectively.

Figure 3:
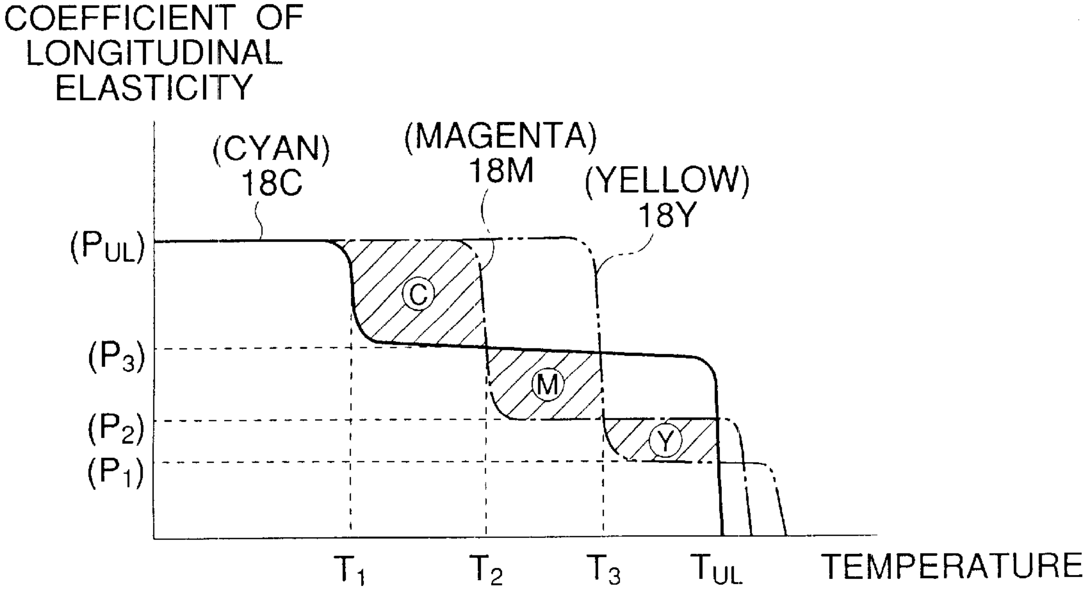
FIG. 3 is a graph showing temperature/pressure breaking characteristics of the respective cyan, magenta and yellow microcapsules shown in FIG. 1, with each of a cyan-producing area, a magenta-producing area and a yellow-producing area being indicated as a hatched area.

As shown in a graph of FIG. 3, a shape memory resin of the cyan microcapsules 18C is prepared so as to exhibit a characteristic longitudinal elasticity coefficient having a glass-transition temperature $T_1$, indicated by a solid line; a shape memory resin of the magenta microcapsules 18M is prepared so as to exhibit a characteristic longitudinal elasticity coefficient having a glass-transition temperature $T_2$, indicated by a single-chained line; and a shape memory resin of the yellow microcapsules 18Y is prepared so as to exhibit a characteristic longitudinal elasticity coefficient, indicated by a double-chained line, having a glass-transition temperature $T_3$.

Note, by suitably varying compositions of the shape memory resin and/or by selecting a suitable one from among various types of shape memory resin, it is possible to obtain the respective shape memory resins, with the glass-transition temperatures $T_1$, $T_2$ and $T_3$.

Figure 4:
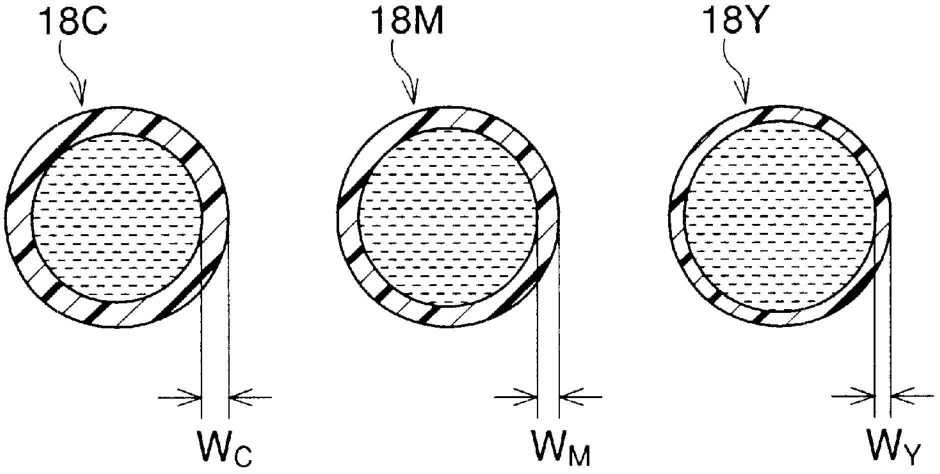
FIG. 4 is a schematic cross sectional view showing different shell wall thicknesses of the respective cyan, magenta and yellow microcapsules.

As shown in FIG. 4, the microcapsule walls $W_C$, $W_M$ and $W_Y$ of the cyan microcapsules 18C, magenta microcapsules 18M, and yellow microcapsules 18Y, respectively, have differing thicknesses. The thickness $W_C$ of cyan microcapsules 18C is larger than the thickness $W_M$ of magenta microcapsules 18M, and the thickness $W_M$ of magenta microcapsules 18M is larger than the thickness $W_Y$ of yellow microcapsules 18Y.

Also, the wall thickness $W_C$ of the cyan microcapsules 18C is selected such that each cyan microcapsule 18C is broken and compacted under a breaking pressure that lies between a critical breaking pressure $P_3$ and an upper limit pressure $P_{UL}$ (FIG. 3), when each cyan microcapsule 18C is heated to a temperature between the glass-transition temperatures $T_1$ and $T_2$; the wall thickness $W_M$ of the magenta microcapsules 18M is selected such that each magenta microcapsule 18M is broken and compacted under a breaking pressure that lies between a critical breaking pressure $P_2$ and the critical breaking pressure $P_3$ (FIG. 3), when each magenta microcapsule 18M is heated to a temperature between the glass-transition temperatures $T_2$ and $T_3$; and the wall thickness $W_Y$ of the yellow microcapsules 18Y is selected such that each yellow microcapsule 18Y is broken and compacted under a breaking pressure that lies between a critical breaking pressure $P_1$ and the critical breaking pressure $P_2$ (FIG. 3), when each yellow microcapsule 18Y is heated to a temperature between the glass-transition temperature $T_3$ and an upper limit temperature $T_{UL}$.

Note, the upper limit pressure $P_{UL}$ and the upper limit temperature $T_{UL}$ are suitably set in view of the characteristics of the used shape memory resins.

As is apparent from the foregoing, by suitably selecting a heating temperature and a breaking pressure, which should be exerted on the image-forming sheet 10, it is possible to selectively break and squash the cyan, magenta and yellow microcapsules 18C, 18M and 18Y.

Figure 5:
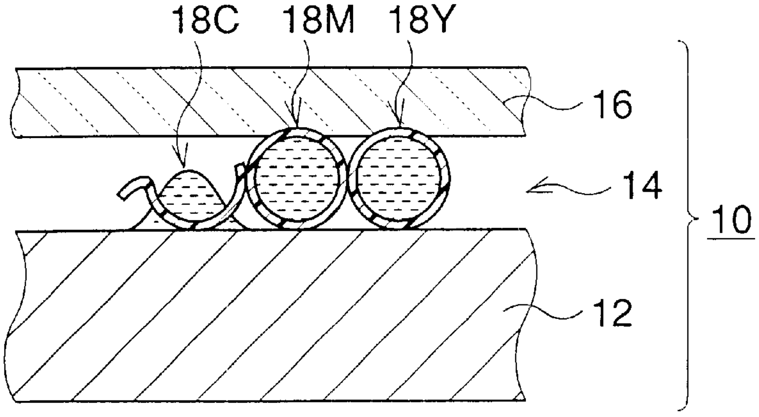
FIG. 5 is a schematic conceptual cross sectional view similar to FIG. 1, showing only a selective breakage of the cyan microcapsule in the layer of microcapsules.

For example, if the selected heating temperature and breaking pressure fall within a hatched cyan area C (FIG. 3), defined by a temperature range between the glass-transition temperatures $T_1$ and $T_2$ and by a pressure range between the critical breaking pressure $P_3$ and the upper limit pressure $P_{UL}$, only the cyan microcapsules 18C are broken and squashed, as shown in FIG. 5. Also, if the selected heating temperature and breaking pressure fall within a hatched magenta area M, defined by a temperature range between the glass-transition temperatures $T_2$ and $T_3$ and by a pressure range between the critical breaking pressures $P_2$ and $P_3$, only the magenta microcapsules 18M are broken and squashed. Further, if the selected heating temperature and breaking pressure fall within a hatched yellow area Y, defined by a temperature range between the glass-transition temperature $T_3$ and the upper limit temperature $T_{UL}$ and by a pressure range between the critical breaking pressures $P_1$ and $P_2$, only the yellow microcapsules 18Y are broken and squashed.

Accordingly, if the selection of a heating temperature and a breaking pressure, which should be exerted on the image-forming sheet 10, are suitably controlled in accordance with digital color image-pixel signals: digital cyan image-pixel signals, digital magenta image-pixel signals and digital yellow image-pixel signals, it is possible to form a color image on the image-forming sheet 10 on the basis of the digital color image-pixel signals.

Figure 6:
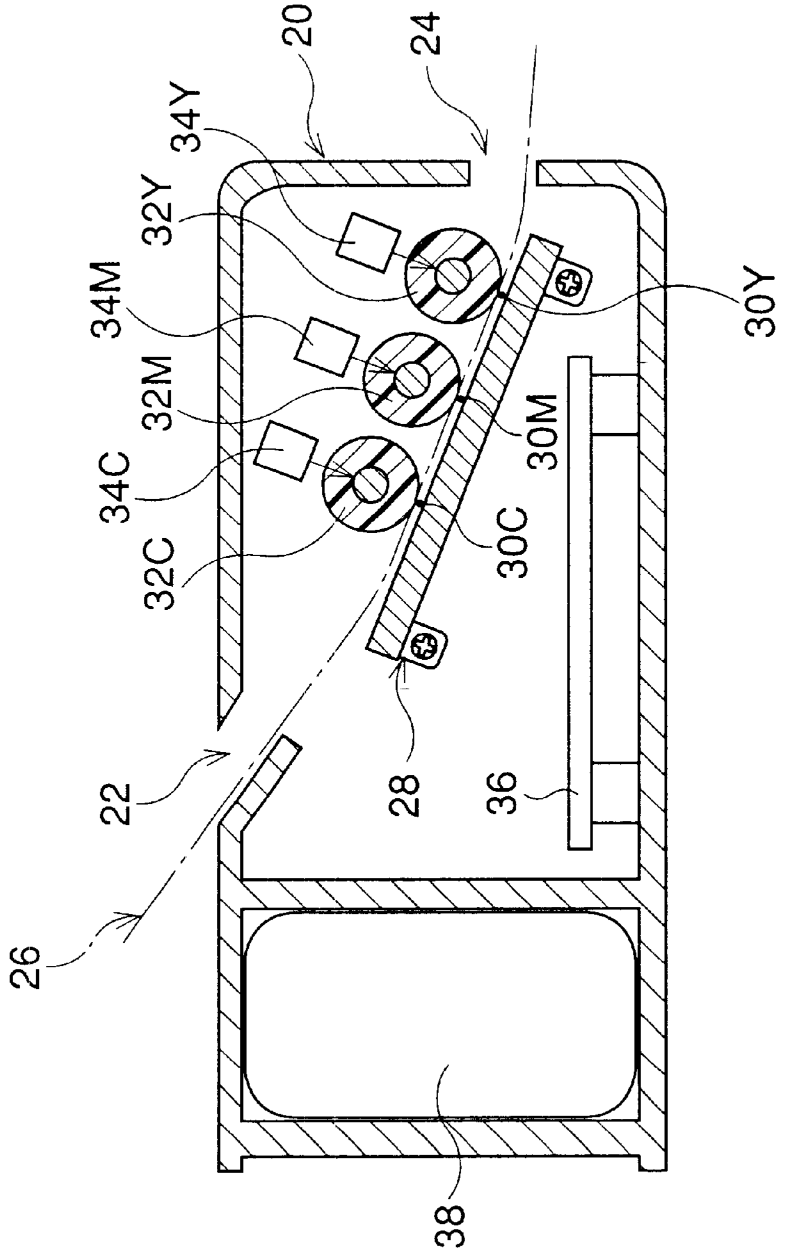
FIG. 6 is a schematic cross sectional view of a first embodiment of a color printer, according to the present invention, for forming a color image on the image-forming substrate shown in FIG. 1.

FIG. 6 schematically shows a first embodiment of a color printer according to the present invention, which is constituted as a line printer so as to form a color image on the image-forming sheet 10.

The color printer comprises a rectangular parallelopiped housing 20 having an entrance opening 22 and an exit opening 24 formed in a top wall and a side wall of the housing 20, respectively. The image-forming sheet 10 is introduced into the housing 20 through the entrance opening 22, and is then discharged from the exit opening 24 after the formation of a color image on the image-forming sheet 10. Note, in FIG. 6, a path 26 for movement of the image-forming sheet 10 is indicated by a chained line.

A guide plate 28 is provided in the housing 20 so as to define a part of the path 26 for the movement of the image-forming sheet 10, and a first thermal head 30C, a second thermal head 30M and a third thermal head 30Y are securely attached to a surface of the guide plate 28. Each thermal head (30C, 30M, 30Y) is formed as a line thermal head perpendicularly extended with respect to a direction of the movement of the image-forming sheet 10.

Figure 7:
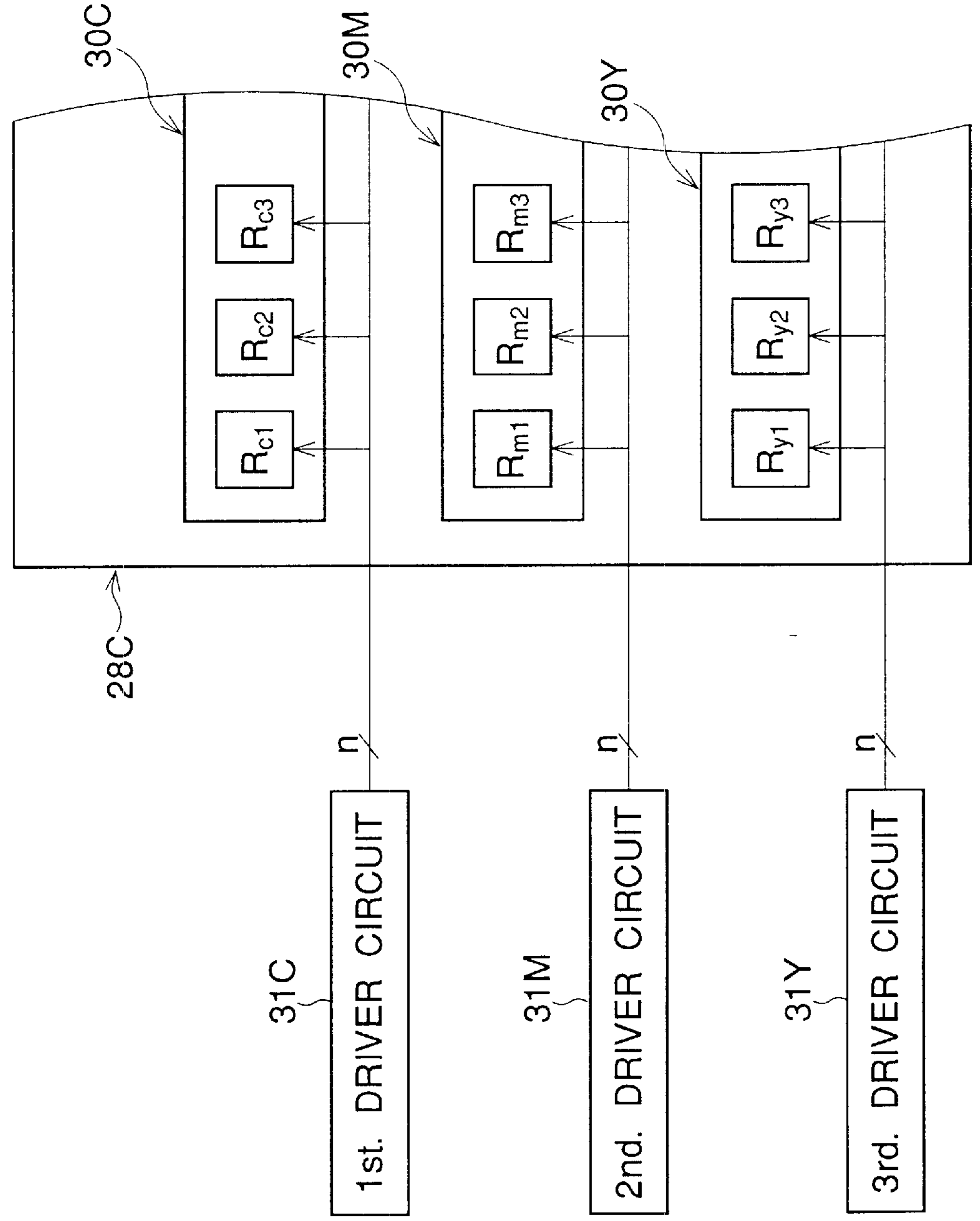
FIG. 7 is a partial schematic block diagram of three line type thermal heads and three driver circuits therefor incorporated in the color printer of FIG. 6.

As shown in FIG. 7, the line thermal head 30C includes a plurality of heater elements or electric resistance elements $R_{c1}$ to $R_{cn}$, and these resistance elements are aligned with each other along a length of the line thermal head 30C. The electric resistance elements $R_{c1}$ to $R_{cn}$ are selectively energized by a first driver circuit 31C in accordance with a single-line of cyan image-pixel signals, and are then heated to a temperature between the glass-transition temperatures $T_1$ and $T_2$.

Also, the line thermal head 30M includes a plurality of heater elements or electric resistance elements $R_{m1}$ to $R_{mn}$, and these resistance elements are aligned with each other along a length of the-line thermal head 30M. The electric resistance elements $R_{m1}$ to $R_{mn}$ are selectively energized by a second driver circuit 31M in accordance with a single-line of magenta image-pixel signals, and are then heated to a temperature between the glass-transition temperatures $T_2$ and $T_3$.

Further, the line thermal head 30Y includes a plurality of heater elements or electric resistance elements $R_{y1}$ to $R_{yn}$, and these resistance elements are aligned with each other along a length of the line thermal head 30Y. The electric resistance elements $R_{y1}$ to $R_{yn}$ are selectively energized by a third driver circuit 31M in accordance with a single-line of yellow image-pixel signals, and are heated to a temperature between the glass-transition temperature $T_3$ and the upper limit temperature $T_{UL}$.

The color printer further comprises a first roller platen 32C, a second roller platen 32M and a third roller platen 32Y associated with the first, second and third thermal heads 30C, 30M and 30Y, respectively, an d each of the roller platens 32C, 32M and 32Y may be formed of a suitable hard rubber material. The first roller platen 32C is provided with a first spring-biasing unit 34C so as to be elastically pressed against the first thermal head 30C at a pressure between the critical breaking-pressure $P_3$ and the upper limit pressure $P_{UL}$; the second roller platen 32M is provided with a second spring-biasing unit 34M so as to be elastically pressed against the second thermal head 30M at a pressure between the critical breaking-pressures $P_2$ and $P_3$; and the third roller platen 32Y is provided with a third spring-biasing unit 34M so as to be elastically pressed against the second thermal head 30M at a pressure between the critical breaking-pressures $P_1$ and $P_2$.

Note, in FIG. 6, reference 36 indicates a control circuit board for controlling a printing operation of the color printer, and reference 38 indicates an electrical main power source for electrically energizing the control circuit board 36.

Figure 8:
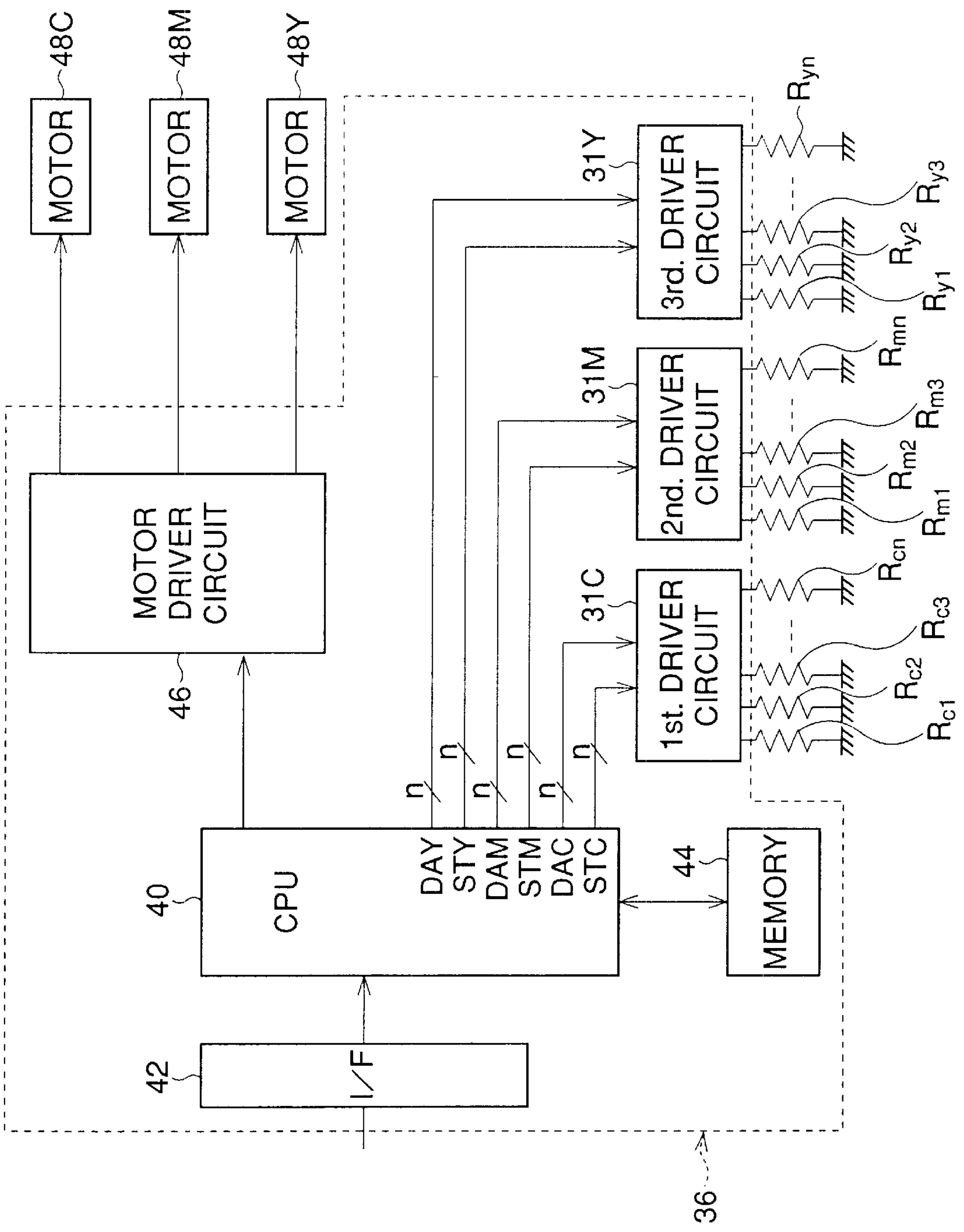
FIG. 8 is a schematic block diagram of a control board of the color printer shown in FIG. 6.

FIG. 8 shows a schematic block diagram of the control circuit board 36. As shown in this drawing, the control circuit board 36 comprises a central processing unit (CPU) 40, which receives digital color image-pixel signals from a personal computer or a ward processor (not shown) through an interface circuit (I/F) 42, and the received digital color image-pixel signals, i.e. digital cyan image-pixel signals, digital magenta image-pixel signals and digital yellow image-pixel signals, are stored in a memory 44.

Also, the control circuit board 36 is provided with a motor driver circuit 46 for driving three electric motors 48C, 48M and 48Y, which are used to rotate the roller platens 32C, 32M and 32Y, respectively. In this embodiment, each of the motors 48C, 48M and 48Y is a stepping motor, which is driven in accordance with a series of drive pulses outputted from the motor driver circuit 46, the outputting of drive pulses from the motor driver circuit 46 to the motors 48C, 48M and 48Y being controlled by the CPU 40.

During a printing operation, the respective roller platens 32C, 32M and 32Y are rotated in a counter-clockwise direction (FIG. 6) by the motors 48C, 48M and 48Y, respectively, with a same peripheral speed. Accordingly, the image-forming sheet 10, introduced through the entrance opening 22, moves toward the exit opening 24 along the path 26. Thus, the image-forming sheet 10 is subjected to pressure ranging between the critical breaking-pressure $P_3$ and the upper limit pressure $P_{UL}$ when passing between the first line thermal head 30C and the first roller platen 34C; the image-forming sheet 10 is subjected to pressure raging between the critical breaking-pressures $P_2$ and $P_3$ when passing between the second line thermal head 30M and the second roller platen 34M; and the image-forming sheet 10 is subjected to pressure ranging between the critical breaking-pressures $P_1$ and $P_2$ when passing between the third line thermal head 30Y and the third roller platen 34Y.

As is apparent from FIG. 8, the respective driver circuits 31C, 31M and 31Y for the line thermal heads 30C, 30M and 30Y are controlled by the CPU 40. Namely, the driver circuits 31C, 31M and 31Y are controlled by n sets of strobe signals "STC" and control signals "DAC", n sets of strobe signals "STM" and control signals "DAM", and n sets of strobe signals "STY" and control signals "DAY", respectively, thereby carrying out the selective energization of the electric resistance elements $R_{c1}$ to $R_{cn}$, the selective energization of the electric resistance elements $R_{m1}$ to $R_{mn}$ and the selective energization of the electric resistance elements $R_{y1}$ to $R_{yn}$, as stated in detail below.

Figure 9:
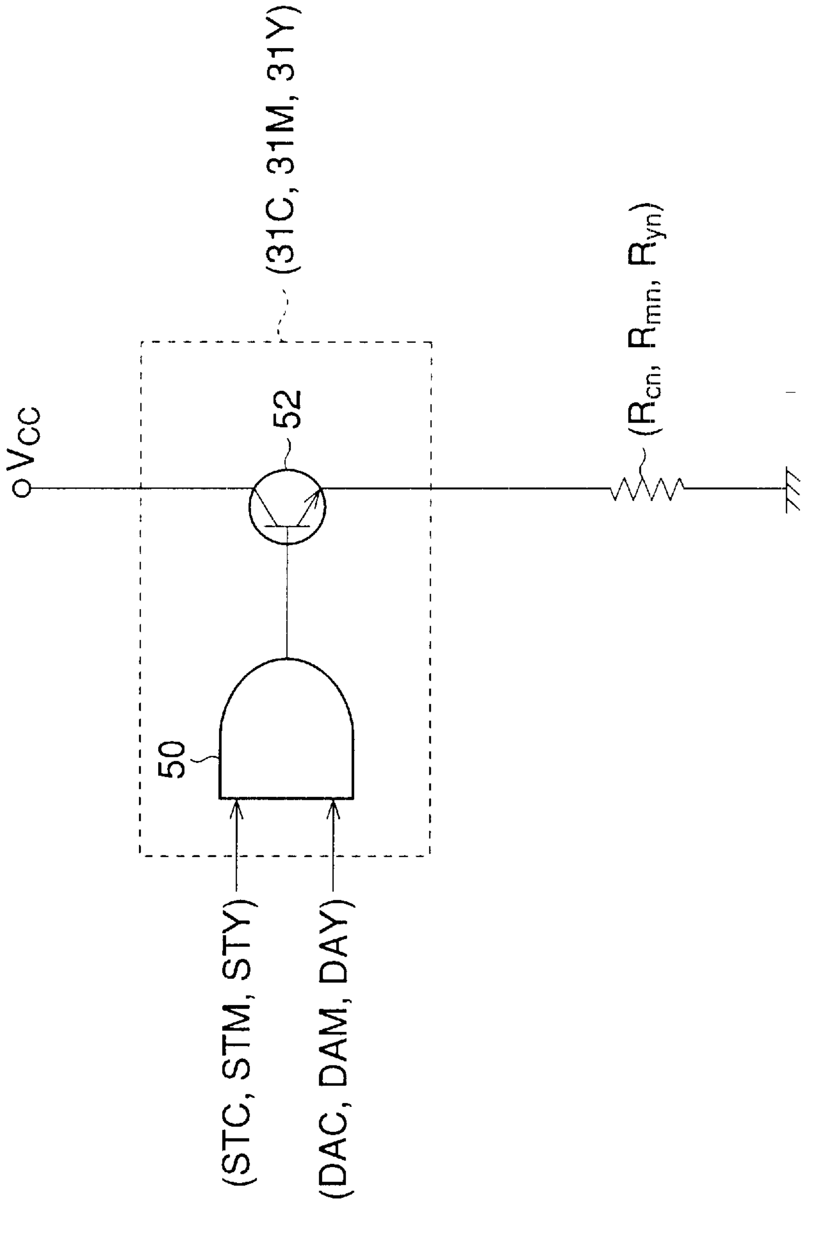
FIG. 9 is a partial block diagram representatively showing a set of an AND-gate circuit and a transistor included in each of the thermal head driver circuits of FIGS. 7 and 8.

In each driver circuit (31C, 31M and 31Y), n sets of AND-gate circuits and transistors are provided with respect to the electric resistance elements ($R_{cn}$, $R_{mn}$, $R_{yn}$), respectively. With reference to FIG. 9, an AND-gate circuit and a transistor in one set are representatively shown and indicated by references 50 and 52, respectively. A set of a strobe signal (STC, STM, STY) and a control signal (DAC, DAM, DAY) is inputted from the CPU 40 to two input terminals of the AND-gate circuit 50. A base of the transistor 52 is connected to an output terminal of the AND-gate circuit 50; a corrector of the transistor 52 is connected to an electric power source ($V_{cc}$); and an emitter of the transistor 52 is connected to a corresponding electric resistance element ($R_{cn}$, $R_{mn}$, $R_{yn}$).

Figure 10:
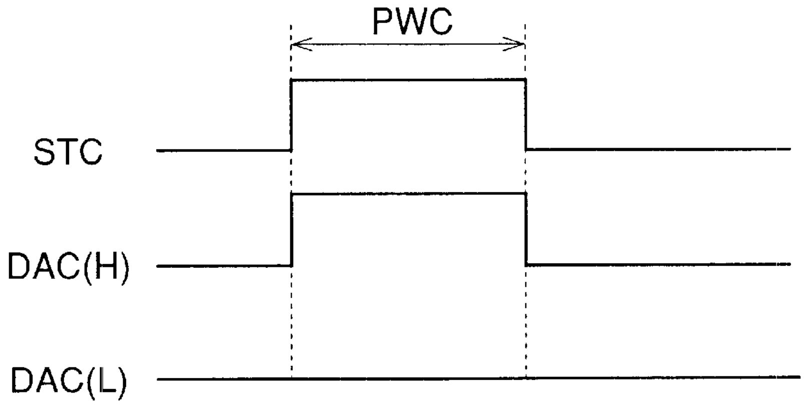
FIG. 10 is a timing chart showing a strobe signal and a control signal for electronically actuating one of the thermal head driver circuits for producing a cyan dot on the image-forming substrate of FIG. 1.

When the AND-gate circuit 50, as shown in FIG. 9, is one included in the first driver circuit 31C, a set of a strobe signal "STC" and a control signal "DAC" is inputted to the input terminals of the AND-gate circuit 50. As shown in a timing chart of FIG. 10, the strobe signal "STC" has a pulse width "PWC". On the other hand, the control signal "DAC" varies in accordance with binary values of a digital cyan image-pixel signal. Namely, when the digital cyan image-pixel signal has a value "1", the control signal "DAC" produces a high-level pulse having the same pulse width as that of the strobe signal "STC", whereas, when the digital cyan image-pixel signal has a value "0", the control signal "DAC" is maintained at a low-level.

Accordingly, only when the digital cyan image-pixel signal has the value "1", is a corresponding electric resistance element ($R_{c1}$, . . . , $R_{cn}$) electrically energized during a period corresponding to the pulse width "PWC" of the strobe signal "STC", whereby the electric resistance element concerned is heated to the temperature between the glass-transition temperatures $T_1$ and $T_2$, resulting in the production of a cyan dot on the image-forming sheet 10 due to the breakage and compacting of cyan microcapsules 18C, which are locally heated by the electric resistance element concerned.

Figure 11:
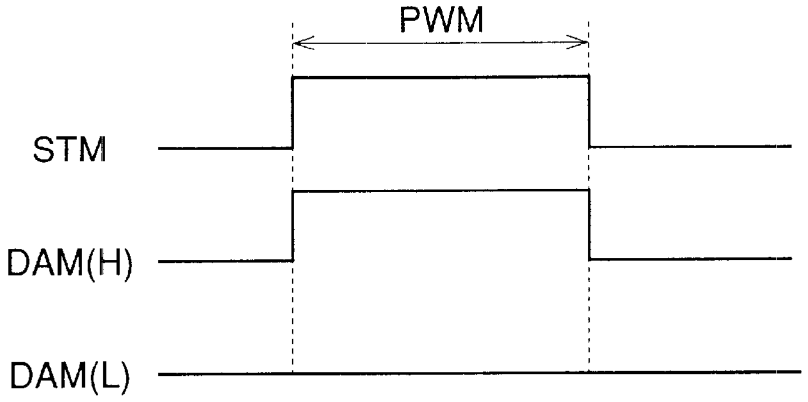
FIG. 11 is a timing chart showing a strobe signal and a control signal for electronically actuating another one of the thermal head driver circuits for producing a magenta dot on the image-forming substrate of FIG. 1.

Similarly, when the AND-gate circuit 50, as shown in FIG. 9, is one included in the second driver circuit 31M, a set of a strobe signal "STM" and a control signal "DAM" is inputted to the input terminals of the AND-gate circuit 50. As shown in a timing chart of FIG. 11, the strobe signal "STM" has a pulse width "PWM", being longer than that of the strobe signal "STC". On the other hand, the control signal "DAM" varies in accordance with binary values of a digital magenta image-pixel signal. Namely, when the digital magenta image-pixel signal has a value "1", the control signal "DAM" produces a high-level pulse having the same pulse width as that of the strobe signal "STM", whereas, when the digital magenta image-pixel signal has a value "0", the control signal "DAM" is maintained at a low-level.

Accordingly, only when the digital magenta image-pixel signal is "1", is a corresponding electric resistance element ($R_{m1}$, . . . , $R_{mn}$) electrically energized during a period corresponding to the pulse width "PWM" of the strobe signal "STM", whereby the electric resistance element concerned is heated to the temperature between the glass-transition temperatures $T_2$ and $T_3$, resulting in the production of a magenta dot on the image-forming sheet 10 due to the breakage and compacting of magenta microcapsules 18M, which are locally heated by the electric resistance element concerned.

Figure 12:
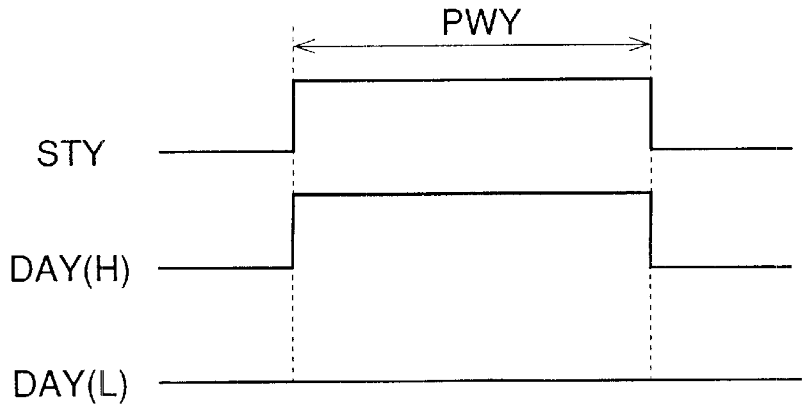
FIG. 12 is a timing chart showing a strobe signal and a control signal for electronically actuating the remaining thermal head driver circuit for producing a yellow dot on the image-forming substrate of FIG. 1.

Further, the AND-gate circuit 50, as shown in FIG. 9, is one included in the first driver circuit 31Y, a set of a strobe signal "STY" and a control signal "DAY" is inputted to the input terminals of the AND-gate circuit 50. As shown in a timing chart of FIG. 12, the strobe signal "STY" has a pulse width "PWY", being longer than that of the strobe signal "STM". On the other hand, the control signal "DAY" varies in accordance with binary values of a corresponding digital yellow image-pixel signal. Namely, when the digital yellow image-pixel signal has a value "1", the control signal "DAY" produces a high-level pulse having the same pulse width as that of the strobe signal "STY", whereas, when the digital yellow image-pixel signal has a value "0", the control signal "DAY" is maintained at a low-level.

Accordingly, only when the digital yellow image-pixel signal is "1", is a corresponding electric resistance element ($R_{y1}$, . . . , $R_{yn}$) electrically energized during a period corresponding to the pulse width "PWY" of the strobe signal "STY", whereby the resistance element concerned is heated to the temperature between the glass-transition temperature $T_3$ and the upper limit temperature $T_{UL}$, resulting in the production of a yellow dot on the image-forming sheet 10 due to the breakage and squashing of yellow microcapsules 18Y, which are locally heated by the electric resistance element concerned.

Note, the cyan, magenta and yellow dots, produced by the heated resistance elements $R_{cn}$, $R_{mn}$ and $R_{yn}$, have a dot size of about 50 $\mu$ to about 100 $\mu$, and thus three types of cyan, magenta and yellow microcapsules 18C, 18M and 18Y are uniformly included in a dot area to be produced on the image-forming sheet 10.

Of course, a color image is formed on the image-forming sheet 10 on the basis of a plurality of three-primary color dots obtained by selectively heating the electric resistance elements ($R_{c1}$ to $R_{cn}$; $R_{m1}$ to $R_{mn}$; and $R_{y1}$ to $R_{yn}$) in accordance with three-primary color digital image-pixel signals. Namely, a certain dot of the color image, formed on the image-forming sheet 10, is obtained by a combination of cyan, magenta and yellow dots produced by corresponding electric resistance elements $R_{cn}$, $R_{mn}$ and $R_{yn}$.

Figure 13:
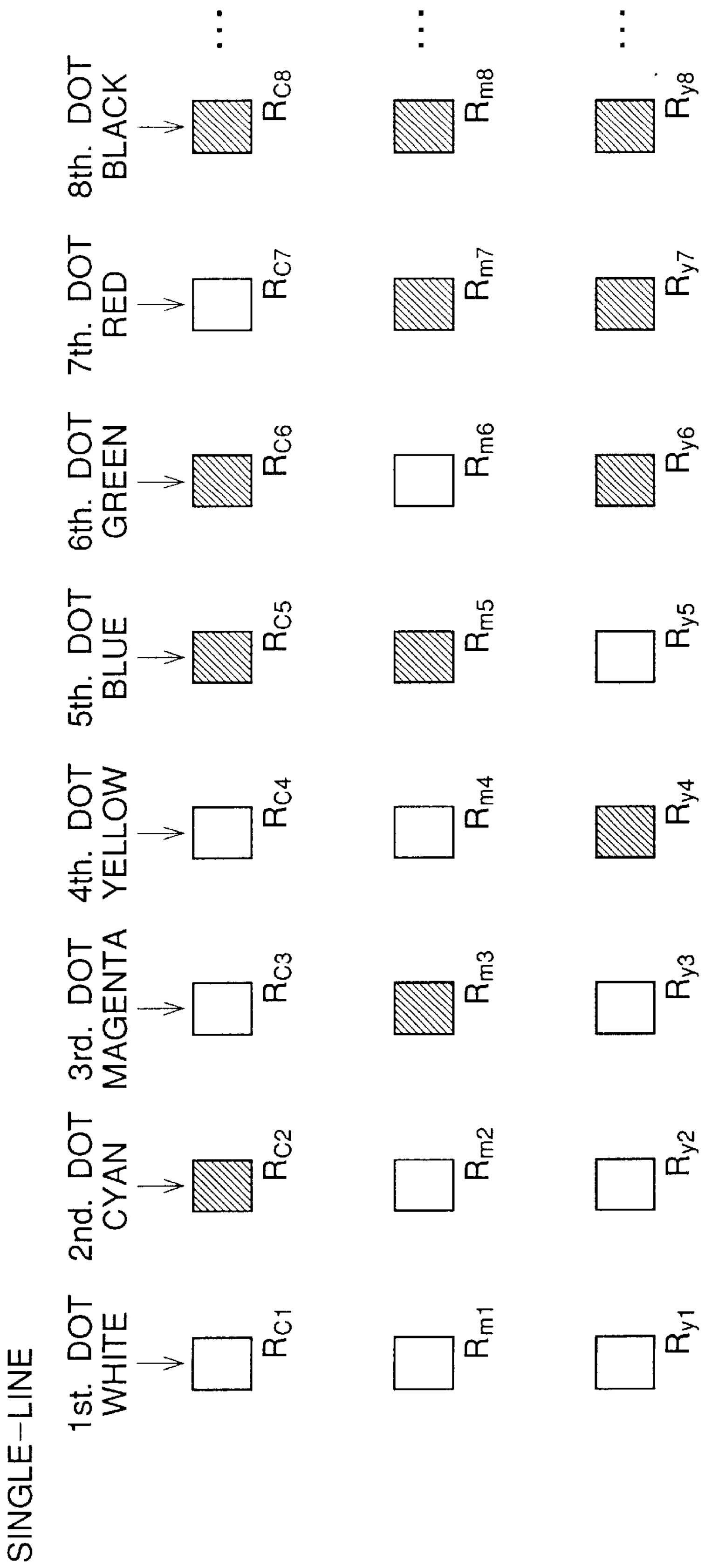
FIG. 13 is a conceptual view showing, by way of example, the production of color dots of a color image in the color printer of FIG. 6.

In particular, for example, as conceptually shown by FIG. 13, in a single-line of dots, forming a part of the color image, if a first dot is white, none of the electric resistance elements $R_{c1}$, $R_{m1}$ and $R_{y1}$ are heated. If a second dot is cyan, only the electric resistance element $R_{c2}$ is heated, and the remaining electric resistance elements $R_{m2}$ and $R_{y2}$ are not heated. If a third dot is magenta, only the resistance element $R_{m3}$ is heated, and the remaining resistance elements $R_{c3}$ and $R_{y3}$ are not heated. Similarly, if a fourth dot is yellow, only the resistance element $R_{y4}$ is heated, and the remaining resistance elements $R_{c4}$ and $R_{m4}$ are not heated.

Further, as shown in FIG. 13, if a fifth dot is blue, the electric resistance elements $R_{c5}$ and $R_{m5}$ are heated, and the remaining electric resistance element $R_{y5}$ is not heated. If a sixth dot is green, the resistance elements $R_{c6}$ and $R_{y6}$ are heated, and the remaining resistance element $R_{m6}$ is not heated. If a seventh dot is red, the resistance elements $R_{m7}$ and $R_{y7}$ are heated, and the remaining resistance element $R_{c7}$ is not heated. If an eighth dot is black, all of the resistance elements $R_{c8}$, $R_{m8}$ and $R_{y8}$ are heated.

Figure 14:
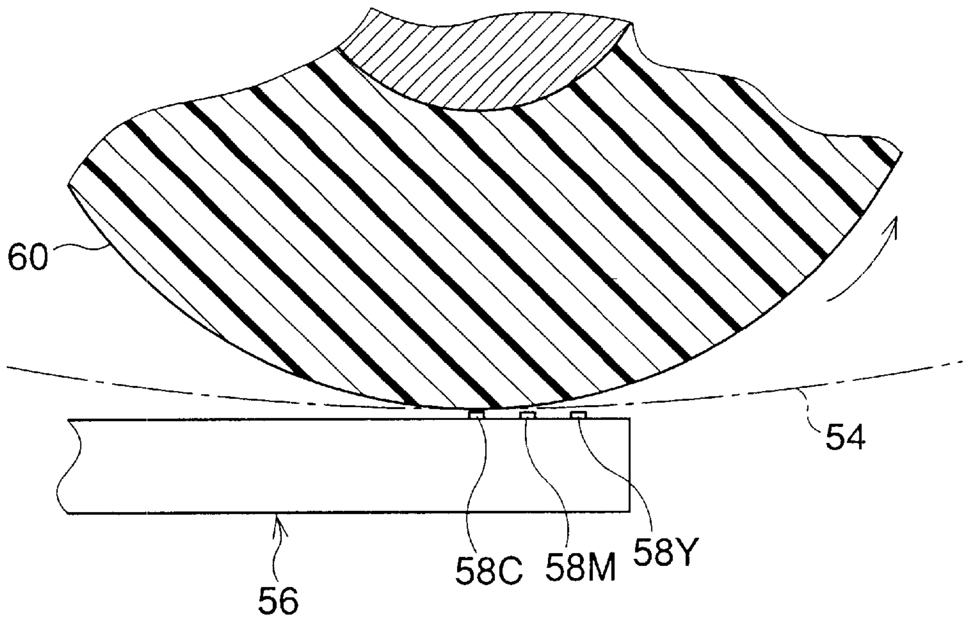
FIG. 14 is a partial schematic view of a second embodiment of a color printer, according to the present invention, for forming a color image on the image-forming substrate shown in FIG. 1.

FIG. 14 schematically and partially shows a second embodiment of the color printer according to the present invention, which is constituted as a line printer so as to form a color image on an image-forming substrate or sheet 10 as shown in FIG. 1.

In FIG. 14, a path 54 for movement of the image-forming sheet 10 is indicated by a chained line, and a guide plate 56 defines a part of the path 54. A first thermal head 58C, a second thermal head 58M and a third thermal head 58Y, which are substantially identical to the respective first, second and third line thermal heads 30C, 30M and 30Y of the first embodiment, are securely attached to a surface of the guide plate 56.

In this embodiment, the first, second and third thermal heads 58C, 58M, and 58Y are arranged so as to be close to each other, and a large-diameter roller platen 60 is resiliently pressed against these thermal heads 58C, 58M, and 58Y by a suitable spring biasing unit (not shown), such that the first, second and third thermal heads 58C, 58M, and 58Y are subjected to a high pressure, a medium pressure and a low pressure, respectively, from the large-diameter roller platen 60. Of course, the high pressure corresponds to a breaking pressure between the critical breaking pressure $P_3$ and the upper limit pressure $P_{UL}$; the medium pressure corresponds to a breaking pressure between the critical breaking pressures $P_2$ and $P_3$; and the low pressure corresponds to a breaking pressure between the critical breaking pressures $P_1$ and $P_2$ (FIG. 3).

A plurality of electrical elements ($R_{c1}$ to $R_{cn}$) of the first line thermal head 58C, a plurality of electric resistance elements ($R_{m1}$ to $R_{mn}$) of the second line thermal head 58M and a plurality of electric resistance elements ($R_{y1}$ to $R_{yn}$) of the third line thermal head 58Y are selectively heated in substantially the same manner as that of the first, second and third line thermal heads 30C, 30M and 30Y, whereby a color image can be formed on the image-forming sheet 10.

Figure 15:
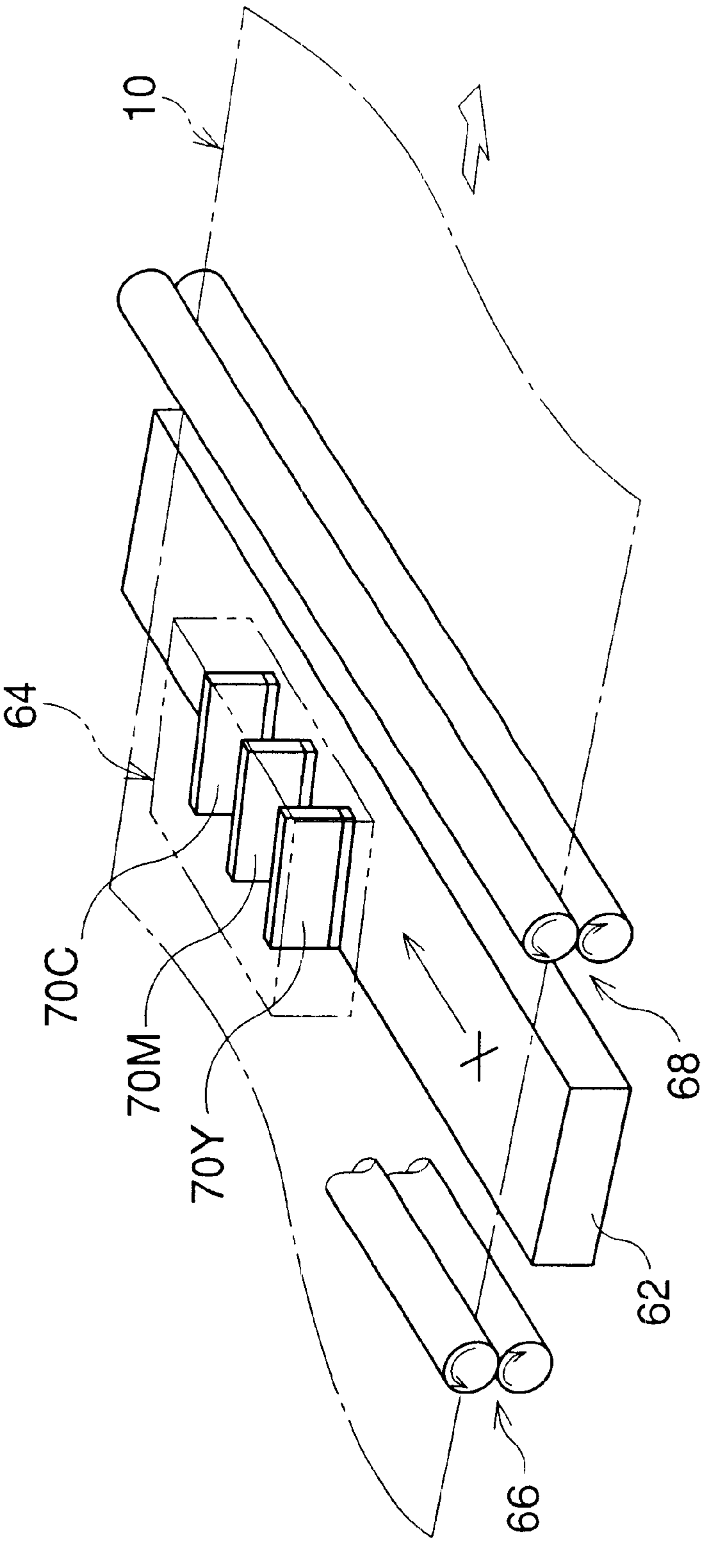
FIG. 15 is a partial schematic perspective view of a third embodiment of a color printer, according to the present invention, for forming a color image on the image-forming substrate shown in FIG. 1.

FIG. 15 schematically shows a third embodiment of the color printer according to the present invention, which is constituted as a serial printer to form a color image on an image-forming substrate or sheet 10 as shown in FIG. 1.

This serial color printer comprises an elongated flat platen 62, and a thermal head carriage 64 slidably mounted on a guide rod member (not shown) extended along a length of the elongated flat platen 62. The thermal head carriage 64 is attached to an endless drive belt (not shown), and can be moved along the guide rod member by running the endless belt with a suitable drive motor (not shown).

The serial color printer also comprises two pairs of guide rollers 66 and 68 provided at sides of the elongated flat platen 62, so as to extend in parallel to the elongated flat platen 62. During a printing operation, the two pairs of feed rollers 66 and 68 are intermittently rotated in rotational directions indicated by arrows in FIG. 15, and thus the image-forming sheet 10 is intermittently passed between the elongated flat platen 62 and the thermal head carriage 64 in a direction indicated by an open arrow in FIG. 15.

As shown in FIG. 15, the thermal head carriage 64 has a first thermal head 70C, a second thermal head 70M and a third thermal head 70Y supported thereby. In this embodiment, the thermal head 70C is constituted such that ten cyan dots are simultaneously produced on the image-forming sheet 10 in accordance with ten single-lines of digital cyan image-pixel signals; the thermal head 70M is constituted such that ten magenta dots are simultaneously produced on the image-forming sheet 10 in accordance with ten single-lines of digital magenta image-pixel signals; and the thermal head 70Y is constituted such that ten yellow dots are simultaneously produced on the image-forming sheet 10 in accordance with ten single-lines of digital yellow image-pixel signals. Namely, each of the thermal heads 70C, 70M and 70Y includes ten heater elements or ten electric resistance elements aligned with each other along the movement direction of the image-forming sheet 10.

The first, second and third thermal heads 70C, 70M and 70Y are movably supported by the thermal head carriage 64, so as to be moved toward and away from the flat platen 62, and are associated with spring-biasing units (not shown), such that the first, second and third thermal heads 70C, 70M and 70Y are resiliently pressed against the flat platen 62 at a high pressure, a medium pressure and a low pressure, respectively. Of course, the high pressure corresponds to a breaking pressure between the critical breaking pressure $P_3$ and the upper limit pressure $P_{UL}$; the medium pressure corresponds to a breaking pressure between the critical breaking pressures $P_2$ and $P_3$; and the low pressure corresponds to a breaking pressure between the critical breaking pressures $P_1$ and $P_2$ (FIG. 3).

Figure 16:
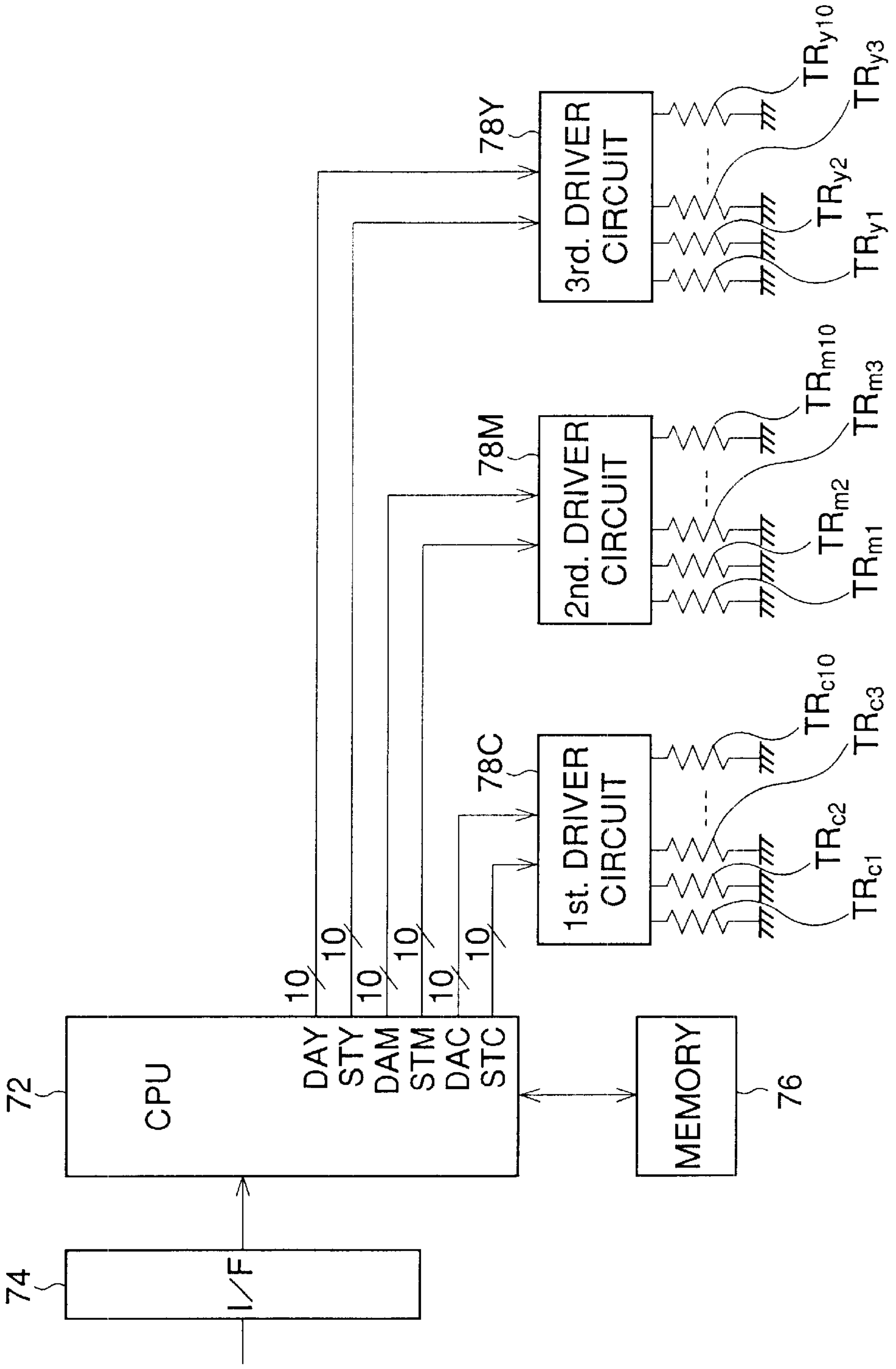
FIG. 16 is a schematic block diagram of a control board of the color printer shown in FIG. 15.

FIG. 16 shows a block diagram for controlling the first, second and third thermal heads 70C, 70M and 70Y. Similar to the block diagram of FIG. 8, a central processing unit (CPU) 72 receives digital color image-pixel signals from a personal computer or a ward processor (not shown) through an interface circuit (I/F) 74, and the received digital color image-pixel signals, i.e. digital cyan image-pixel signals, digital magenta image-pixel signals and digital yellow image-pixel signals, are stored in a memory 76.

In FIG. 16, the ten electric resistance elements of the first thermal head 70C are indicated by references $TR_{c1}$, . . . and $TR_{c10}$; the ten electric resistance elements of the second thermal head 70M are indicated by references $TR_{m1}$, . . . and $TR_{m10}$; and the ten electric resistance elements of the second thermal head 70Y are indicated by references $TR_{y1}$, . . . and $TR_{y10}$. A first driver circuit 78C, a second driver circuit 78M and a third driver circuit 78Y are provided to drive the thermal heads 70C, 70M and 70Y, respectively, and are controlled by the CPU 72. Namely, the respective driver circuits 78C, 78M and 78Y are controlled by ten sets of strobe signals "STC" and control signals "DAC", ten sets of strobe signals "STM" and control signals "DAM", and ten sets of strobe signals "STY" and control signals "DAY", whereby the electric resistance elements $TR_{c1}$ to $TR_{c10}$, $TR_{m1}$ to $TR_{m10}$ and $TR_{y1}$ to $TR_{y10}$ are selectively energized in substantially the same manner as in the case of FIGS. 8 and 9.

Note, similar to each of the driver circuits 31C, 31M and 31Y, in each of the driver circuits 78C, 78M and 78Y, ten sets of AND-gate circuits and transistors with respect to the electric resistance elements ($TR_{c1}$ to $TR_{c10}$; $TR_{m1}$ to $TR_{m10}$; $TR_{y1}$ to $TR_{y10}$), are provided, respectively.

During an intermittent stoppage of the image-forming sheet 10, the thermal head carriage 64 is moved from an initial position in a direction indicated by arrow X in FIG. 15, such that the ten single-lines of dots are simultaneously produced on the image-forming sheet 10 by each thermal head (70C, 70M, 70Y), in accordance with ten single-lines of image-pixel signals. After the production of the ten single-lines of dots is completed, while the thermal head carriage 64 is returned to the initial position, the two pairs of feed rollers 66 and 68 are driven until the image-forming sheet 10 is fed in the direction of the open arrow (FIG. 15) by a distance corresponding to a width of the ten single-lines of dots. Thereafter, the thermal head carriage 64 is again moved from the initial position in the direction of arrow X in FIG. 15, and thus a production of ten single-lines of dots on the image-forming sheet 10 is carried out.

As is apparent from the foregoing, in the serial color printer shown in FIG. 15, the printing or production of the ten single-lines of dots on the image-forming sheet 10 can be carried out only when the thermal head carriage 64 is moved in the direction of arrow X. Nevertheless, if a spring-biasing force of the spring-biasing unit, associated with the thermal heads 70C and 70Y, is adjustable, it is possible to produce ten single-lines of dots on the image-forming sheet 10 during the movement of the thermal head carriage 64 in the opposite direction to the direction of arrow X.

Figure 17:
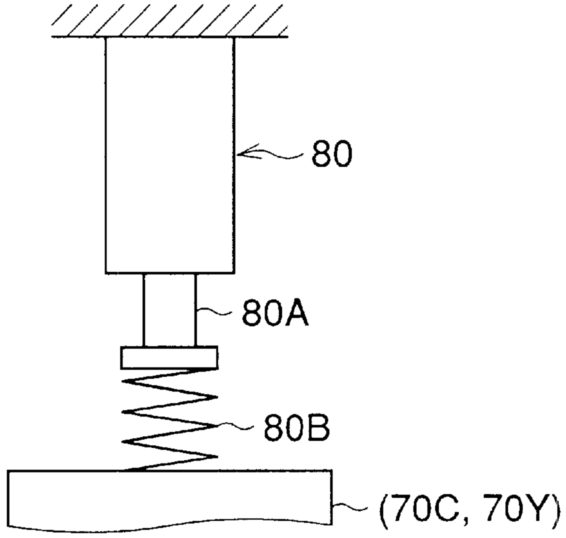
FIG. 17 is a schematic view showing an adjustable spring-biasing unit, which may be used in the color printer shown in FIG. 15.
Figure 18:
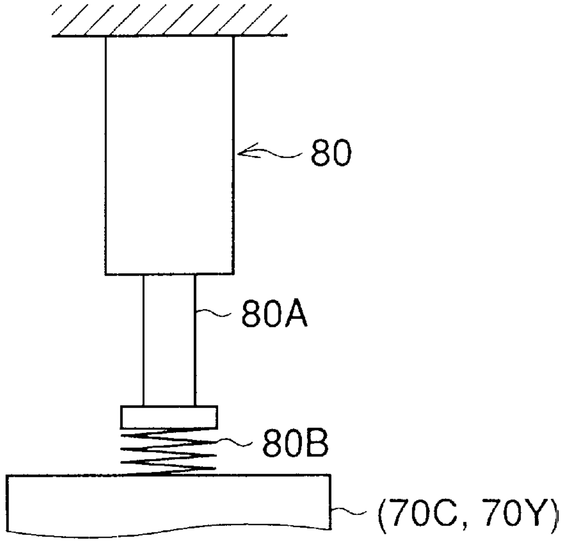
FIG. 18 is a schematic view similar to FIG. 17, showing the adjustable spring-biasing unit at a position different from that of FIG. 17.

For example, by using an adjustable spring-biasing unit, as shown in FIGS. 17 and 18, in place of the fixed spring-biasing unit of the thermal heads 70C and 70Y, during the movement of the thermal head carriage 64 in the opposite direction to the direction of arrow X, the production of ten single-lines of dots on the image-forming sheet 10 can be performed.

In particular, the adjustable spring-biasing unit comprises an electromagnetic solenoid 80, having a plunger 80A, securely supported by a frame of the thermal head carriage 64, and a compressed coil spring 80B constrained between each of the thermal heads 70C and 70Y and a free end of the plunger 80A of the electromagnetic solenoid 80.

When the electromagnetic solenoid 80 is not electrically energized, i.e. when the plunger 80A is retracted as shown in FIG. 17, the breaking pressure between the critical breaking pressures $P_1$ and $P_2$ is exerted on the respective thermal head (70C or 70Y) by the compressed coil spring 80B. On the contrary, when the electromagnetic solenoid 80 is electrically energized, i.e. when the plunger 80A is protruding, as shown in FIG. 18, the breaking pressure between the critical breaking pressure $P_3$ and the upper limit pressure $P_{UL}$ is exerted on the respective thermal head (70C or 70Y) by the compressed coil spring 80B.

While the thermal head carriage 64 is moved in the direction of arrow X, the adjustable spring-biasing unit or electromagnetic solenoid 80 of the thermal head 70C is electrically energized, and the adjustable spring-biasing unit or electromagnetic solenoid 80 of the thermal head 70Y is not electrically energized.

On the other hand, when the thermal head carriage 64 is moved in the opposite direction to the direction of arrow X, the adjustable spring-biasing unit or electromagnetic solenoid 80 of the thermal head 70C is not electrically energized, and the adjustable spring-biasing unit or electromagnetic solenoid 80 of the thermal head 70Y is electrically energized. Of course, the electric resistance elements $TR_{y1}$ to $TR_{y10}$ of the thermal head 70Y are selectively energized in accordance with ten single-lines of digital cyan image-pixel signals, the electric resistance elements $TR_{c1}$ to $TR_{c10}$ of the thermal head 70C are selectively energized in accordance with ten single-lines of digital yellow image-pixel signals.

Figure 19:
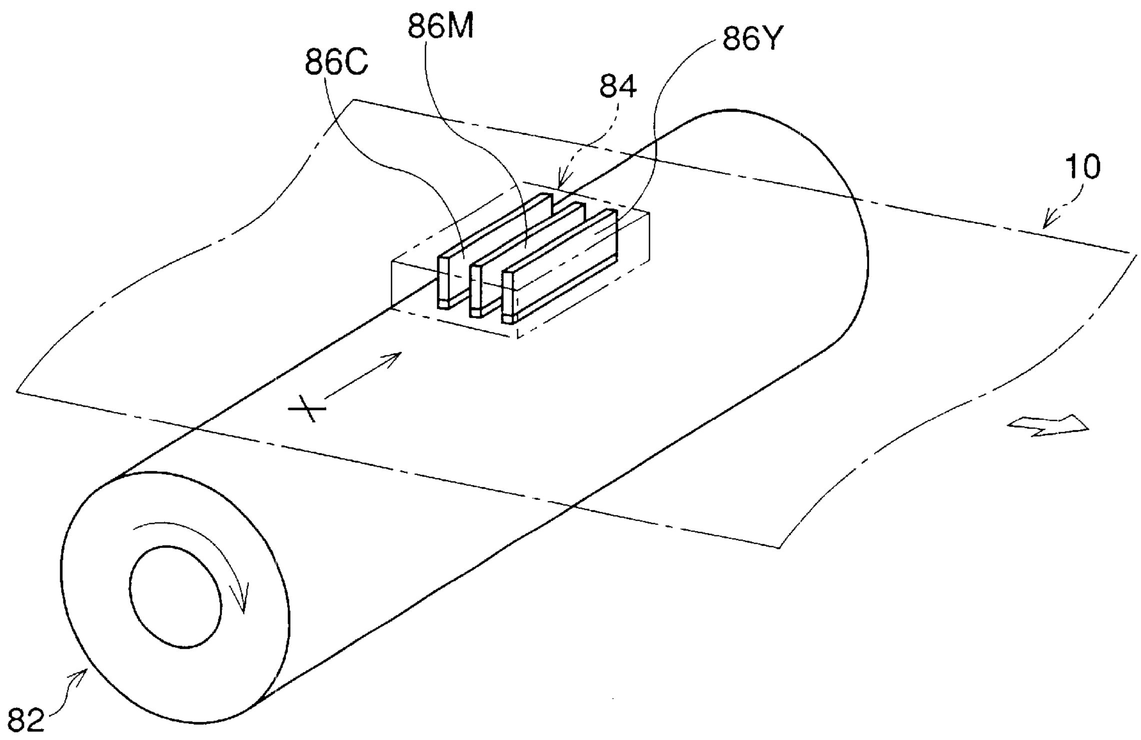
FIG. 19 is a partial schematic perspective view of a fourth embodiment of a color printer, according to the present invention, for forming a color image on the image-forming substrate shown in FIG. 1.

FIG. 19 schematically shows a fourth embodiment of the color printer according to the present invention, which is constituted as a serial printer to form a color image on an image-forming substrate or sheet 10 of the first embodiment.

This serial color printer comprises a large-diameter roller platen 82, and a thermal head carriage 84 slidably mounted on a guide rod member (not shown) extended along a longitudinal axis of the large-diameter roller platen 82. The thermal head carriage 84 is attached to an endless drive belt (not shown), and can be moved along the guide rod member by running the endless belt with a suitable drive motor (not shown).

Although not shown, similar to the serial color printer shown in FIG. 15, two pairs of guide rollers are provided at sides of the large-diameter platen 82, so as to extend in parallel to the large-diameter platen 82. During a printing operation, the two pairs of feed rollers are intermittently rotated such that the image-forming sheet 10 is intermittently passed between the large-diameter platen 82 and the thermal head carriage 64 in a direction indicated by an open arrow in FIG. 15.

As shown in FIG. 19, the thermal head carriage 84 has a first thermal head 86C, a second thermal head 86M and a third thermal head 86Y carried therewith. In this embodiment, each of the thermal heads 86C, 86M and 86Y includes ten heater elements or ten electric resistance elements aligned with each other along the longitudinal axis of the large-diameter roller platen 82, and the respective ten electric resistance elements are used to produce a single cyan dot, a single magenta dot and a single yellow dot on the image-forming sheet 10, as stated in detail hereinafter.

Figure 20:
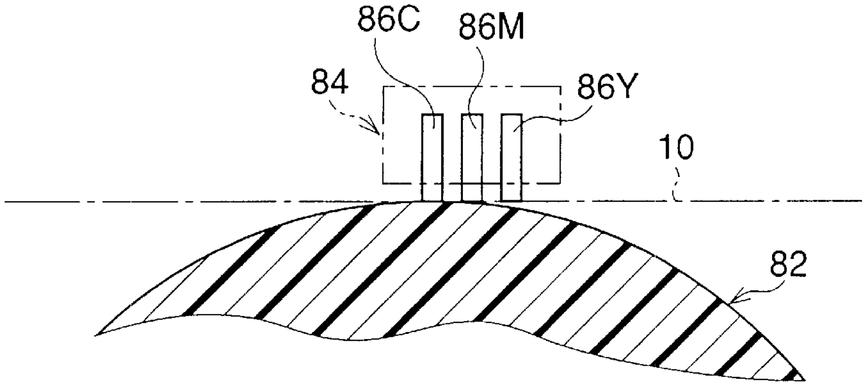
FIG. 20 is a partial cross sectional view showing a positional relationship between a roller platen and a thermal head carriage of the color printer shown in FIG. 19.

In this embodiment, the first, second and third thermal heads 86C, 8M, and 86Y are arranged in the thermal head carriage 84 so as to be close to each other, and the thermal head carriage 84 is resiliently pressed against the large-diameter roller platen 82 by a suitable spring-biasing unit (not shown). Also, the thermal head carriage 84 is positioned with respect to the large-diameter roller platen 82, as shown in FIG. 20, such that the thermal heads 86C, 8M, and 86Y exert a high pressure, a medium pressure and a low pressure, respectively, on the image-forming sheet 10 between the large-diameter platen 82 and the thermal head carriage 84. Of course, the high pressure corresponds to a breaking pressure between the critical breaking pressure $P_3$ and the upper limit pressure $P_{UL}$; the medium pressure corresponds to a breaking pressure between the critical breaking pressures $P_2$ and $P_3$; and the low pressure corresponds to a breaking pressure between the critical breaking pressures $P_1$ and $P_2$ (FIG. 3).

Figure 21:
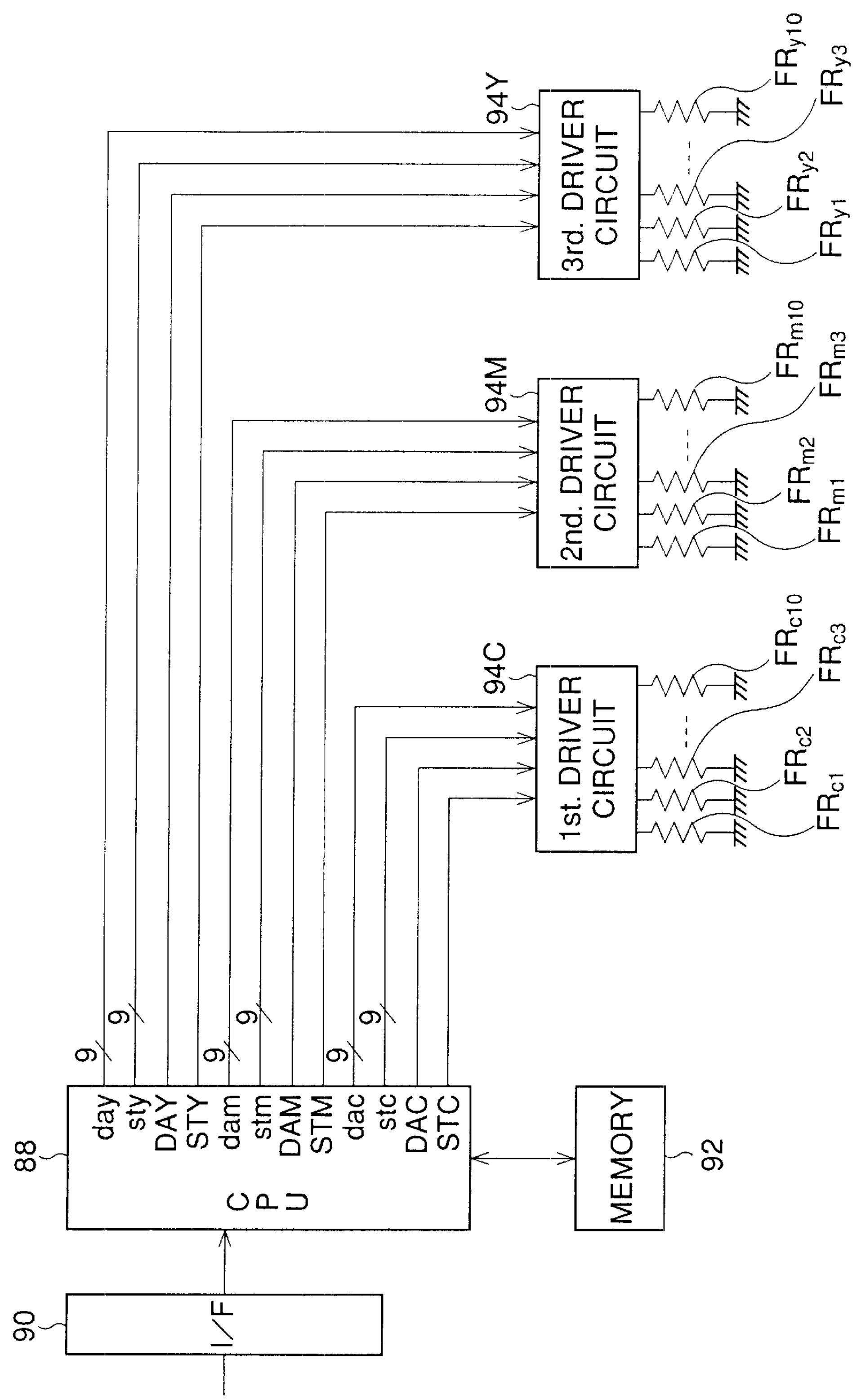
FIG. 21 is a schematic block diagram of a control board of the color printer shown in FIG. 19.

FIG. 21 shows a block diagram for controlling the first, second and third thermal heads 86C, 86M and 86Y. Similar to the block diagram of FIG. 8, a central processing unit (CPU) 88 receives digital color image-pixel signals from a personal computer or a ward processor (not shown) through an interface circuit (I/F) 90, and the received digital color image-pixel signals, i.e. digital cyan image-pixel signals, digital magenta image-pixel signals and digital yellow image-pixel signals, are stored in a memory 92.

In FIG. 21, the electric resistance elements of the first thermal head 86C are indicated by references $PR_{c1}$, . . . and $FR_{c10}$; the electric resistance elements of the second thermal head 86M are indicated by references $FR_{m1}$, . . . and $FR_{m10}$; and the electric resistance elements of the second thermal head 86Y are indicated by references $FR_{y1}$, . . . and $FR_{y10}$. A first driver circuit 94C, a second driver circuit 94M and a third driver circuit 94Y are provided to drive the thermal heads 86C, 86M and 86Y, respectively, and are controlled by the CPU 88. Namely, the driver circuit 86C is controlled by a set of a strobe signal "STC" and a control signal "DAC" and nine sets of strobe signals "stc" and control signals "dac"; the driver circuit 86M is controlled by a set of a strobe signal "STM" and a control signal "DAM" and nine sets of strobe signals "stm" and control signals "dam"; and the driver circuit 86Y is controlled by a set of a strobe signal "STY" and a control signal "DAY" and nine sets of strobe signals "sty" and control signals "day".

Note, similar to each of the driver circuits 31C, 31M and 31Y, in each of the driver circuits 86C, 86M and 86Y, ten sets of AND-gate circuits and transistors with respect to the electric resistance elements ($FR_{c1}$ to $FR_{c10}$; $FR_{m1}$ to $FR_{m10}$; $FR_{y1}$ to $FR_{y10}$), are provided, respectively.

During an intermittent stoppage of the image-forming sheet 10, the thermal head carriage 84 is moved from an initial position in a direction indicated by arrow X in FIG. 19, such that a single-line of single color(cyan, magenta, yellow) dots is simultaneously produced on the image-forming sheet 10 by each thermal head (86Y, 86M, 86Y), in accordance with a single-line of single color (cyan, magenta, yellow) digital image-pixel signals.

Figure 22:
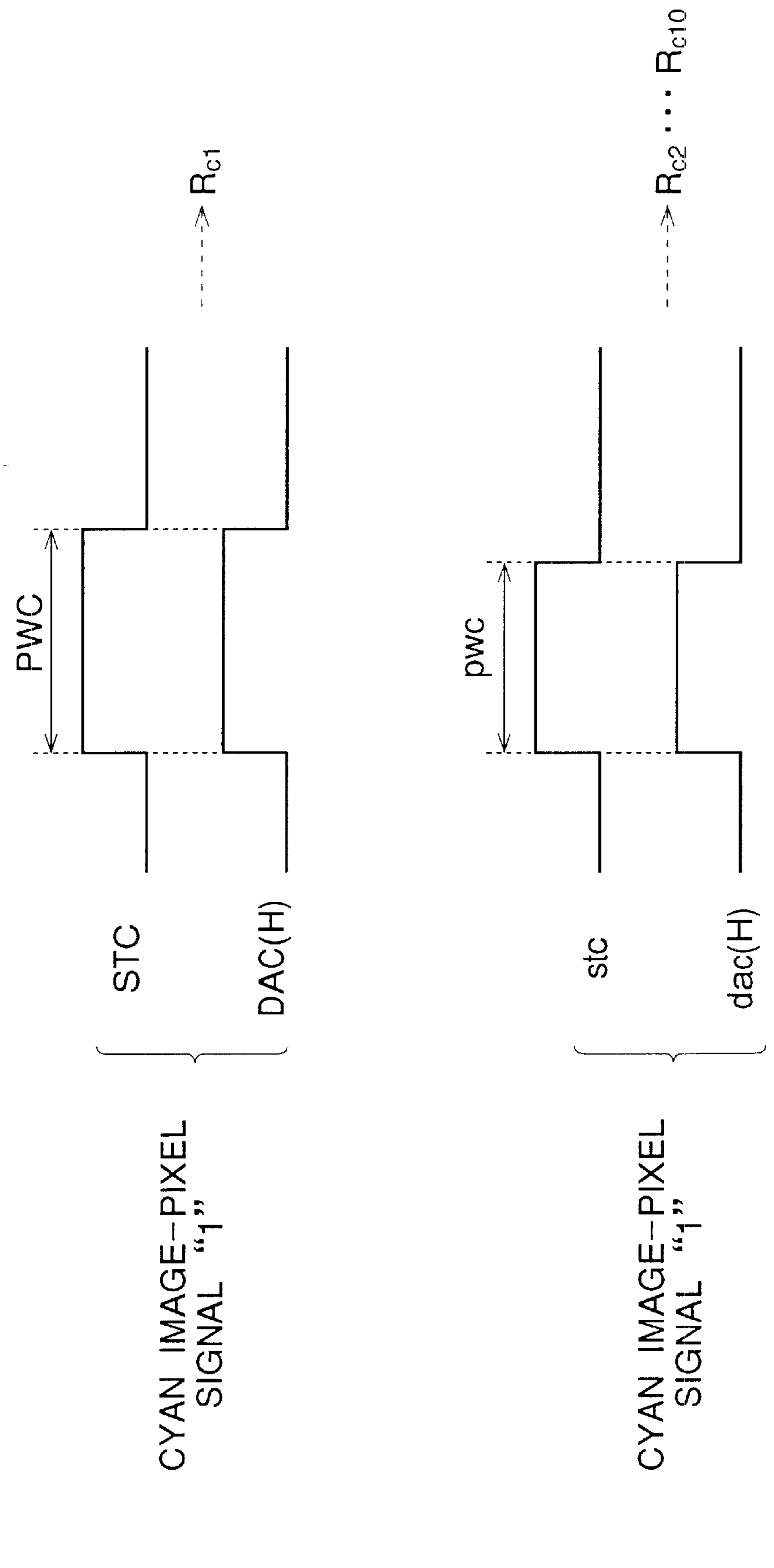
FIG. 22 is a timing chart showing strobe signals and control signals for electronically actuating one of the thermal head driver circuits for producing a cyan dot on the image-forming substrate of FIG. 1.

In this printing operation, as conceptually shown in FIG. 22, the leading electric resistance element $FR_{c1}$ is selectively energized by the set of the strobe signal "STC" and the control signal "DAC", and the respective electric resistance elements $FR_{c2}$ to $FR_{c10}$ are selectively energized by the nine sets of the strobe signals "stc" and the control signals "dac".

In particular, as shown in FIG. 22, if a digital cyan image-pixel signal included in one single-line has a value "1", the control signal "DAC" produces a high-level pulse having the same pulse width as a pulse width "PWC" of a strobe signal "STC", whereby a cyan dot is produced on the image-forming sheet 10 at a given position by the leading electric resistance element $FR_{c1}$. Then, the control signal "dac" produces a high-level pulse on the basis of the above-mentioned cyan image-pixel signal, having the value "1", and the high-level pulse of the control signal "dac" has the same pulse width as a pulse width "pwc" of a strobe signal "stc", which is shorter than the pulse width "PWC" of the strobe signal "STC". Namely, the cyan dot, produced by the leading electric resistance $FR_{c1}$, is additionally heated by the electric resistance elements $FR_{c2}$ to $FR_{c10}$, such that a temperature of the cyan dot concerned is maintained between the glass-transition temperatures $T_1$ and $T_2$. Thus, all of the cyan microcapsules 18C, encompassed in an area of the cyan dot, can be substantially broken and squashed due to the additional heating of the cyan dot by the subsequent electric resistance elements $FR_{c2}$ to $FR_{c10}$.

When a cyan dot is produced by only one electric resistance element $FR_{c1}$, all of the cyan microcapsules 18C, encompassed by an area of the cyan dot, are not necessarily broken and squashed. In this case, of course, the produced cyan dot does not exhibit a desired density of cyan.

However, according to the serial color printer as shown in FIG. 19, as mentioned above, since the cyan dot, produced by the leading electric resistance $FR_{c1}$, is additionally heated by the electric resistance elements $FR_{c2}$ to $FR_{c10}$, so that all of the cyan microcapsules 18C, encompassed by an area of the cyan dot, are substantially broken and squashed, the produced cyan dot exhibits the desired uniform density of cyan.

Also, as shown in FIG. 21, the leading electric resistance element $FR_{m1}$ is selectively energized by the set of the strobe signal "STM" and the control signal "DAM", and the respective electric resistance elements $FR_{m2}$ to $FR_{m10}$ are selectively energized by the nine sets of the strobe signals "stm" and the control signals "dam".

Figure 23:
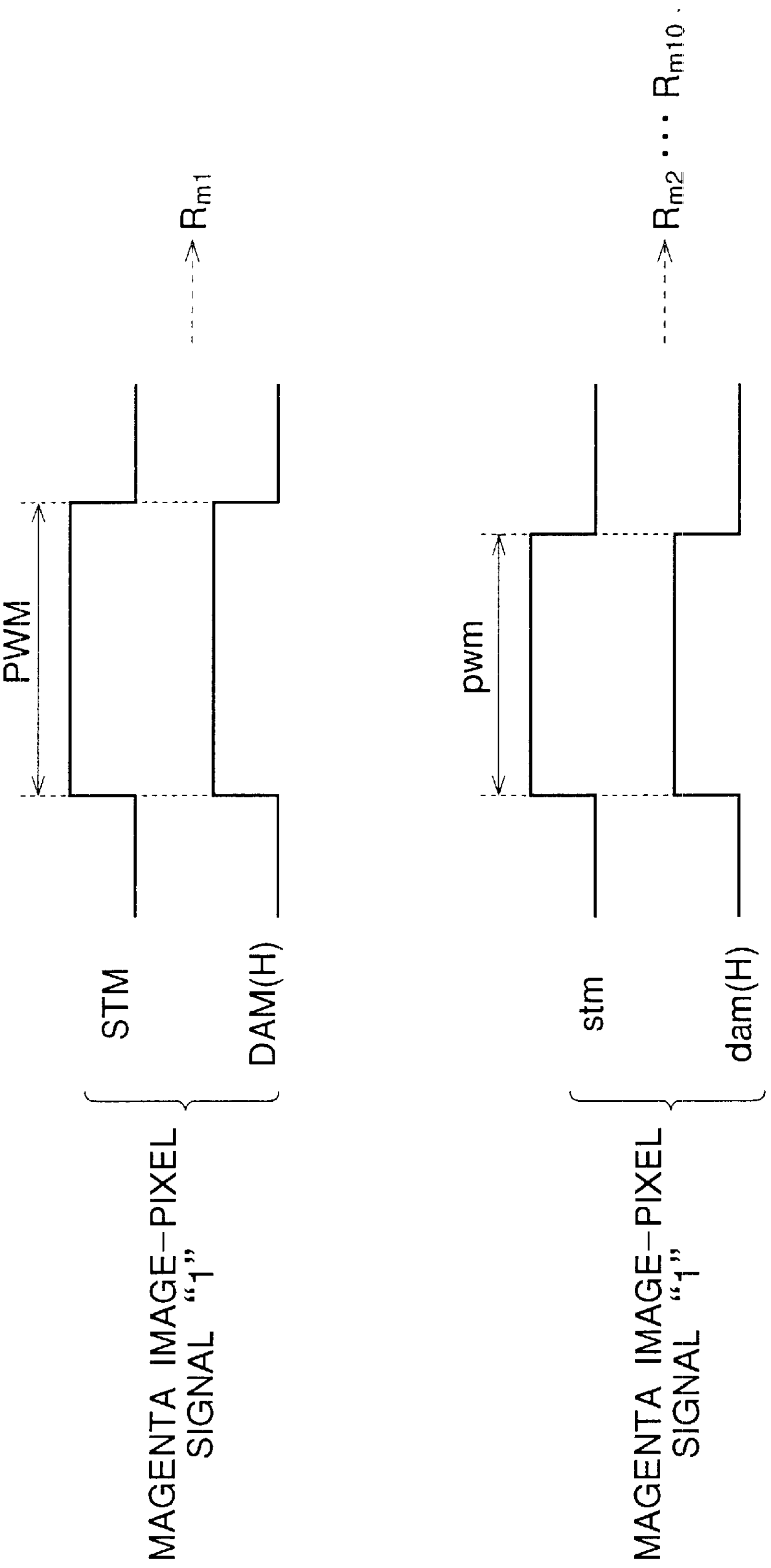
FIG. 23 is a timing chart showing strobe signals and control signals for electronically actuating another one of the thermal head driver circuits for producing a magenta dot on the image-forming substrate of FIG. 1.

In particular, as shown in FIG. 23, if a digital magenta image-pixel signal included in one single-line has a value "1", the control signal "DAM" produces a high-level pulse having the same pulse width as a pulse width "PWM" of a strobe signal "STM", whereby a magenta dot is produced on the image-forming sheet 10 at a given position by the leading electric resistance element $FR_{m1}$. Then, the control signal "dam" produces a high-level pulse on the basis of the above-mentioned magenta image-pixel signal, having the value "1", and the high-level pulse of the control signal "dam" has the same pulse width as a pulse width "pwc" of a strobe signal "stm", which is shorter than the pulse width "PWM" of the strobe signal "STM". Namely, the magenta dot, produced by the leading electric resistance $FR_{m1}$, is additionally heated by the electric resistance elements $FR_{m2}$ to $FR_{m10}$, such that a temperature of the magenta dot concerned is maintained between the glass-transition temperatures $T_2$ and $T_3$. Thus, all of the magenta microcapsules 18M, encompassed in an area of the magenta dot, can be substantially broken and squashed due to the additional heating of the magenta dot by the subsequent electric resistance elements $FR_{m2}$ to $FR_{m10}$, whereby the produced magenta dot can exhibit a desired density of magenta.

Further, as shown in FIG. 21, the leading electric resistance element $FR_{y1}$, is selectively energized by the set of the strobe signal "STY" and the control signal "DAY", and the respective electric resistance elements $FR_{y2}$ to $FR_{y10}$ are selectively energized by the nine sets of the strobe signals "sty" and the control signals "day".

Figure 24:
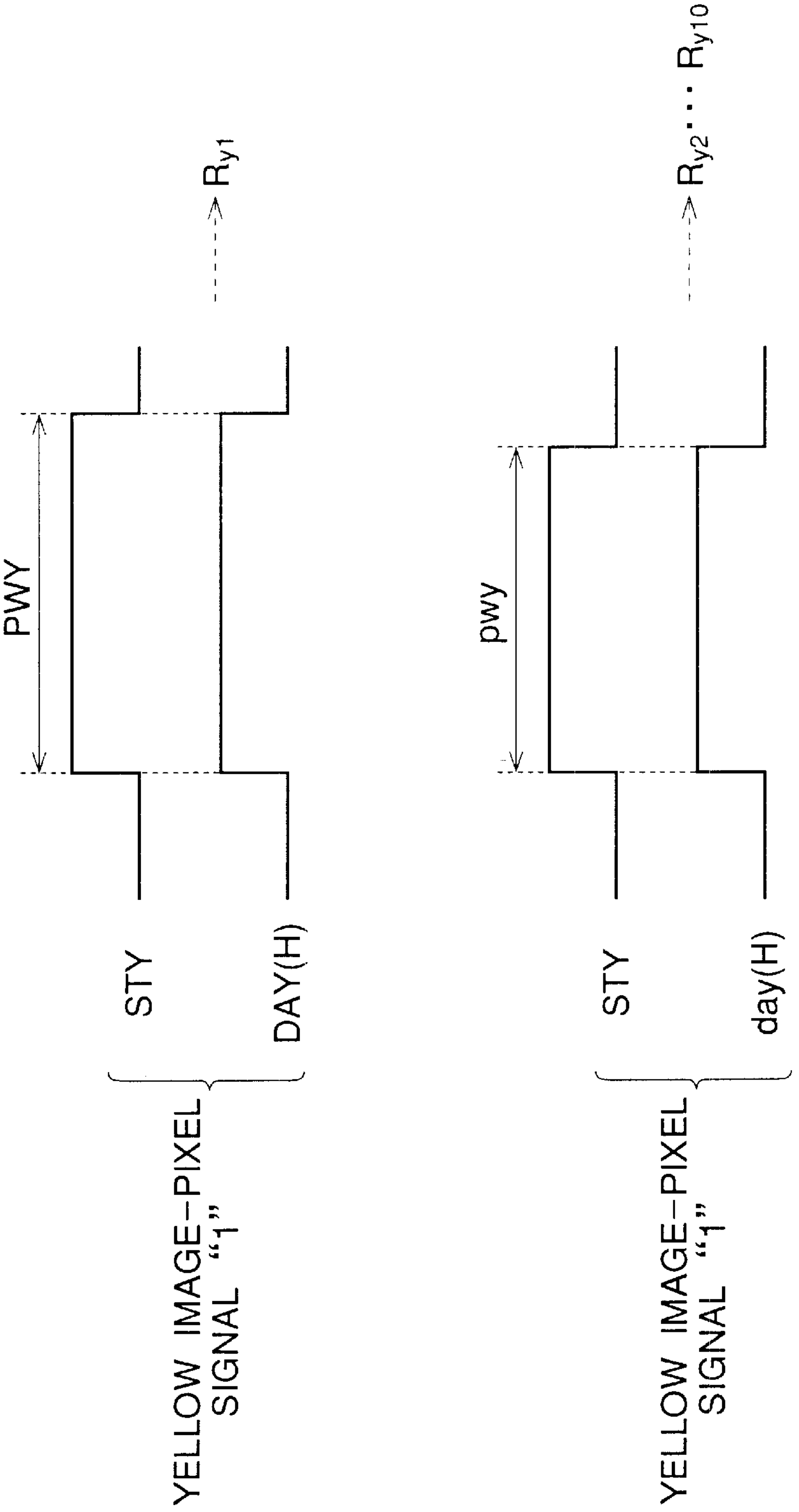
FIG. 24 is a timing chart showing strobe signals and control signals for electronically actuating the remaining thermal head driver circuit for producing a yellow dot on the image-forming substrate of FIG. 1.

In particular, as shown in FIG. 24, if a digital yellow image-pixel signal included in one single-line has a value "1", the control signal "DAY" produces a high-level pulse having the same pulse width as a pulse width "PWY" of a strobe signal "STY", whereby a yellow dot is produced on the image-forming sheet 10 at a given position by the leading electric resistance element $FR_{y1}$. Then, the control signal "day" produces a high-level pulse on the basis of the above-mentioned yellow image-pixel signal having the value "1", the high-level pulse of the control signal "day" having the same pulse width as a pulse width "pwy" of a strobe signal "sty", which is shorter than the pulse width "PWM" of the strobe signal "STM". Namely, the yellow dot, produced by the leading electric resistance $FR_{y1}$, is additionally heated by the electric resistance elements $FR_{y2}$ to $FR_{y10}$, such that a temperature of the yellow dot concerned is maintained between the glass-transition temperature $T_3$ and the upper limit temperature $T_{UL}$. Thus, all of the yellow microcapsules 18Y, encompassed by an area of the yellow dot, can be substantially broken and squashed due to the additional heating of the yellow dot by the subsequent electric resistance elements $FR_{y2}$ to $FR_{y10}$, whereby the produced yellow dot can exhibit a desired density of yellow.

Figure 25:
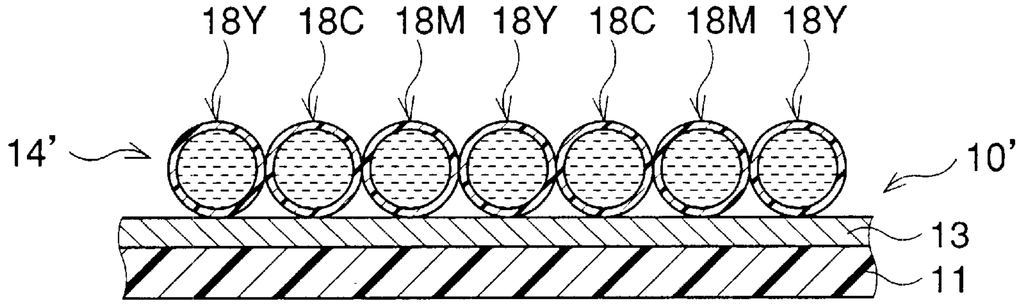
FIG. 25 is a schematic conceptual cross sectional view showing a second embodiment of an image-forming substrate, according to the present invention, comprising a layer of microcapsules similar to that of the image-forming substrate shown in FIG. 1, and formed as a film type of image-forming substrate.

FIG. 25 shows a second embodiment of an image-forming substrate, generally indicated by reference 10', which can be used in the above-mentioned various printers according to the present invention. The image-forming substrate 10' comprises a film sheet 11 formed of a suitable synthetic resin, such as polyethylene terephthalate, a peeling layer 13 formed over a surface of the film sheet 11, and a layer of microcapsules 14' coated over the peeling layer 13. The layer of microcapsules 14' is formed in substantially the same manner as the layer of microcapsules 14 of the image-forming substrate 10 shown in FIG. 1. Namely, the layer of microcapsules 14 is formed from a first type of microcapsules 18C filled with cyan liquid dye or ink, a second type of microcapsules 18M filled with magenta liquid dye or ink, and a third type of microcapsules 18Y filled with yellow liquid dye or ink, and these microcapsules 18C, 18M and 18Y are uniformly distributed over the layer of microcapsules 14'.

Figure 26:
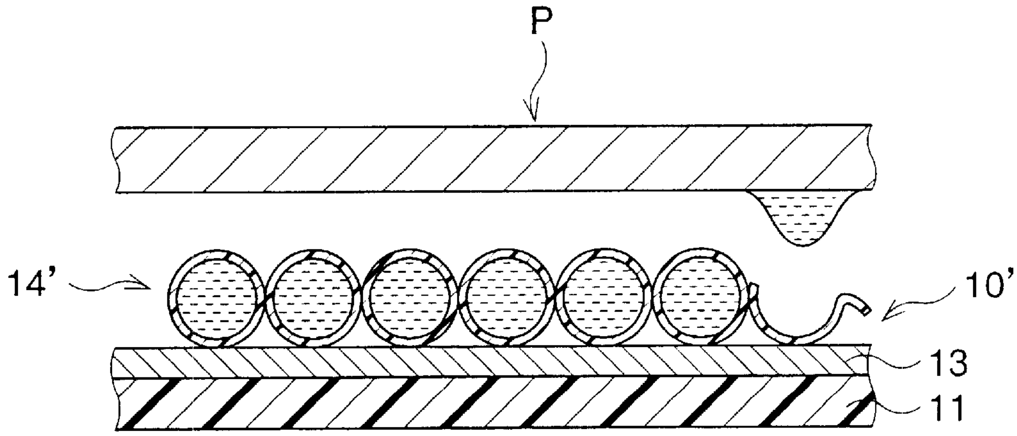
FIG. 26 is a schematic conceptual cross sectional view similar to FIG. 25, showing a transfer of a formed color image from the film type of image-forming substrate to a recording sheet of paper.

As shown in FIG. 26, the image-forming substrate 10' is used together with a recording sheet of paper P. Namely, the image-forming substrate 10', overlaid with the recording sheet of paper P, is fed in one of the above-mentioned various color printers, and the cyan, magenta and yellow microcapsules 18C, 18M and 18Y are selectively broken and squashed in accordance with respective digital color image-pixel signals. Thus, ink from the broken and squashed microcapsule is transferred from the image-forming substrate 10' to the recording sheet of paper P, as conceptually shown in FIG. 26. Namely, a color image is once formed on the image-forming substrate 10' in substantially the same manner as mentioned above, and then the formed color image is transferred to the recording sheet of paper P.

Figure 27:
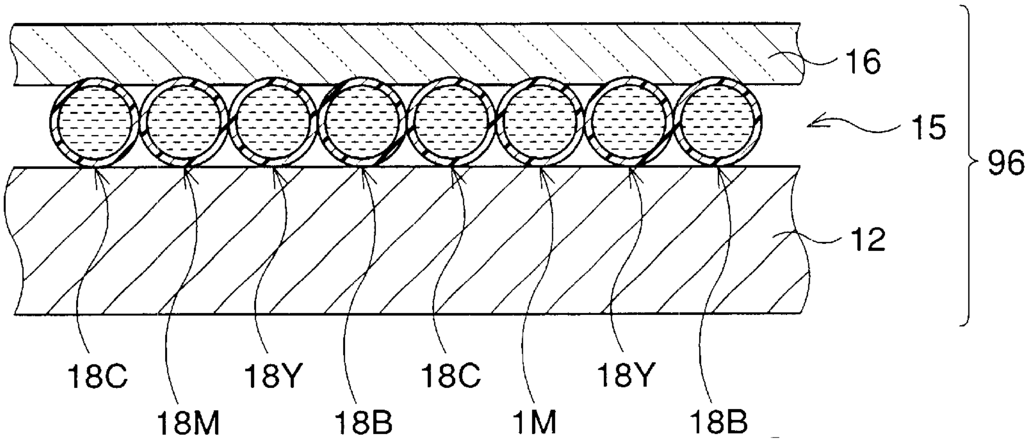
FIG. 27 is a schematic conceptual cross sectional view showing a third embodiment of an image-forming substrate, according to the present invention, comprising a layer of microcapsules including a first type of cyan microcapsules filled with a cyan ink, a second type of magenta microcapsules filled with a magenta ink, a third type of yellow microcapsules filled with a yellow ink and a fourth type of black microcapsules filled with a black ink.

FIG. 27 shows a third embodiment of an image-forming substrate, generally indicated by reference 96, which is substantially identical to the image-forming substrate 10, shown in FIG. 1, except that a layer of microcapsules 15 of the image-forming substrate 96 is different from the layer of microcapsules 14 of the image-forming substrate 10. Note, in FIG. 27, the features similar to those of FIG. 1 are indicated by the same references.

The layer of microcapsules 15 is formed from four types of microcapsules: a first type of microcapsules 18C filled with cyan liquid dye or ink, a second type of microcapsules 18M filled with magenta liquid dye or ink, a third type of microcapsules 18Y filled with yellow liquid dye or ink, and a fourth type microcapsules 18B filled with black dye or ink, and these microcapsules 18C, 18M, 18Y and 18B are uniformly distributed over the layer of microcapsules 15.

Of course, the cyan, magenta and yellow microcapsules 18C, 18M and 18Y are produced in the same manner as in the case of the image-forming substrate 10 of FIG. 1. As is apparent from a graph of FIG. 28, the respective shell resins of these cyan, magenta and yellow microcapsules 18C, 18M and 18Y exhibit the same shape memory characteristics as shown in the graph of FIG. 3. A shell of the black microcapsules 18B may be formed from a suitable synthetic resin not exhibiting a shape memory characteristic, but the synthetic resin concerned is thermally fused to beyond the upper limit temperature $T_{UL}$. Note, the synthetic resin, used as the shell of the black microcapsules 18B, is colored white.

As is well known, it is possible to produce black by mixing the three primary-colors: cyan, magenta and yellow, but, in reality, it is difficult to generate a true or vivid black by the mixing of the primary colors. Nevertheless, by using the image-forming substrate 96, a suitable black can be easily obtained.

Figure 29:
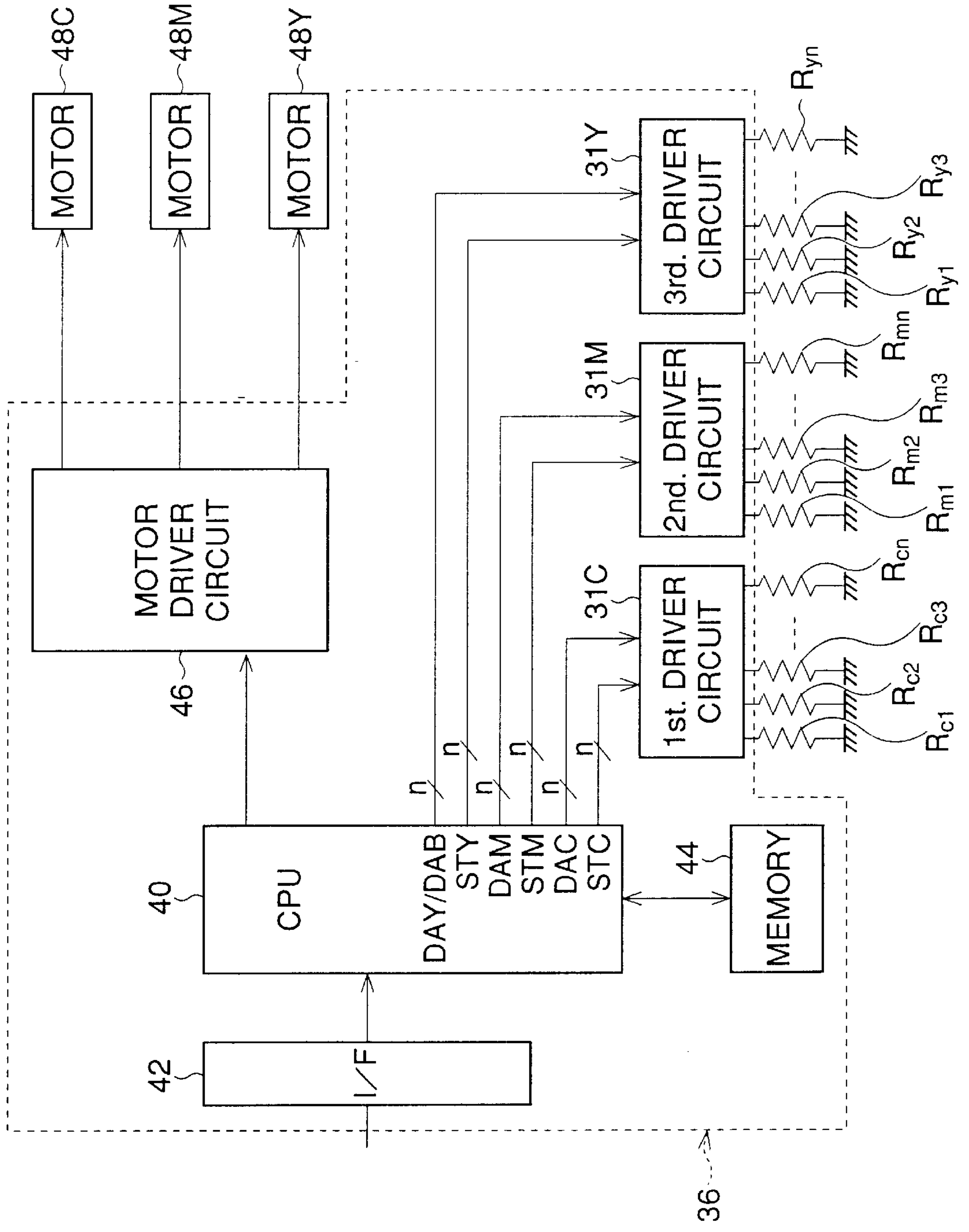
FIG. 29 is a schematic block diagram of a control board of a fifth embodiment of a color printer according to the present invention, for forming a color image on the image-forming substrate shown in FIG. 27.

A fifth embodiment of a color printer for forming a color image on the image-forming substrate 96 is substantially identical to the color printer, as shown in FIG. 6, except that the control circuit board 36 is modified to selectively break and compact the black microcapsules 18B. With reference to FIG. 29, there is shown a modified block diagram of the control circuit board 36 for the fifth embodiment of the color printer according to the present invention. Note, in FIG. 29, the features similar to those of FIG. 6 are indicated by the same references.

As is apparent from FIG. 29, a central processing unit (CPU) 40 outputs n sets of strobe signals "STC" and control signals "DAC" and n sets of strobe signals "STM" and control signals "DAM" to control a first driver circuit 31C and a second driver circuit 31M, respectively, whereby the electric resistance elements $R_{c1}$ to $R_{cn}$ and $R_{m1}$ to $R_{mn}$ are selectively heated in accordance with a single-line of digital cyan image-pixel signals and a single-line of digital magenta image-pixel signals, respectively, in the same manner as mentioned above.

Figure 30:
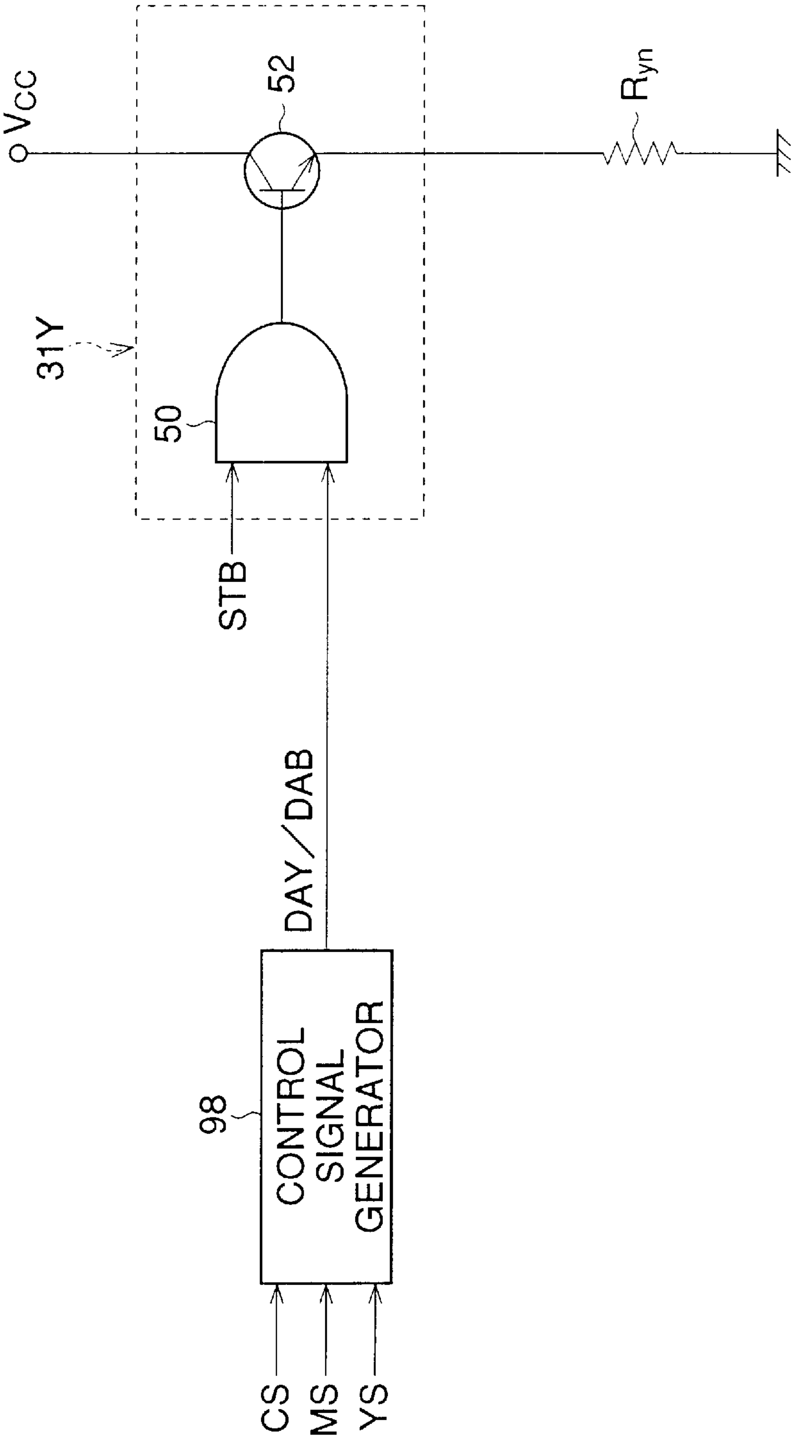
FIG. 30 is a partial block diagram representatively showing a set of an AND-gate circuit and a transistor included in a thermal head driver circuit of FIG. 29 for producing either a yellow dot or a black dot, and associated with a control signal generator included in a central processing unit of FIG. 29.

However, as shown in FIG. 29, a third driver circuit 31Y is controlled by n sets of strobe signals "STY" and control signals "DAY" or "DAB" outputted from the CPU 40. To this end, the CPU 40 includes n respective control signal generators, corresponding to the electric resistance elements $R_{y1}$ to $R_{yn}$, one of which is representatively shown and indicated by reference 98 in FIG. 30. The control signal generator 98 selectively generates one of the control signals "DAY" and "DAB" in accordance with a combination of three primary color digital image-pixel signals: a digital cyan image-pixel signal CS, a digital magenta image-pixel signal MS and a digital yellow image-pixel signal YS, inputted to the control signal generator 98.

Figure 32:
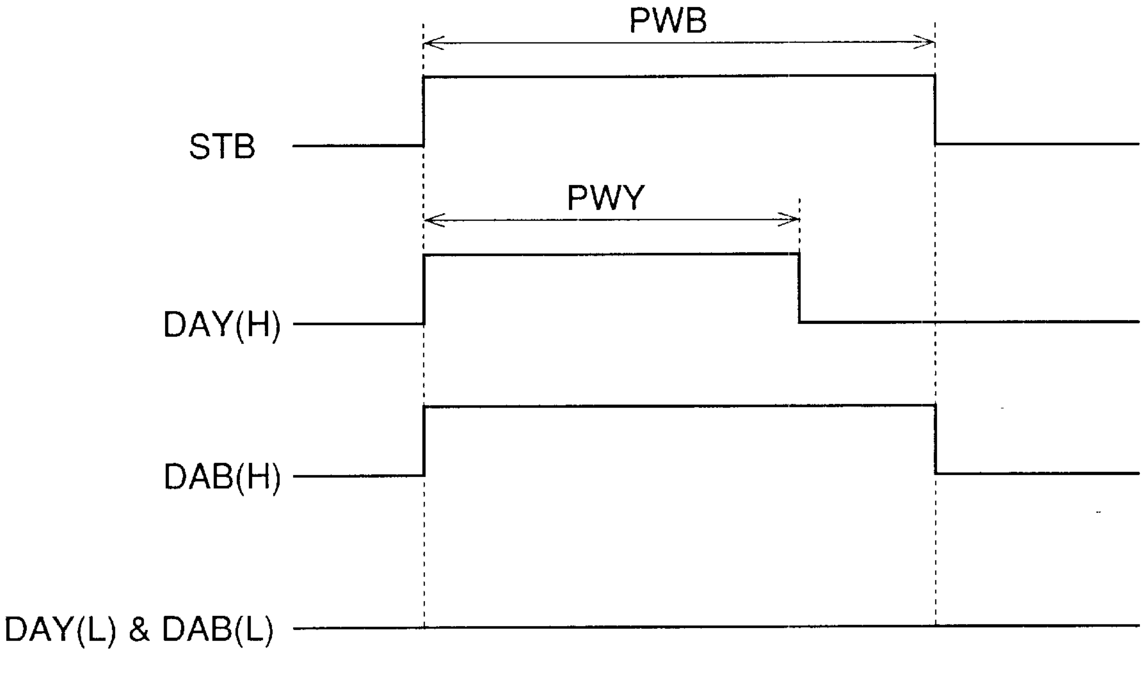
FIG. 32 is a timing chart showing a strobe signal and two kinds of control signals for electronically actuating the thermal head driver circuit for producing either the yellow dot or the black dot on the image-forming substrate of FIG. 27.

In particular, as is apparent from a table in FIG. 31, when the digital cyan image-pixel signal CS has a value "1", and when at least one of the digital magenta and yellow image-pixel signals MS and YS has a value "0", the control signal "DAY" is outputted from the control signal generator 98, and produces a high-level pulse having a pulse width "PWY", as shown in a timing chart of FIG. 32. Note, the pulse width "PWY" is equivalent to the pulse width "PWY" of the strobe signal "STY" shown in FIG. 12, and is shorter than a pulse width "PWB" of the strobe signal "STB". Accordingly, a corresponding electric resistance element ($R_{y1}$, . . . , $R_{yn}$) is electrically energized during a period corresponding to the pulse width "PWY". Namely, the resistance element concerned is heated to the temperature between the glass-transition temperature $T_3$ and the upper limit temperature $T_{UL}$, resulting in the production of a yellow dot on the image-forming sheet 96 due to the breakage and squashing of yellow microcapsules 18Y, which are locally heated by the electric resistance element concerned.

On the other hand, when all of the digital cyan, magenta and yellow image-pixel signals CS, MS and YS have the value "1", the control signal "DAB" is outputted from the control signal generator 98, and produces a high-level pulse having the same pulse width as the pulse width "PWB" of the strobe signal "STE", as shown in the timing chart of FIG. 32. Accordingly, a corresponding electric resistance element ($R_{y1}$, . . . , $R_{yn}$) is electrically energized during a period corresponding to the pulse width "PWB" of the strobe signal "STB", whereby the resistance element concerned is heated to more than the upper limit temperature $T_{UL}$, resulting in the production of a black dot on the image-forming sheet 96 due to the pressure exerted on the image-forming substrate 96 from the roller platen 32Y by the spring-biasing unit 34Y and due to the thermal fusion of the shell resin of the black microcapsules 18B, which are locally heated by the electric resistance element concerned.

Figure 28:
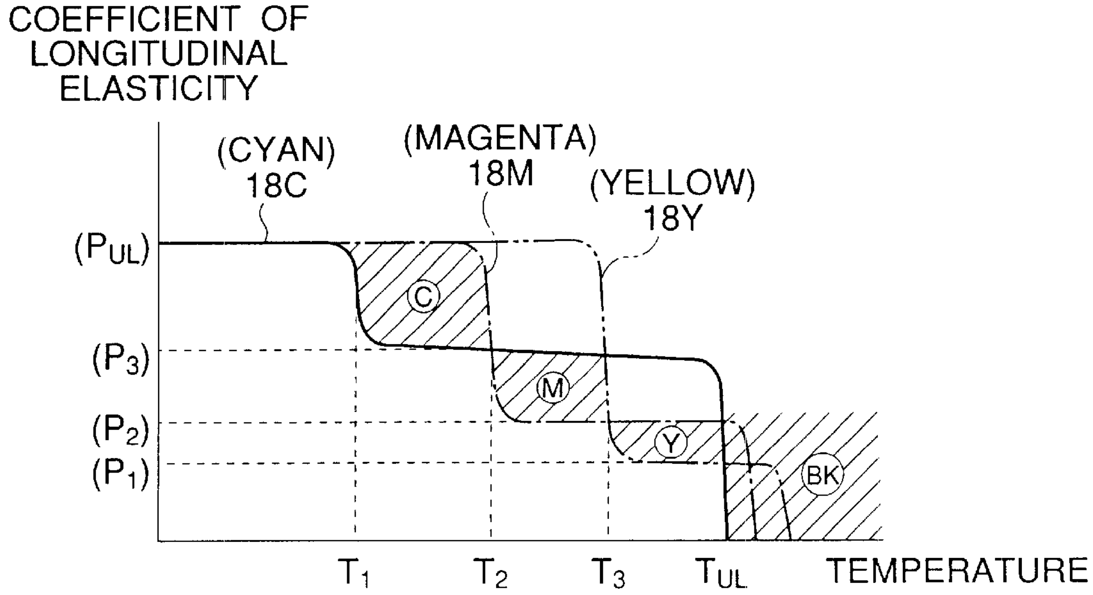
FIG. 28 is a graph showing temperature/pressure breaking characteristics of the respective cyan, magenta, yellow and black microcapsules shown in FIG. 27, with each of a cyan-producing area, a magenta-producing area, a yellow-producing area and a black-producing area being indicated as a hatched area.

By heating the electric resistance element concerned to more than the upper limit temperature $T_{UL}$, the coefficient of longitudinal elasticity of each shell resin of the cyan, magenta and yellow microcapsules 18C, 18M and 18Y may be lowered to zero as shown in the graph of FIG. 28. In this case, although all of the shell resins of the cyan, magenta and yellow microcapsules 18C, 18M and 18Y may be broken and squashed and/or may be thermally fused, the produced black dot cannot be substantially affected by the color inks derived from the broken and squashed and/or fused microcapsules, because the three-primary color inks combine to exhibit black.

On the contrary, when the cyan image-pixel signal CS has a value "0", an output of the control signal generator 98 is maintained at a low-level, i.e. both the control signals "DAY" and "DAB" are maintained at a low-level. Of course, in this case, a corresponding electric resistance element ($R_{y1}$, . . . , $R_{yn}$) cannot be electrically energized.

As is apparent from the foregoing, by using the above-mentioned color printer together with the image-forming substrate 96, it is possible to obtain a color image with a true or vivid black.

Figure 33:
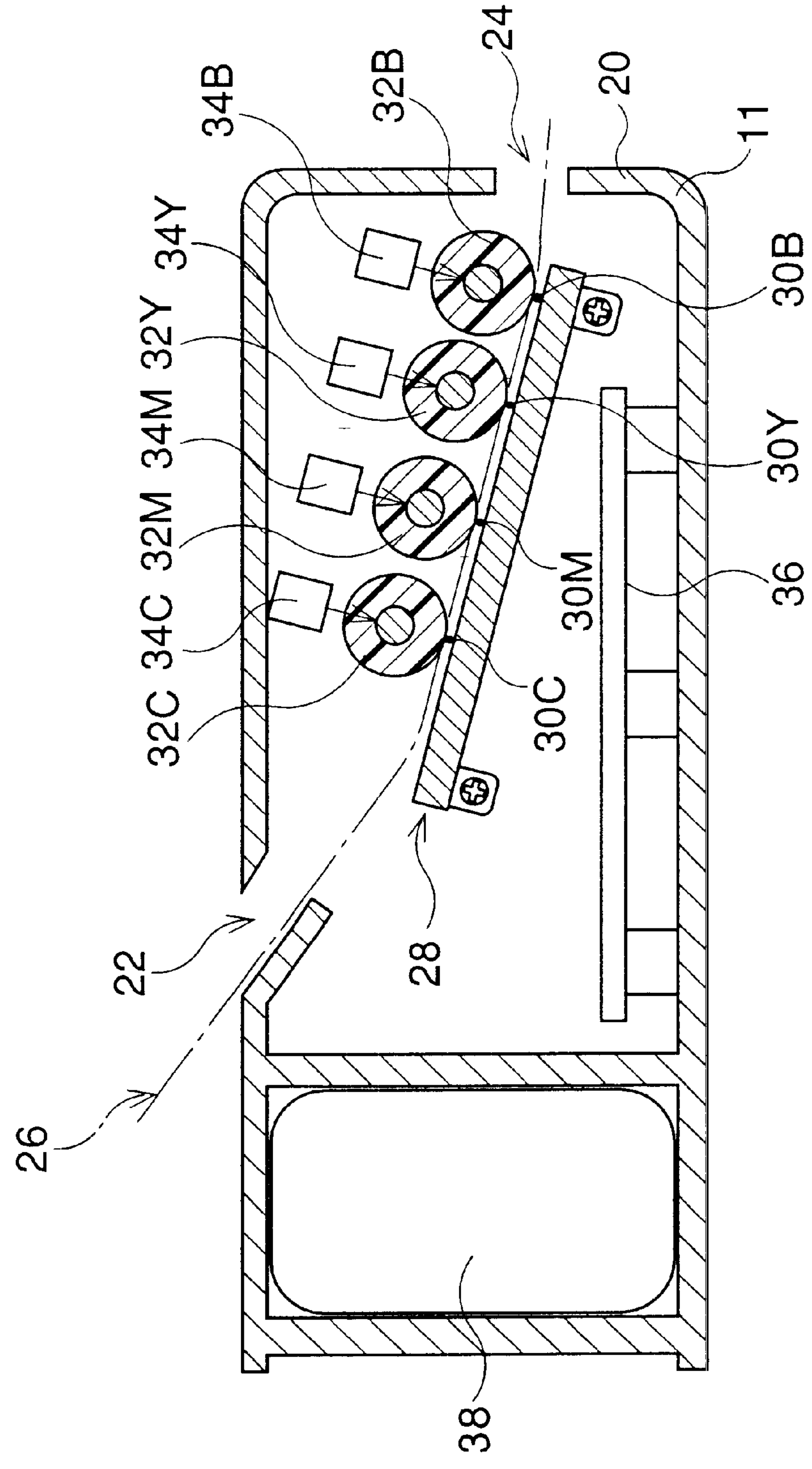
FIG. 33 is a schematic cross sectional view of a sixth embodiment of a color printer, according to the present invention, for forming a color image on the image-forming substrate shown in FIG. 27.

FIG. 33 schematically shows a sixth embodiment of a color printer according to the present invention, which is constituted as a line printer to form a color image on an image-forming substrate or sheet 96 as shown in FIG. 27.

This line color printer is substantially identical to the line color printer shown in FIG. 6, except that an additional line thermal head 30B, an additional roller platen 32B, and an additional spring-biasing unit 34B are further provided in the line printer of FIG. 6. Note, in FIG. 33, the features similar to those of FIG. 6 are indicated by the same references.

The additional or fourth line thermal head 30B is securely attached to the surface of the guide plate 28 adjacent to a third thermal head 30Y, and the additional or fourth roller platen 32B is associated with the additional or fourth spring-biasing unit 34B, so as to be pressed against the fourth thermal head 30B with a suitable pressure, being for example, less than the critical breaking pressure $P_1$ (FIG. 28).

Figure 34:
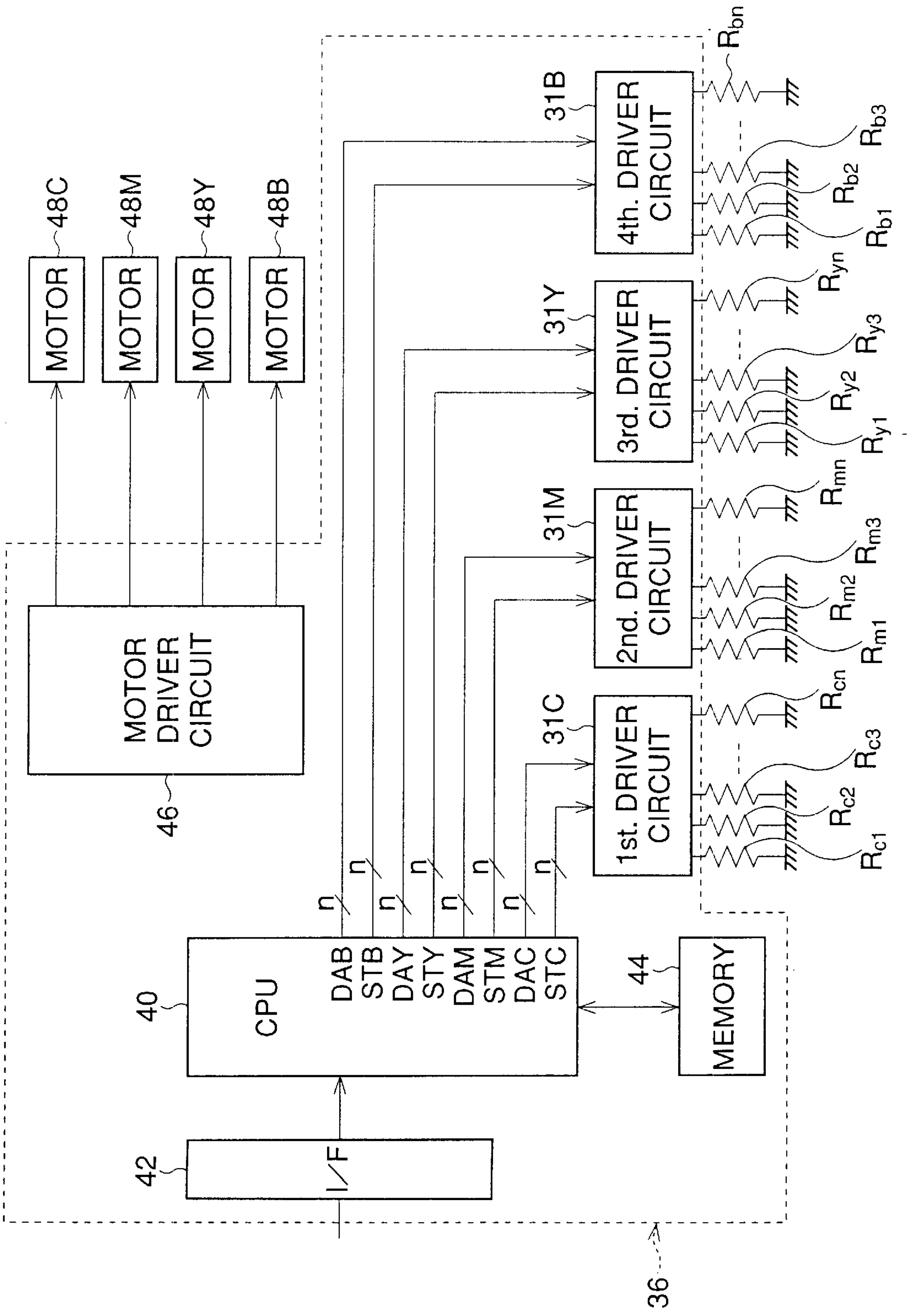
FIG. 34 is a schematic block diagram of a control board of the color printer shown in FIG. 33.

FIG. 34 shows a schematic block diagram of the control circuit board 36 shown in FIG. 33, which is substantially identical to the schematic block diagram of FIG. 8, except that a fourth driver circuit 31B for the fourth thermal head 30B, and an electric motor 48B for the fourth roller platen 32B, are further provided. The fourth thermal head 30B includes a plurality of heater elements or electric resistance elements $R_{b1}$ to $R_{bn}$, and these electric resistance elements are aligned with each other along a length of the line thermal head 30B. The electric resistance elements $R_{b1}$ to $R_{bn}$ are selectively energized by the fourth driver circuit 31B in accordance with three single-lines of cyan, magenta and yellow image-pixel signals, and are heated to a temperature beyond the upper limit temperature $T_{UL}$. Namely, the fourth driver circuit 31B is controlled by n sets of strobe signals "STB" and control signals "DAB", outputted from the CPU 40, thereby carrying out the selective energization of the electric resistance elements $R_{b1}$ $R_{bn}$.

Figure 35:
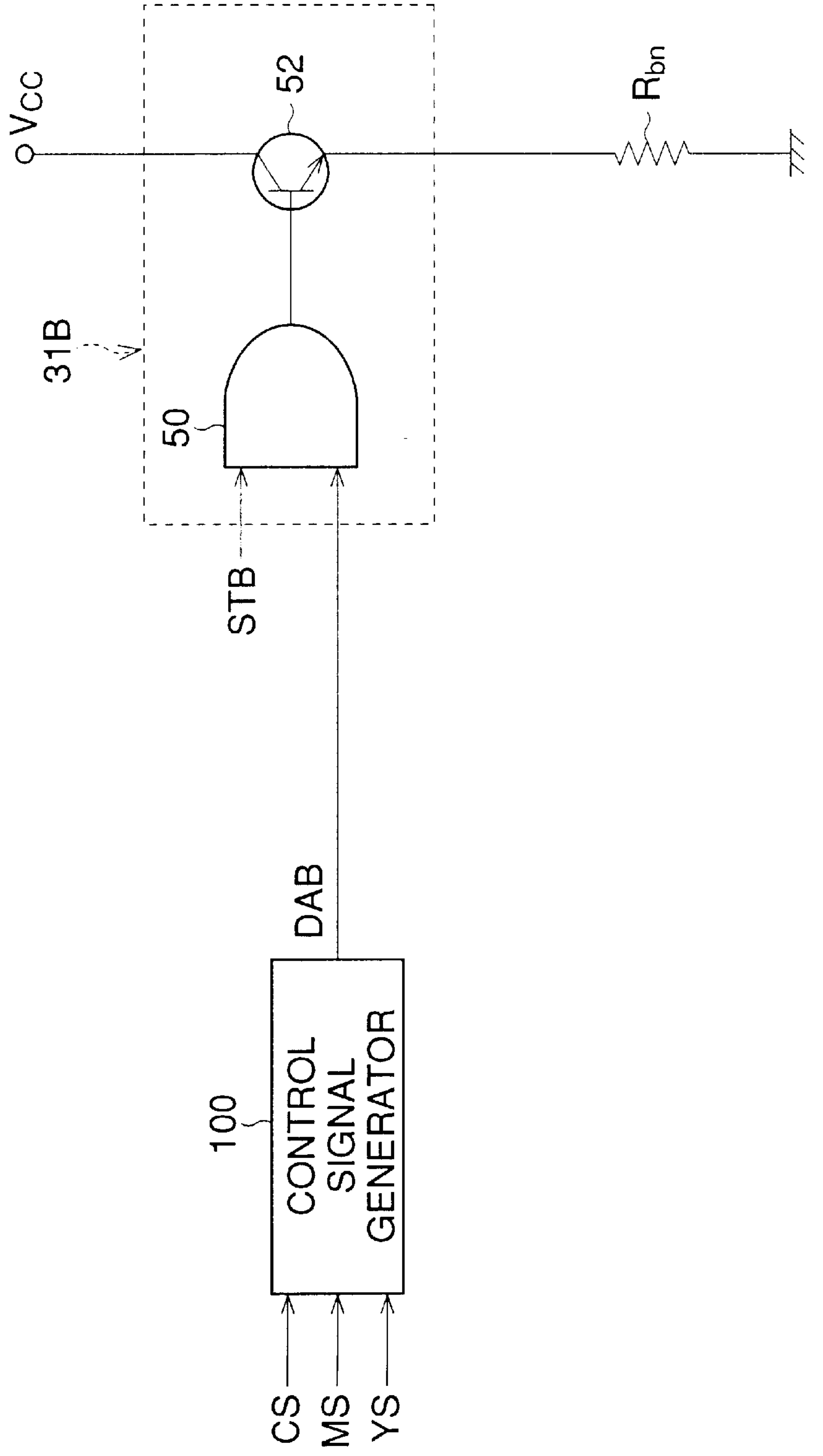
FIG. 35 is a partial block diagram representatively showing a set of an AND-gate circuit and a transistor, included in a thermal head driver circuit of FIG. 34 for producing a black dot, associated with a control signal generator included in a central processing unit of FIG. 34.

Similar to each of the driver circuits 31C, 32M and 31Y (FIG. 9), in the fourth driver circuit 31B, n sets of AND-gate circuits and transistors are provided with respect to the electric resistance elements $R_{bn}$, respectively. With reference to FIG. 35, similar to FIG. 9, an AND-gate circuit and a transistor in one set are representatively shown and indicated by references 50 and 52, respectively. Also, the CPU 40 includes n respective control signal generators, corresponding to the electric resistance elements $R_{b1}$ to $R_{bn}$, one of which is representatively shown and indicated by reference 100 in FIG. 35.

The control signal generator 100 generates a control signal "DAB" in accordance with a combination of three-primary color digital image-pixel signals: a digital cyan image-pixel signal CS, a digital magenta image-pixel signal MS and a digital yellow image-pixel signal YS, inputted to the control signal generator 100. Namely, when at least one of the digital cyan, magenta and yellow image-pixel signals CS, MS and YS has a value “0”, the control signal “DAB”, outputted from the control signal generator 100, is maintained at a low-level, as shown in a timing chart of FIG. 36, so that a corresponding electric resistance element ($R_{b1}$, . . . , $R_{bn}$) cannot be electrically energized.

Figure 36:
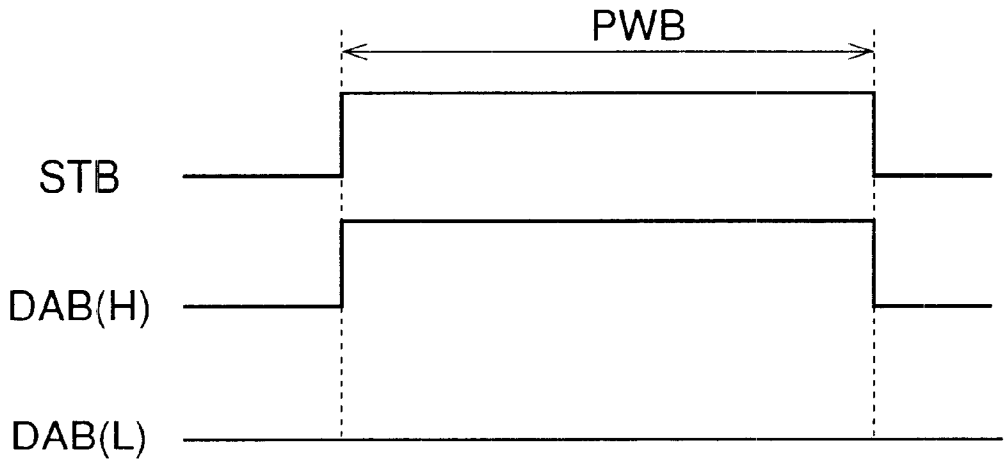
FIG. 36 is a timing chart showing a strobe signal and a control signal for electronically actuating the thermal head driver circuit for producing the black dot on the image-forming substrate of FIG. 27.

On the other hand, when all of the digital cyan, magenta and yellow image-pixel signals CS, MS and YS have a value “1”, the control signal “DAB”, outputted from the control signal generator 100, produces a high-level pulse having the same pulse width as a pulse width “PWB” of a strobe signal “STB”, as shown in the timing chart of FIG. 36, so that a corresponding electric resistance element ($R_{b1}$ . . . , $R_{bn}$) is electrically energized during a period corresponding to the pulse width “PWB”. Namely, the electric resistance element ($R_{b1}$, . . . , $R_{bn}$) is heated to the temperature beyond the upper limit temperature $T_{UL}$, resulting in the production of a black dot on the image-forming sheet 96 due to the thermal fusion of the shell resin of the black microcapsules 18B, which are locally heated by the electric resistance element concerned.

Figure 37:
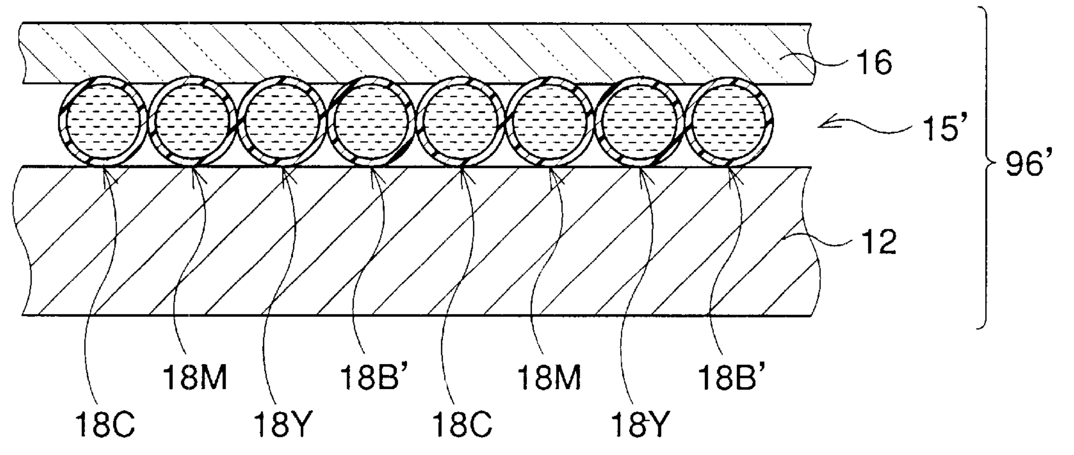
FIG. 37 is a schematic conceptual cross sectional view showing a fourth embodiment of an image-forming substrate, according to the present invention, comprising a layer of microcapsules which is substantially identical to the layer of microcapsules of FIG. 27, except that a fourth type of black microcapsules filled with a black ink is different from the fourth type of black microcapsules shown in FIG. 27.

FIG. 37 shows a fourth embodiment of an image-forming substrate, generally indicated by reference 96', which is substantially identical to the image-forming substrate 96, shown in FIG. 27, except that a layer of microcapsules 15' of the image-forming substrate 96' is different from the layer of microcapsules 15 of the image-forming substrate 96. Note, in FIG. 37, the features similar to those of FIG. 27 are indicated by the same references.

Similar to the layer of microcapsules 15, the layer of microcapsules 15' is formed from four types of microcapsules: a first type of microcapsules 18C filled with cyan liquid dye or ink, a second type of microcapsules 18M filled with magenta liquid dye or ink, a third type of microcapsules 18Y filled with yellow liquid dye or ink, and a fourth type microcapsules 18B' filled with black dye or ink, and these microcapsules 18C, 18M, 18Y and 18B' are uniformly distributed in the layer of microcapsules 15'.

Of course, the cyan, magenta and yellow microcapsules 18C, 18M and 18Y are produced in the same manner as those used for the image-forming substrate 10 of FIG. 1. As is apparent from a graph of FIG. 38, the respective shell resins of these cyan, magenta and yellow microcapsules 18C, 18M and 18Y exhibit the same shape memory characteristics as shown in the graph of FIG. 3. A shell of the black microcapsules 18B' may be formed from a suitable synthetic resin, which does not exhibit a shape memory characteristic, but the synthetic resin concerned is physically broken and compacted when a pressure in excess of the upper limit pressure $P_{UL}$ is applied. Note, the synthetic resin, used as the shell of the black microcapsules 18B', is colored white.

A seventh embodiment of a color printer for forming a color image on the image-forming substrate 96' is substantially identical to the color printer shown in FIG. 33, except that an array of piezoelectric elements is substituted for the fourth line thermal head 30B to selectively break and compact the black microcapsules 18B'.

Figure 38:
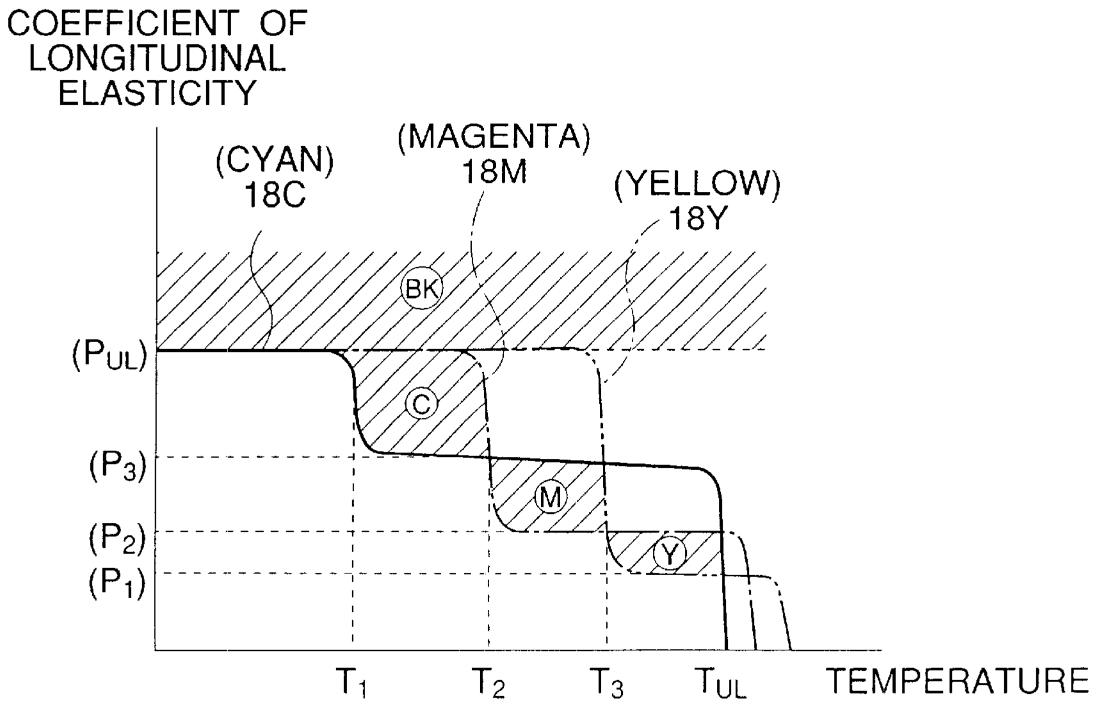
FIG. 38 is a graph showing temperature/pressure breaking characteristics of the respective cyan, magenta, yellow and black microcapsules shown in FIG. 37, with each of a cyan-producing area, a magenta-producing area, a yellow-producing area and a black producing area being indicated as a hatched area.
Figure 39:
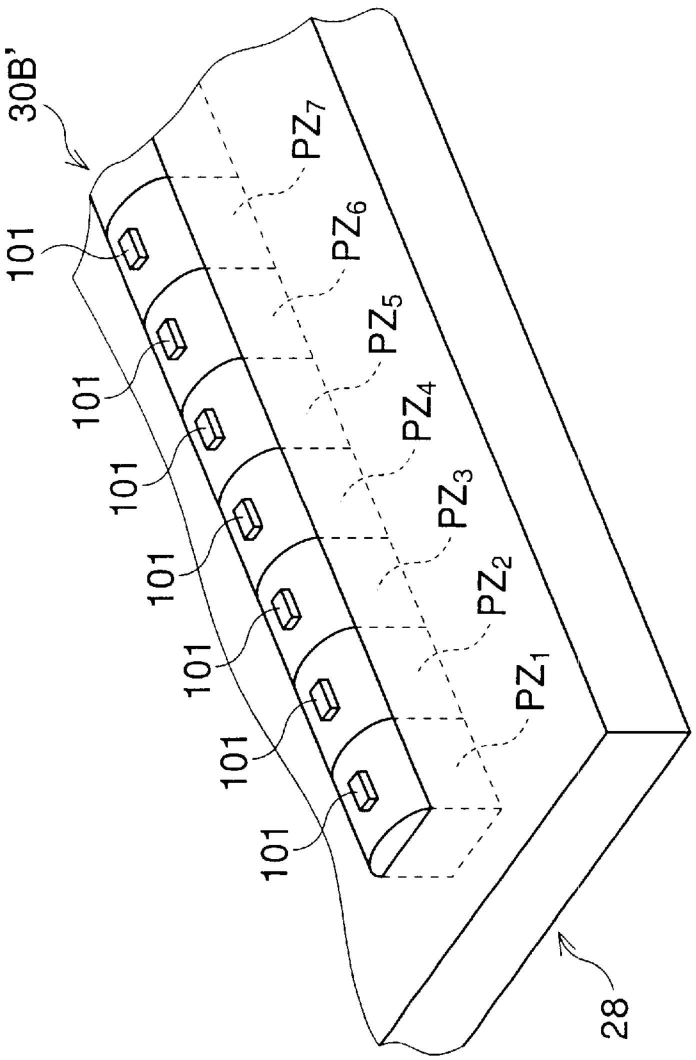
FIG. 39 is a partial perspective view showing an array of piezoelectric elements used in a seventh embodiment of a color printer, according to the present invention, for producing a black dot on the image-forming substrate shown in FIG. 37.

With reference to FIG. 39, the array of piezoelectric elements is indicated by reference 30B', and includes n piezoelectric elements. Note, in this drawing, a part of the n piezoelectric elements are indicated by references $PZ_1$ to $PZ_7$, respectively. The piezoelectric elements $PZ_1$ to $PZ_n$ are embedded in a guide plate 28 (FIG. 33), and are laterally aligned with each other with respect to a path 26 (FIG. 33), along which the image-forming substrate 96' passes. Each of the piezoelectric elements $PZ_1$ to $PZ_n$ has a cylindrical top surface which is formed with a small projection 101 for producing a dot on the image-forming substrate 96'. Similar to the fourth line thermal head 30B, shown in FIG. 33, a forth roller platen 32B is pressed against the array of piezoelectric elements 30B' by a fourth spring-biasing unit 34B with a suitable pressure, being, for example, less than the critical breaking pressure $P_1$ (FIG. 38).

Figure 40:
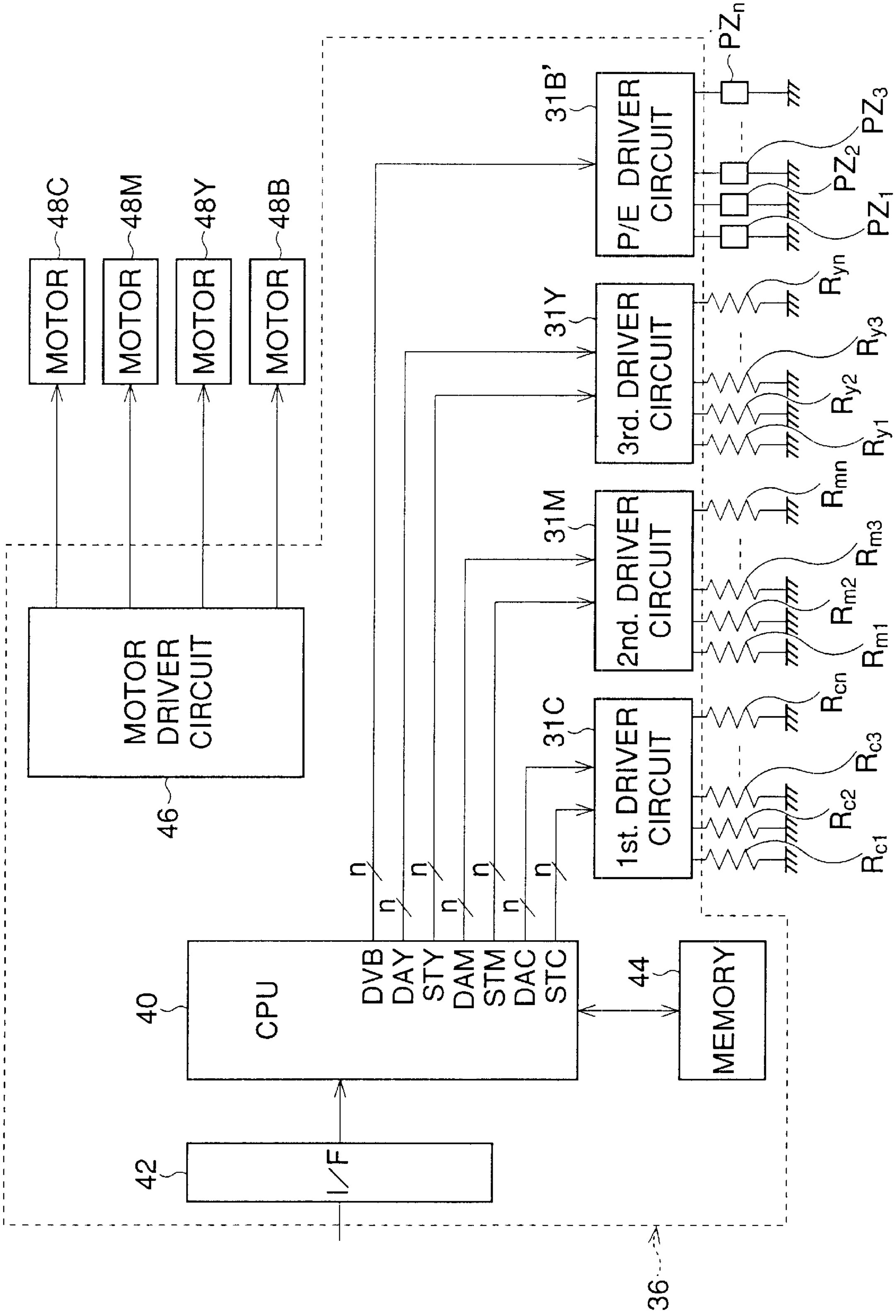
FIG. 40 is a schematic block diagram of a control board of the seventh embodiment of the color printer according to the present invention, for forming a color image on the image-forming substrate shown in FIG. 37.

FIG. 40 shows a modified block diagram of the control circuit board 36 shown in FIG. 34, for the seventh embodiment of the color printer according to the present invention, in which a P/E driver circuit 31B' is substituted for the fourth driver circuit 31B, to selectively drive the piezoelectric elements $PZ_1$ to $PZ_n$.

The piezoelectric elements $PZ_1$ to $PZ_n$ are selectively energized by the P/E driver circuit 31B' in accordance with three single-lines of cyan, magenta and yellow image-pixel signals, and the P/E driver circuit 31B' is controlled by n control signals “DVB”, outputted from a central processing unit (CPU) 40, which initiate the selective energization of the piezoelectric elements $PZ_1$ to $PZ_n$.

Figure 41:
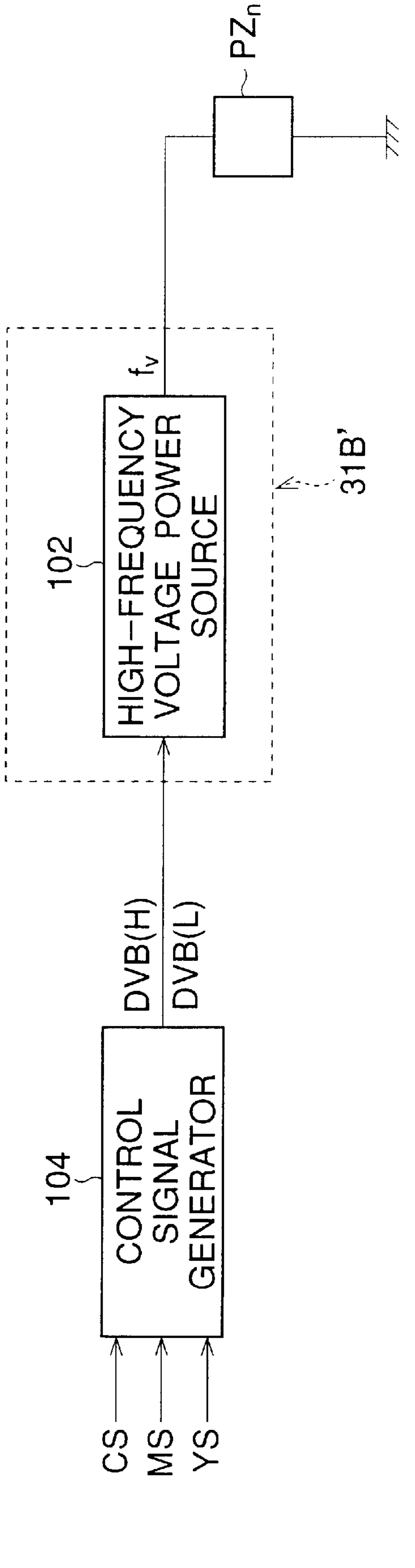
FIG. 41 is a partial block diagram representatively showing a high-frequency voltage power source, included in a P/E driver circuit of FIG. 40 for producing a black dot, associated with a control signal generator included in a central processing unit of FIG. 40.

In particular, in the P/E driver circuit 31B', n high-frequency voltage power sources are provided with respect to the piezoelectric elements $PZ_1$ to $PZ_n$, respectively. With reference to FIG. 41, a high-frequency voltage power source is representatively shown and indicated by reference 102. Also, the CPU 40 includes n respective control signal generators, corresponding to the n high-frequency voltage power sources 102, one of which is representatively shown and indicated by reference 104 in FIG. 41.

The control signal generator 104 generates a control signal “DVB” in accordance with a combination of three-primary color digital image-pixel signals: a digital cyan image-pixel signal CS, a digital magenta image-pixel signal MS and a digital yellow image-pixel signal YS, inputted to the control signal generator 104. Namely, when at least one of the digital cyan, magenta and yellow image-pixel signals CS, MS and YS has a value “0”, the control signal “DVB”, outputted from the control signal generator 104, is maintained at a low-level. In this case, the high-frequency voltage power source 102 outputs no high-frequency voltage to a corresponding piezoelectric element ($PZ_n$), and thus the piezoelectric element concerned is not electrically energized.

On the other hand, when all of the digital cyan, magenta and yellow image-pixel signals CS, MS and YS have a value “1”, the control signal “DVB”, outputted from the control signal generator 104, is changed from a low-level to a high-level. In this case, a high-frequency voltage $f_v$ is outputted from the high-frequency voltage power source 102 to a corresponding piezoelectric element ($PZ_n$), and thus the piezoelectric element concerned is electrically energized so as to exert an alternating pressure on the image-forming substrate 96'. Of course, a magnitude of the high-frequency voltage $f_v$ is previously determined such that an effective pressure value of the alternating pressure is beyond the upper limit pressure $P_{UL}$. Thus, a black dot is produced on the image-forming sheet 96', due to the physical breakage of the shell resin of the black microcapsules 18B', on which the pressure, being beyond the upper limit pressure $P_{UL}$, is exerted by the piezoelectric element concerned.

Figure 42:
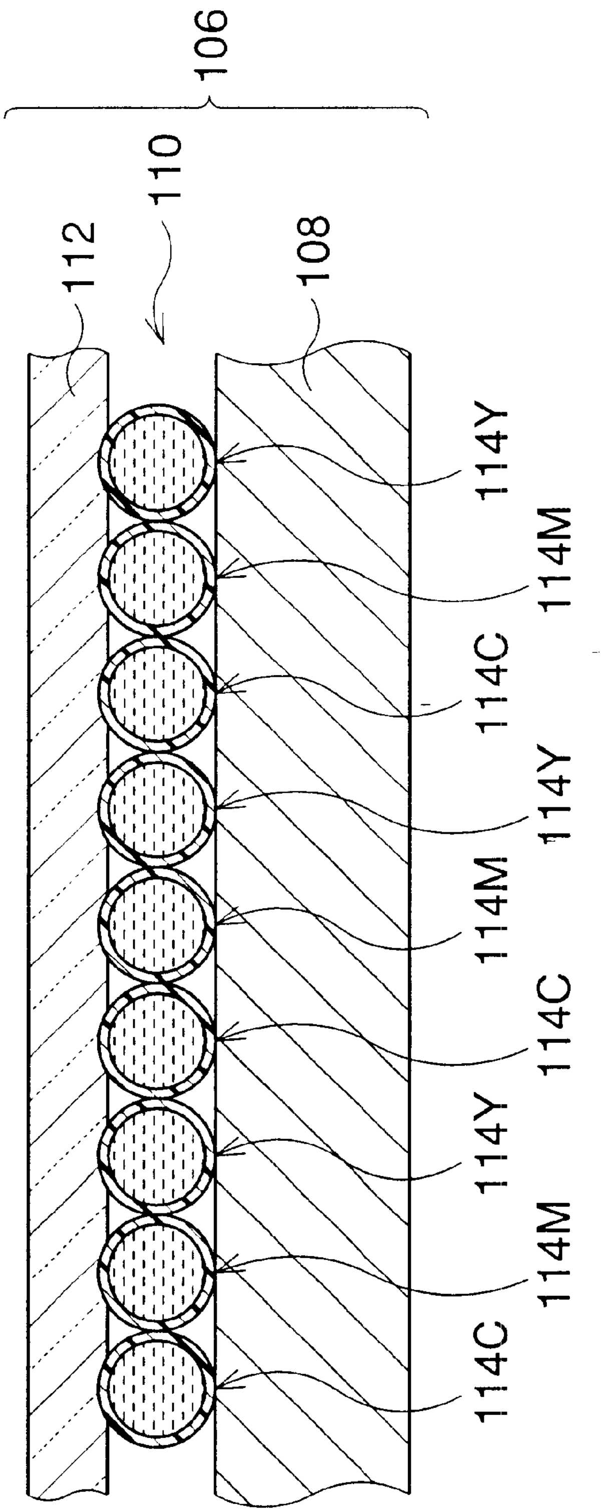
FIG. 42 is a schematic conceptual cross sectional view showing a fifth embodiment of an image-forming substrate, according to the present invention, comprising a layer of microcapsules including a first type of cyan microcapsules filled with a cyan ink, a second type of magenta microcapsules filled with a magenta ink and a third type of yellow microcapsules filled with a yellow ink.

FIG. 42 shows a fifth embodiment of an image-forming substrate, generally indicated by reference 106, according to the present invention. The image-forming substrate 106 is similar in construction to the image-forming substrate 10 of FIG. 1. Namely, the image-forming substrate 106 comprises a sheet of paper 108, a layer of microcapsules 110 coated over a surface of the sheet of paper 108, and a sheet of protective transparent film 112 covering the layer of microcapsules 110. Also, similar to the first embodiment of FIG. 1, the layer of microcapsules 110 is formed from three types of microcapsules: a first type of microcapsules 114C filled with cyan liquid dye or ink, a second type of microcapsules 114M filled with magenta liquid dye or ink, and a third type of microcapsules 114Y filled with yellow liquid dye or ink, and these microcapsules 114C, 114M and 114Y are uniformly distributed in the layer of microcapsules 14.

Figure 43:
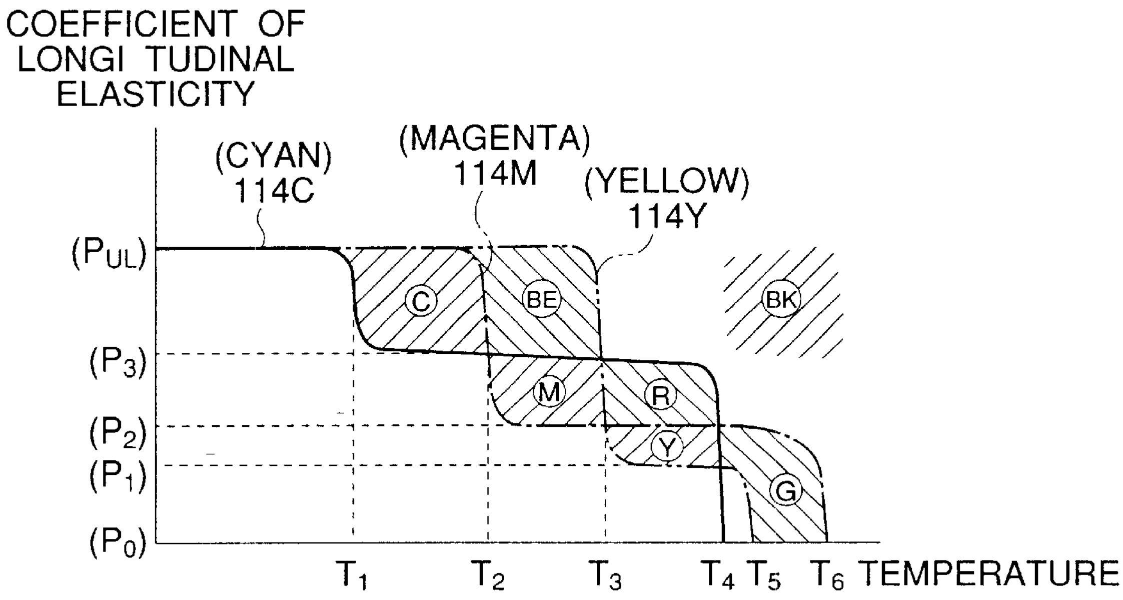
FIG. 43 is a graph showing temperature/pressure breaking characteristics of the respective cyan, magenta and yellow microcapsules shown in FIG. 42, with each of a cyan-producing area, a magenta-producing area, a yellow-producing area, a blue-producing area, a red-producing area, a green producing area and a black-producing area being indicated as a hatched area.

In short, as shown in a graph of FIG. 43, the image-forming substrate 106 is different from the image-forming substrate 10 in that a shape memory resin of the cyan microcapsules 114C exhibits a characteristic longitudinal elasticity coefficient indicated by a solid line; a shape memory resin of the magenta microcapsules 114M exhibits a characteristic longitudinal elasticity coefficient indicated by a single-chained line; and a shape memory resin of the yellow microcapsules 18Y exhibits a characteristic longitudinal elasticity coefficient indicated by a double-chained line.

In particular, the shape memory resin of the cyan microcapsules 114C has a glass-transition temperature $T_1$, and loses a rubber elasticity when being heated to a temperature $T_4$, whereby the shape memory resin concerned is thermally fused or plastified. Also, the shape memory resin of the magenta microcapsules 114M has a glass-transition temperature $T_2$, and loses a rubber elasticity when being heated to a temperature $T_6$, whereby the shape memory resin concerned is thermally fused or plastified. Similarly, the shape memory resin of the yellow microcapsules 114Y has a glass-transition temperature $T_3$, and loses a rubber elasticity when being heated to a temperature $T_5$, whereby the shape memory resin concerned is thermally fused or plastified.

Also, as is apparent from the graph of FIG. 43, the shell wall of the cyan microcapsules 114C is broken and compacted under a breaking pressure that lies between a critical breaking pressure $P_3$ and an upper limit pressure $P_{UL}$ (FIG. 43), when each cyan microcapsule 114C is heated to a temperature between the glass-transition temperatures $T_1$ and $T_2$. Similarly, the shell wall of the magenta microcapsules 114M is broken and compacted under a breaking pressure that lies between a critical breaking pressure $P_2$ and the critical breaking pressure $P_3$ (FIG. 43), when each magenta microcapsule 114M is heated to a temperature between the glass-transition temperatures $T_2$ and $T_3$, and the shell wall of the yellow microcapsules 114Y is broken and compacted under a breaking pressure that lies between a critical breaking pressure $P_1$ and the critical breaking pressure $P_2$ (FIG. 43), when each yellow microcapsule 114Y is heated to a temperature between the glass-transition temperature $T_3$ and the plastifying temperature $T_4$ of cyan.

Further, the shell walls of the cyan and magenta microcapsules 114C and 114M are broken and compacted under a breaking pressure that lies between the critical breaking pressure $P_3$ and the upper limit pressure $P_{UL}$, when the cyan and magenta microcapsules 114C and 114M are heated to a temperature between the glass-transition temperatures $T_2$ and $T_3$. The shell walls of the magenta and yellow microcapsules 114M and 114Y are broken and compacted under a breaking pressure that lies between the critical breaking pressures $P_2$ and $P_3$, when the magenta and yellow microcapsules 114M and 114Y are heated to a temperature between the glass-transition temperatures $T_3$ and the plastifying temperature $T_4$ of cyan. The shell walls of the cyan and yellow microcapsules 114C and 114Y are thermally fused or easily broken and compacted under a breaking pressure that lies between a critical pressure $P_0$ and the critical breaking pressure $P_1$, when the cyan and yellow microcapsules 114C and 114Y are heated to a temperature between the plastifying temperatures $T_5$ and $T_6$ of yellow and magenta, respectively. In addition, the shell walls of the cyan, magenta and yellow microcapsules 114C, 114M and 114Y are thermally fused or easily broken and compacted under a breaking pressure that lies between the critical breaking pressure $P_3$ and the upper limit pressure $P_{UL}$, when the cyan, magenta and yellow microcapsules 114C, 114M and 114Y are heated to at least the plastifying temperature $T_4$.

As is apparent from the foregoing, by suitably selecting a heating temperature and a breaking pressure, which should be exerted on the image-forming sheet 106, it is possible to selectively fuse and/or break the cyan, magenta and yellow microcapsules 114C, 114M and 114Y.

For example, if the selected heating temperature and breaking pressure fall within a hatched cyan area C (FIG. 43), defined by a temperature range between the glass-transition temperatures $T_1$ and $T_2$ and by a pressure range between the critical breaking pressure $P_3$ and the upper limit pressure $P_{UL}$, only the cyan microcapsules 114C are broken and squashed, thereby producing cyan. If the selected heating temperature and breaking pressure fall within a hatched magenta area M, defined by a temperature range between the glass-transition temperatures $T_2$ and $T_3$ and by a pressure range between the critical breaking pressures $P_2$ and $P_3$, only the magenta microcapsules 114M are broken and squashed, thereby producing magenta. If the selected heating temperature and breaking pressure fall within a hatched yellow area Y, defined by a temperature range between the glass-transition temperature $T_3$ and the plastifying temperature $T_4$ and by a pressure range between the breaking pressures $P_1$ and $P_2$, only the yellow microcapsules 114Y are broken and squashed, thereby producing yellow.

Also, if the selected heating temperature and breaking pressure fall within a hatched blue area BE, defined by a temperature range between the glass-transition temperatures $T_2$ and $T_3$ and by a pressure range between the critical breaking pressure $P_3$ and the upper limit pressure $P_{UL}$, the cyan and magenta microcapsules 114C and 114M are broken and squashed, thereby producing blue. If the selected heating temperature and breaking pressure fall within a hatched red area R, defined by a temperature range between the glass-transition temperature $T_3$ and the plastifying temperature $T_4$ and by a pressure range between the breaking pressures $P_2$ and $P_3$, the magenta and yellow microcapsules 114M and 114Y are broken and squashed, thereby producing red. If the selected heating temperature and breaking pressure fall within a hatched green area G, defined by a temperature range between the plastifying temperatures $T_5$ and $T_6$ and by a pressure range between the critical pressures $P_0$ and $P_1$ or $P_2$, the cyan and yellow microcapsules 114C and 114Y are thermally fused or easily broken, thereby producing green. If the selected heating temperature and breaking pressure fall within a hatched black area BK, generally defined by a temperature range between the plastifying temperatures $T_4$ and $T_6$ and by a pressure range between the critical pressure $P_3$ and the upper limit pressure $P_{UL}$, the cyan, magenta and yellow microcapsules 114C, 114M and 114Y are thermally fused and/or easily broken, thereby producing black.

Accordingly, if the selection of a heating temperature and a breaking pressure, which should be exerted on the image-forming sheet 106, is suitably controlled in accordance with digital color image-pixel signals: digital cyan image-pixel signals, digital magenta image-pixel signals and digital yellow image-pixel signals, it is possible to form a color image on the image-forming sheet 106 on the basis of the digital color image-pixel signals.

Figure 44:
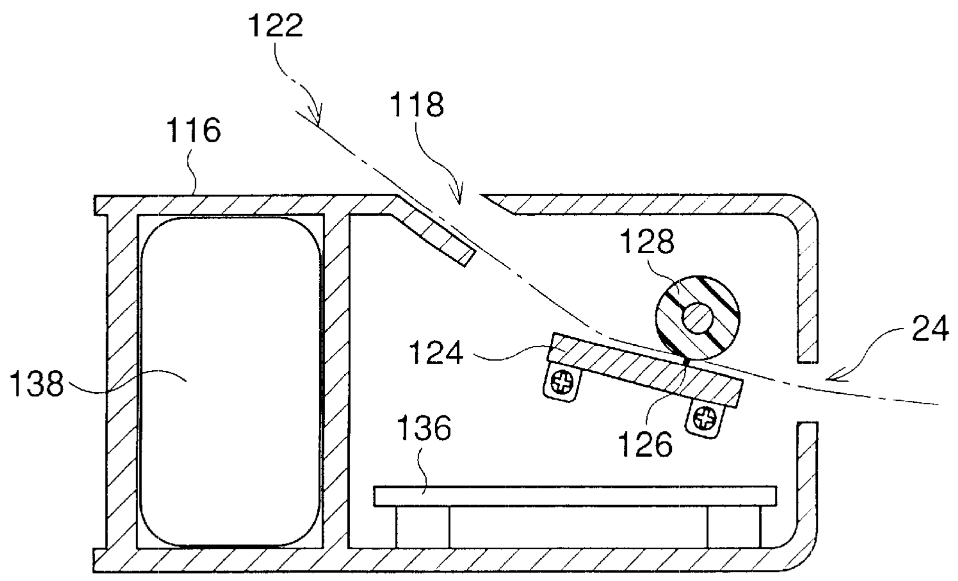
FIG. 44 is a schematic cross sectional view of an eighth embodiment of a color printer, according to the present invention, for forming a color image on the image-forming substrate shown in FIG. 42.

FIG. 44 schematically shows an eighth embodiment of a color printer according to the present invention, which is constituted as a line printer so as to form a color image on the image-forming sheet 106.

The color printer comprises a rectangular parallelopiped housing 116 having an entrance opening 118 and an exit opening 120 formed in a top wall and a side wall of the housing 116, respectively. The image-forming sheet 106 is introduced into the housing 116 through the entrance opening 118, and is then discharged from the exit opening 120 after the formation of a color image on the image-forming sheet 106. Note, in FIG. 44, a path 122 for movement of the image-forming sheet 106 is indicated by a chained line.

A guide plate 124 is provided in the housing 116 so as to define a part of the path 122 for the movement of the image-forming sheet 106, and a thermal head 126 is securely attached to a surface of the guide plate 124. The line thermal head 126 is associated with a roller platen 128, which is rotatably and suitably supported so as to be in contact with the line thermal head 126. The thermal head 126 is a line thermal head perpendicularly extended with respect to a direction of the movement of the image-forming sheet 106.

Figure 45:
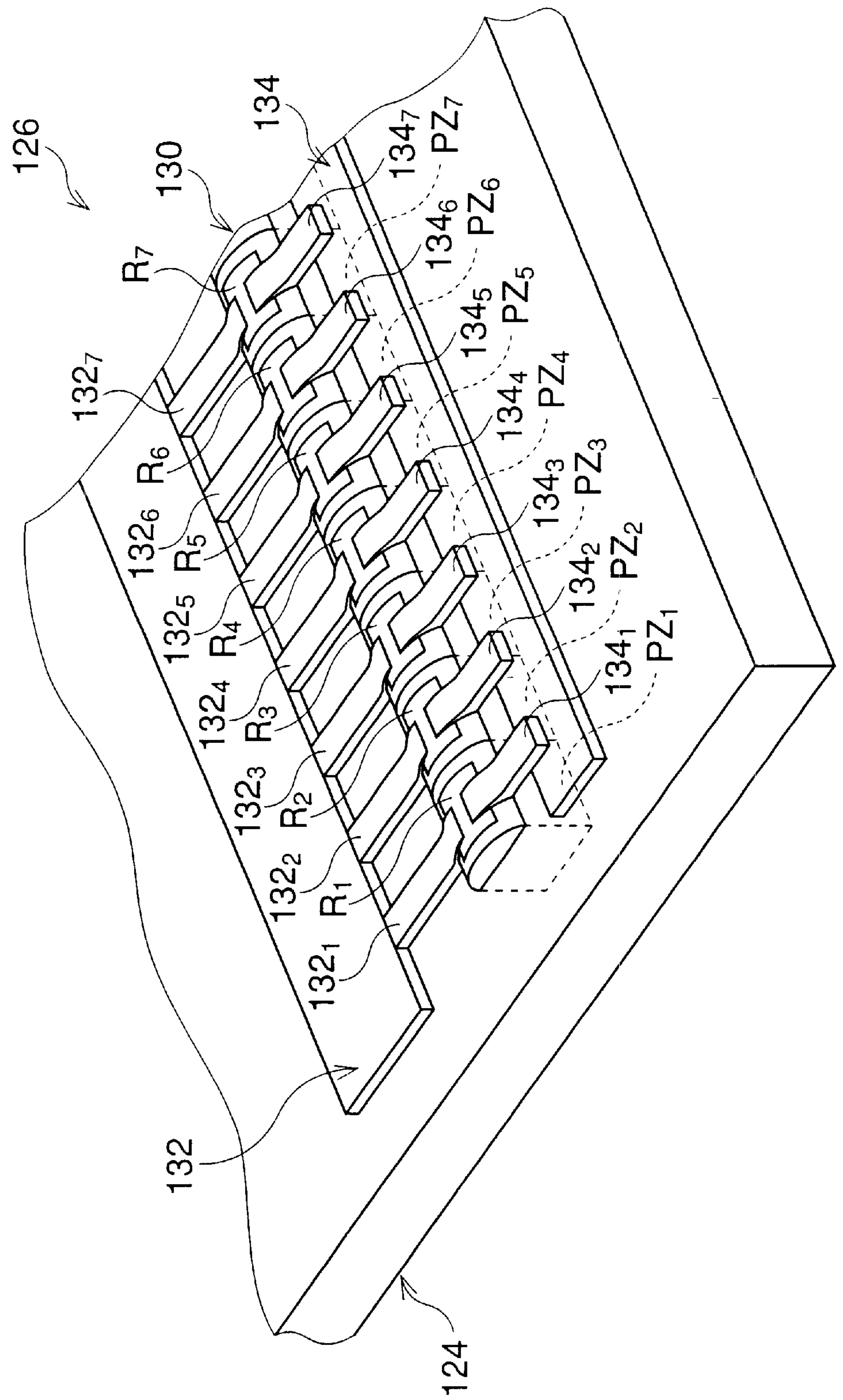
FIG. 45 is a partial perspective view showing a thermal head having an array of piezoelectric elements, used in the eighth embodiment of the color printer, according to the present invention.

As shown in FIG. 45, the line thermal head 126 comprises an array of piezoelectric elements 130, which includes n piezoelectric elements. Note, in this drawing, a part of the n piezoelectric elements are indicated by references $PZ_1$ to $PZ_7$, respectively. The piezoelectric elements $PZ_1$ to $PZ_n$ are embedded in the guide plate 124, and are laterally aligned with each other with respect to the path 122, along which the image-forming substrate 106 passes.

Each of the piezoelectric elements $PZ_1$ to $PZ_n$ has a cylindrical top surface on which an electric resistance element ($R_1, \ldots, R_n$) is formed. Two wiring boards 132 and 134 are provided at sides of the array of piezoelectric elements 130, and n sets of electrodes (132$_1$, . . . , 132$_n$; 134$_1$, . . . , 134$_n$) are extended from the respective wiring boards 132 and 134. The extended electrodes (132$_n$; 134$_n$) in each set are electrically connected to a corresponding electric resistance element ($R_n$), such that a heating area is defined between the electrical connections, and thus serves as a dot producing area.

Note, in FIG. 44, reference 136 indicates a control circuit board for controlling a printing operation of the color printer, and reference 138 indicates an electrical main power source for electrically energizing the control circuit board 130.

Figure 46:
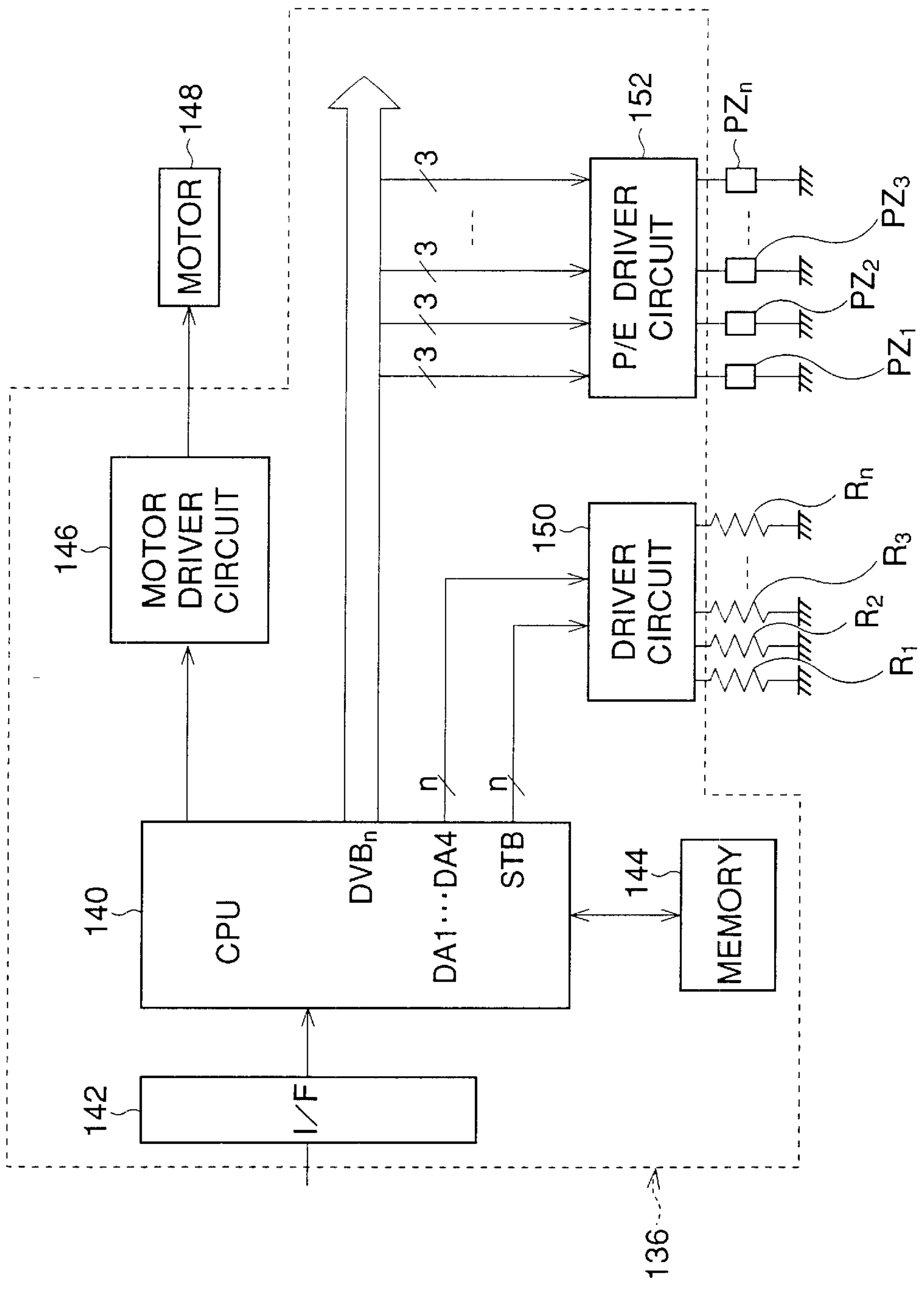
FIG. 46 is a schematic block diagram of a control board of the eighth embodiment of the color printer according to the present invention.

FIG. 46 shows a schematic block diagram of the control circuit board 136 of the color printer shown in FIG. 44. As shown in this drawing, the control circuit board 136 comprises a central processing unit (CPU) 140, which receives digital color image-pixel signals from a personal computer or a word processor (not shown) through an interface circuit (I/F) 142, and the received digital color image-pixel signals, i.e. digital cyan image-pixel signals, digital magenta image-pixel signals and digital yellow image-pixel signals, are stored in a memory 144.

Also, the control circuit board 136 is provided with a motor driver circuit 146 for driving an electric motor 148, which is used to rotate the roller platen 128 (FIG. 44). The motor 148 is a stepping motor, which is driven in accordance with a series of drive pulses outputted from the motor driver circuit 146, the outputting of drive pulses from the motor driver circuit 146 to the motor 148 being controlled by the CPU 140.

During a printing operation, the roller platen 128 is rotated in a counterclockwise direction in FIG. 44 by the motor 148. Accordingly, the image-forming sheet 106, introduced through the entrance opening 118, moves toward the exit opening 120 along the path 122. Thus, the image-forming sheet 10 is locally heated by selectively energizing the electric resistance elements $R_1$ to $R_n$, and is subjected to localized pressure by selectively energizing the piezoelectric elements $PZ_1$ to $PZ_n$.

As is apparent from FIG. 46, a driver circuit 150 for selectively energizing the electric resistance elements $R_1$ to $R_n$ of the line thermal head 126 is controlled by the CPU 140. Namely, the driver circuit 150 is controlled by n sets of strobe signals “STB” and control signals (“DA1”, “DA2”, “DA3” or “DA4”), outputted from the CPU 140, thereby carrying out the selective energization of the electric resistance elements $R_1$ to $R_n$. A P/E driver circuit 152 for selectively energizing the piezoelectric elements $PZ_1$ to $PZ_n$ of the line thermal head 126 is controlled by the CPU 140. Namely, the P/E driver circuit 152 is controlled by n 3-bit control signals “$DVB_n$”, outputted from the CPU 140, thereby carrying out the selective energization of the piezoelectric elements $PZ_1$ to $PZ_n$.

Figure 47:
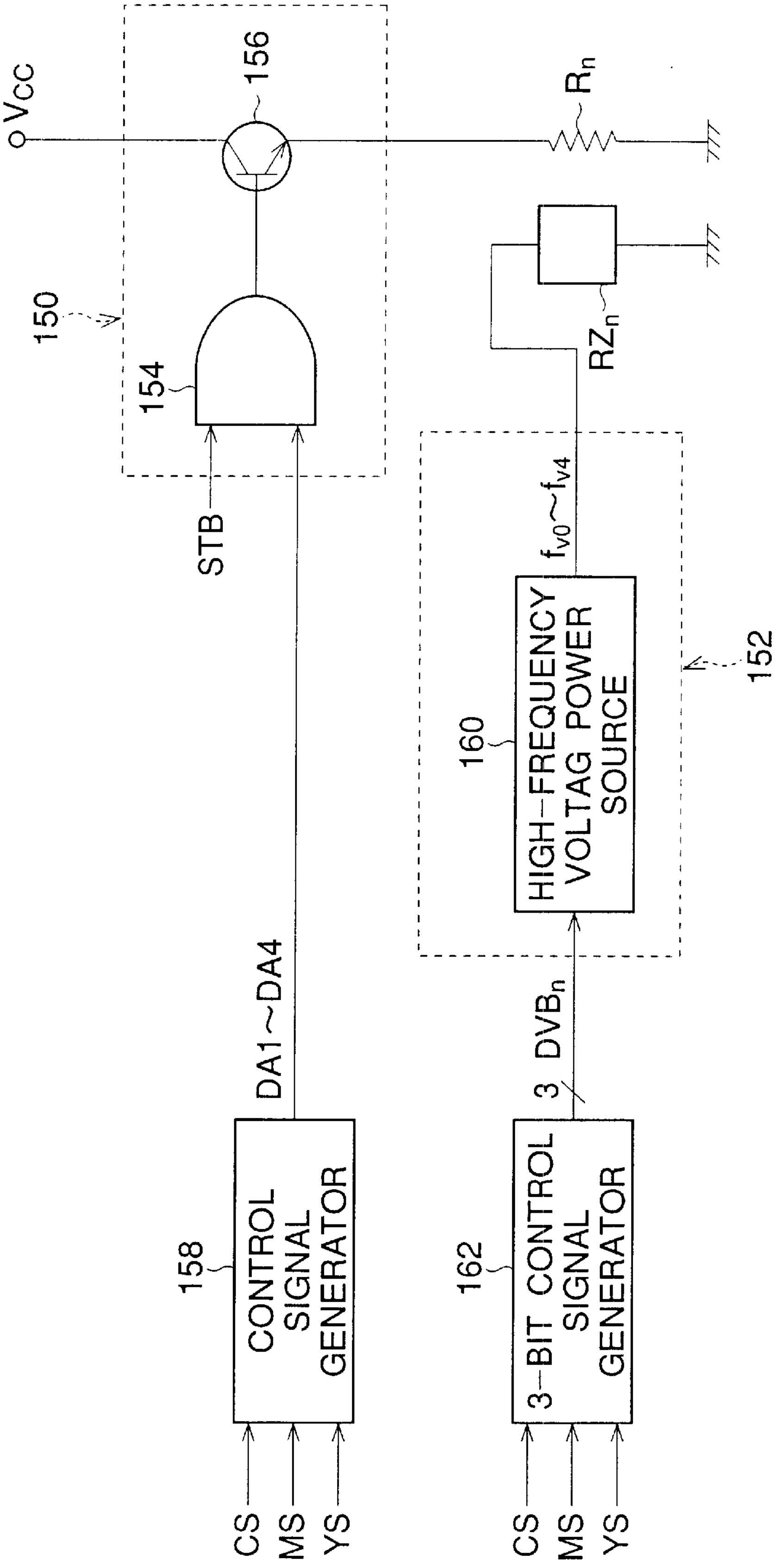
FIG. 47 is a partial block diagram representatively showing a set of an AND-gate circuit and a transistor, included in a thermal head driver circuit of FIG. 46, and a high-frequency voltage power source, included in a P/E driver circuit of FIG. 46, for producing the cyan, magenta, yellow, blue, red, green and black dots on the image-forming substrate shown in FIG. 42.

In the driver circuit 150, n sets of AND-gate circuits and transistors are provided with respect to the electric resistance elements ($R_n$), respectively. With reference to FIG. 47, an AND-gate circuit and a transistor in one set are representatively shown and indicated by references 154 and 156, respectively. A set of a strobe signal “STB” and a control signal (“DA1”, “DA2”, “DA3” or “DA4”) is inputted from the CPU 140 to two input terminals of the AND-gate circuit 154. A base of the transistor 156 is connected to an output terminal of the AND-gate circuit 154; a corrector of the transistor 156 is connected to an electric power source ($V_{cc}$); and an emitter of the transistor 156 is connected to a corresponding electric resistance element ($R_n$).

To generate the control signals (“DA1”, “DA2”, “DA3” or “DA4”), the CPU 140 includes n respective control signal generators, corresponding to the electric resistance elements $R_1$ to $R_n$, one of which is representatively shown and indicated by reference 158 in FIG. 47. As shown in a table in FIG. 48, the control signal generator 158 selectively generates one of the control signals “DA1”, “DA2”, “DA3” and “DA4” in accordance with a combination of three primary color digital image-pixel signals: a digital cyan image-pixel signal CS, a digital magenta image-pixel signal MS and a digital yellow image-pixel signal YS, inputted to the control signal generator 158.

On the other hand, in the P/E driver circuit 152, n high-frequency voltage sources are provided, each corresponding to a respective piezoelectric element ($PZ_n$), and one of the n high-frequency voltage sources is representatively shown and indicated by reference 160 in FIG. 47. The high-frequency voltage source 160 selectively produces one of high-frequency voltages $f_{v0}$ to $f_{v4}$ in accordance with 3-bit data of a 3-bit control signal “$DVB_n$” inputted thereto, and then outputs the high-frequency voltages ($f_{v0}, \ldots, f_{v4}$) to a corresponding piezoelectric element ($PZ_n$).

The CPU 40 includes n respective 3-bit control signal generators, each corresponding to the respective n high-frequency voltage power sources 160, one of which is representatively shown and indicated by reference 162 in FIG. 47. As shown in the table in FIG. 48, the 3-bit control signal generator 162 selectively generates the 3-bit control signal "$DVB_n$" in accordance with a combination of three primary color digital image-pixel signals: a digital cyan image-pixel signal CS, a digital magenta image-pixel signal MS and a digital yellow image-pixel signal YS, inputted to the 3-bit control signal generator 160.

Figure 49:
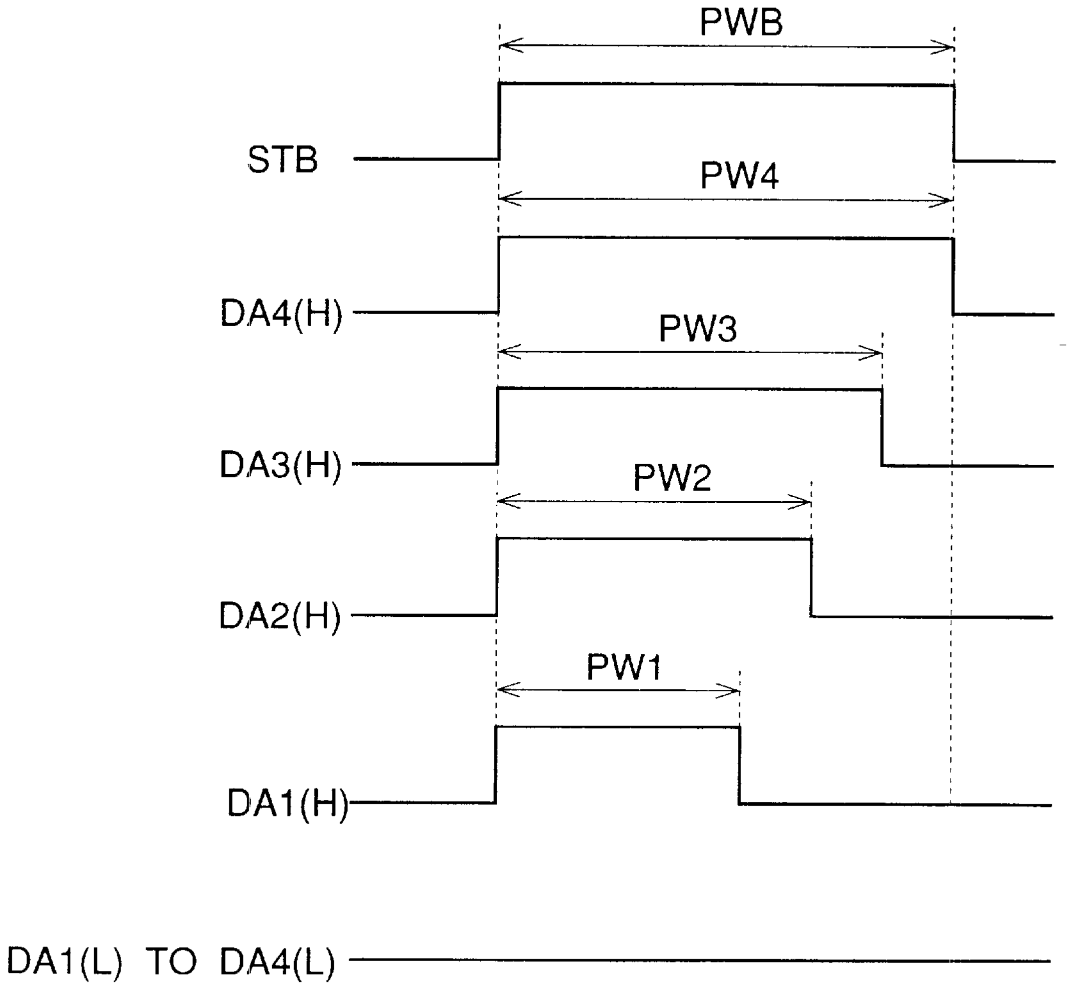
FIG. 49 is a timing chart showing a strobe signal and the four kinds of control signals for electronically actuating the thermal head driver circuit of FIGS. 46 and 47.

When the digital cyan image-pixel signal CS has a value "1", and when the remaining magenta and yellow image-pixel signals MS and YS have a value "0", the control signal "DA1" is outputted from the control signal generator 158, and a high-level pulse having a pulse width "PW1", being shorter than a pulse width "PWB" of the strobe signal "STB", as shown in a timing chart of FIG. 49, is produced. Thus, a corresponding electric resistance element ($R_n$) is electrically energized during a period corresponding to the pulse width "PW1", whereby the electric resistance element concerned is heated to a temperature between the glass-transition temperatures $T_1$ and $T_2$ (FIG. 43).

Also, when the digital cyan image-pixel signal CS has a value "1", and when the remaining digital magenta and yellow image-pixel signals MS and YS have a value "0", the 3-bit control signal "$DVB_n$", having a 3-bit data [100], is outputted from the 3-bit control signal generator 162 to the high-frequency voltage power source 160, whereby the high-frequency voltage $f_{v4}$ (FIG. 4) is outputted to the corresponding piezoelectric element ($PZ_n$). Thus, the piezoelectric element concerned is electrically energized so as to exert an alternating pressure on the image-forming substrate 106. A magnitude of the high-frequency voltage $f_{v4}$ is previously determined such that an effective pressure value of the alternating pressure lies between the critical breaking pressure $P_3$ and the upper limit pressure $P_{UL}$ (FIG. 43).

Accordingly, when the digital cyan image-pixel signal CS has a value "1", and when the remaining digital magenta and yellow image-pixel signals MS and YS have a value "0", the heating temperature and the breaking pressure fall within the hatched cyan area C (FIG. 43), resulting in the production of a cyan dot on the image-forming sheet 106 due to the breakage and squashing of only cyan microcapsules 18C.

When the digital magenta image-pixel signal MS has a value "1", and when the remaining digital cyan and yellow image-pixel signals CS and YS have a value "0", the control signal "DA2" is outputted from the control signal generator 158, and produces a high-level pulse having a pulse width "PW2", being shorter than the pulse width "PWB" of the strobe signal "STB", but being longer than the pulse width "PW1", as shown in the timing chart of FIG. 49, is produced. Thus, a corresponding electric resistance element ($R_n$) is electrically energized during a period corresponding to the pulse width "PW2", whereby the electric resistance element concerned is heated to a temperature between the glass-transition temperatures $T_2$ and $T_3$.

Also, when the digital magenta image-pixel signal CS has a value "1", and when the remaining digital cyan and yellow image-pixel signals CS and YS have a value "0", the 3-bit control signal "$DVB_n$", having a 3-bit data [011], is outputted from the 3-bit control signal generator 162 to the high-frequency voltage power source 160, whereby the high-frequency voltage $f_{v3}$ is outputted to the corresponding piezoelectric element ($PZ_n$). Thus, the piezoelectric element concerned is electrically energized so as to exert an alternating pressure on the image-forming substrate 106. A magnitude of the high-frequency voltage $f_{v3}$ is previously determined such that an effective pressure value of the alternating pressure lies between the critical breaking pressures $P_2$ and $P_3$.

Accordingly, when the digital magenta image-pixel signal MS has a value "1", and when the remaining digital cyan and yellow image-pixel signals CS and YS have a value "0", the heating temperature and the breaking pressure fall within the hatched magenta area M (FIG. 43), resulting in the production of a magenta dot on the image-forming sheet 106 due to the breakage and squashing of only magenta microcapsules 18M.

When the digital yellow image-pixel signal YS has a value "1", and when the remaining digital cyan and magenta image-pixel signals CS and MS have a value "0", the control signal "DA3" is outputted from the control signal generator 158, and a high-level pulse having a pulse width "PW3", being shorter than the pulse width "PWB" of the strobe signal "STB", but being longer than the pulse width "PW2", as shown in the timing chart of FIG. 49, is produced. Thus, a corresponding electric resistance element ($R_n$) is electrically energized during a period corresponding to the pulse width "PW3", whereby the electric resistance element concerned is heated to a temperature between the glass-transition temperature $T_3$ and the plastifying temperature $T_4$.

Also, when the digital yellow image-pixel signal YS has a value "1", and when the remaining digital cyan and magenta image-pixel signals CS and MS have a value "0", the 3-bit control signal "$DVB_n$", having a 3-bit data [010], is outputted from the 3-bit control signal generator 162 to the high-frequency voltage power source 160, whereby the high-frequency voltage $f_{v2}$ is outputted to the corresponding piezoelectric element ($PZ_n$). Thus, the piezoelectric element concerned is electrically energized so as to exert an alternating pressure on the image-forming substrate 106. A magnitude of the high-frequency voltage $f_{v2}$ is previously determined such that an effective pressure value of the alternating pressure lies between the critical breaking pressures $P_1$ and $P_2$.

Accordingly, when the digital yellow image-pixel signal YS has a value "1", and when the remaining digital cyan and magenta image-pixel signals CS and MS have a value "0", the heating temperature and the breaking pressure fall within the hatched yellow area Y (FIG. 43), resulting in the production of a yellow dot on the image-forming sheet 106 due to the breakage and squashing of only yellow microcapsules 18Y.

When the digital cyan and magenta image-pixel signals CS and MS have a value "1", and when the remaining digital yellow image-pixel signal YS has a value "0", the control signal "DA2" is outputted from the control signal generator 158, and the high-level pulse having the pulse width "PW2", as shown in the timing chart of FIG. 49, is produced. Thus, a corresponding electric resistance element ($R_n$) is electrically energized during the period corresponding to the pulse width "PW2", whereby the electric resistance element concerned is heated to the temperature between the glass-transition temperatures $T_2$ and $T_3$.

Also, when the digital cyan and magenta image-pixel signals CS and MS have a value "1", and when the remaining digital yellow image-pixel signal YS has a value "0", the 3-bit control signal "$DVB_n$", having a 3-bit data [100], is outputted from the 3-bit control signal generator 162 to the high-frequency voltage power source 160, whereby the high-frequency voltage $f_{v4}$ is outputted to the corresponding piezoelectric element ($PZ_n$). Thus, the piezoelectric element concerned is electrically energized so as to exert the alternating pressure on the image-forming substrate 106. Note, as mentioned above, the magnitude of the high-frequency voltage $f_{v4}$ produces the alternating pressure having the effective pressure value that lies between the critical breaking pressure $P_3$ and the upper limit pressure $P_{UL}$.

Accordingly, when the digital cyan and magenta image-pixel signals CS and MS have a value "1", and when the remaining digital yellow image-pixel signal YS has a value "0", the heating temperature and the breaking pressure fall within the hatched blue area BE (FIG. 43), resulting in the production of a blue dot on the image-forming sheet 106 due to the breakage and squashing of cyan and magenta microcapsules 18C and 18M.

When the digital magenta and yellow image-pixel signals MS and YS have a value "1", and when the remaining digital cyan image-pixel signal CS has a value "0", the control signal "DA3" is outputted from the control signal generator 158, and the high-level pulse having the pulse width "PW3", as shown in the timing chart of FIG. 49, is produced. Thus, a corresponding electric resistance element ($R_n$) is electrically energized during the period corresponding to the pulse width "PW3", whereby the electric resistance element concerned is heated to the temperature between the glass-transition temperature $T_3$ and the plastifying temperature $T_4$.

Also, when the digital magenta and yellow image-pixel signals MS and YS have a value "1", and when the remaining digital cyan image-pixel signal CS has a value "0", the 3-bit control signal "$DVB_n$", having the 3-bit data [011], is outputted from the 3-bit control signal generator 162 to the high-frequency voltage power source 160, whereby the high-frequency voltage $f_{v3}$ is outputted to the corresponding piezoelectric element ($PZ_n$). Thus, the piezoelectric element concerned is electrically energized so as to exert the alternating pressure on the image-forming substrate 106. Note, as mentioned above, the magnitude of the high-frequency voltage $f_{v3}$ produces the alternating pressure having the effective pressure value that lies between the critical breaking pressures $P_2$ and $P_3$.

Accordingly, when the digital magenta and yellow image-pixel signals MS and YS have a value "1", and when the remaining digital cyan image-pixel signal CS has a value "0", the heating temperature and the breaking pressure fall within the hatched red area R (FIG. 43), resulting in the production of a red dot on the image-forming sheet 106 due to the breakage and squashing of magenta and yellow microcapsules 18M and 18Y.

When the digital cyan and yellow image-pixel signals CS and YS have a value "1", and when the remaining digital magenta image-pixel signal MS has a value "0", the control signal "DA4" is outputted from the control signal generator 158, and the high-level pulse having a pulse width "PW4", being equal to the pulse width "PWB" of the strobe signal "STB", as shown in the timing chart of FIG. 49, is produced. Thus, a corresponding electric resistance element ($R_n$) is electrically energized during a period corresponding to the pulse width "PW4", whereby the electric resistance element concerned is heated to the temperature between the plastifying temperatures $T_5$ and $T_6$.

Also, when the digital cyan and yellow image-pixel signals CS and YS have a value "1", and when the remaining digital magenta image-pixel signal MS has a value "0", the 3-bit control signal "$DVB_n$", having a 3-bit data [001], is outputted from the 3-bit control signal generator 162 to the high-frequency voltage power source 160, whereby the high-frequency voltage $f_{v1}$ is outputted to the corresponding piezoelectric element ($PZ_n$). Thus, the piezoelectric element concerned is electrically energized so as to exert the alternating pressure on the image-forming substrate 106. A magnitude of the high-frequency voltage $f_{v1}$ is previously determined such that an effective pressure value of the alternating pressure lies between the critical breaking pressures $P_0$ and $P_1$.

Accordingly, when the digital cyan and yellow image-pixel signals CS and YS have a value "1", and when the remaining digital magenta image-pixel signal MS has a value "0", the heating temperature and the breaking pressure fall within the hatched green area G (FIG. 43), resulting in the production of a green dot on the image-forming sheet 106 due to the breakage and squashing of cyan and yellow microcapsules 18C and 18Y.

When all of the digital cyan, magenta and yellow image-pixel signals CS, MS and YS have a value "1", the control signal "DA4" is outputted from the control signal generator 158, and the high-level pulse having a pulse width "PW4", being equal to the pulse width "PWB" of the strobe signal "STB", as shown in the timing chart of FIG. 49, is produced. Thus, a corresponding electric resistance element ($R_n$) is electrically energized during the period corresponding to the pulse width "PW4", whereby the electric resistance element concerned is heated to the temperature between the plastifying temperatures $T_5$ and $T_6$.

Also, when all of the digital cyan, magenta and yellow image-pixel signals CS, and MS and YS have a value "1", the 3-bit control signal "$DVB_n$", having the 3-bit data [100], is outputted from the 3-bit control signal generator 162 to the high-frequency voltage power source 160, whereby the high-frequency voltage $f_{v4}$ is outputted to the corresponding piezoelectric element ($PZ_n$). Thus, the piezoelectric element concerned is electrically energized so as to exert the alternating pressure on the image-forming substrate 106. Note, as mentioned above, the magnitude of the high-frequency voltage $f_{v4}$ produces the alternating pressure having the effective pressure value that lies between the critical breaking pressure $P_3$ and the upper limit pressure $P_{UL}$.

Accordingly, when all of the digital cyan, magenta and yellow image-pixel signals CS, and MS and YS have a value "1", the heating temperature and the breaking pressure fall within the hatched black area BK (FIG. 43), resulting in the production of a black dot on the image-forming sheet 106 due to the breakage and squashing of cyan, magenta and yellow microcapsules 18C, 18M and 18Y.

When all of the digital cyan, magenta and yellow image-pixel signals CS, and MS and YS have a value "0", an output of the control signal generator 158 is maintained at a low-level, i.e. all of the control signals "DA1" to "DA4" are maintained at a low-level. Accordingly, a corresponding electric resistance element ($R_1$, . . . , $R_n$) is not electrically energized. Also, when all of the digital cyan, magenta and yellow image-pixel signals CS, MS and YS have a value "0", the 3-bit control signal "$DVB_n$", having a 3-bit data [000], is outputted from the 3-bit control signal generator 162 to the high-frequency voltage power source 160, whereby the high-frequency voltage $f_{v0}$ is outputted to the corresponding piezoelectric element ($PZ_n$). The outputting of the high-frequency voltage $f_{v0}$ is equivalent to no outputting of a high-frequency voltage, and thus the piezoelectric element concerned is not electrically energized, resulting in the production of a white dot on the image-forming sheet 106 due to no breakage and squashing of cyan, magenta and yellow microcapsules 18C, 18M and 18Y.

Figure 50:
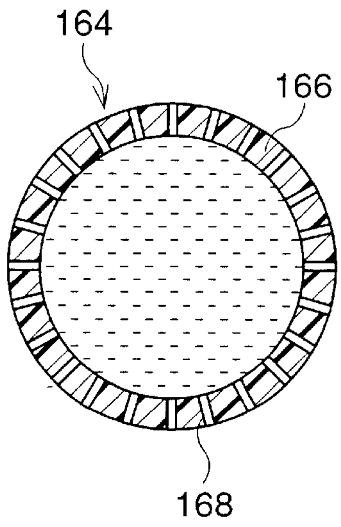
FIG. 50 is a cross sectional view showing another embodiment of a microcapsule, filled with an ink, according to the present invention.

FIG. 50 shows another embodiment of a microcapsule filled with a dye or ink, generally indicated by reference 164. A shell 166 of the microcapsule 164 is formed from a shape memory resin, and has a plurality of pores 168 formed therein. As is already stated, when the microcapsule 164 is heated to beyond a glass-transition temperature, the shell 166 exhibits a rubber elasticity. Thus, it is possible to exude the ink from the microcapsule 164 through the pores 168 by exerting a relatively-low pressure on the microcapsule 164 due to the porosity of the shell 166, without any breakage of the microcapsule 164.

Also, according to the porous microcapsule 164 shown in FIG. 50, by regulating a pressure exerted on the microcapsule 164, an amount of ink, exuded from the microcapsule 164, is adjustable. Namely, when the porous microcapsules are used in the above-mentioned various image-forming substrates, it is possible to adjust a density of a produced colored dot by suitably regulating a breaking pressure within a given range.

Figure 51:
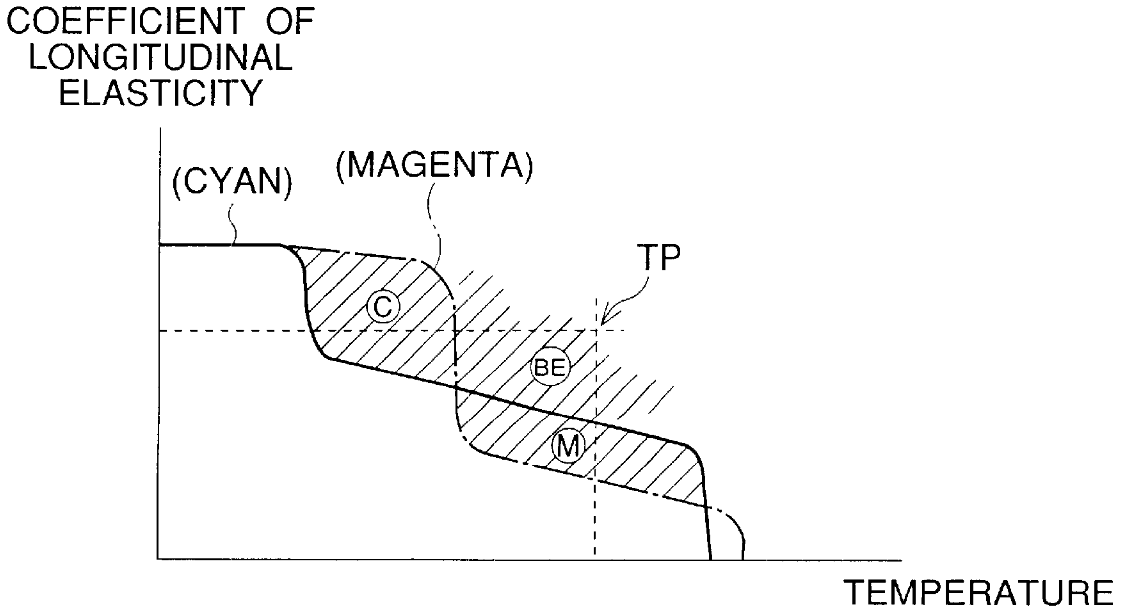
FIG. 51 is a graph showing temperature/pressure breaking characteristics of a porous cyan microcapsule and a porous magenta microcapsule, as shown in FIG. 50.

Further, when a color dot is produced by mixing two different color dyes or inks, it is possible to adjust a tone of such a color dot. For example, as shown in a graph of FIG. 51, when a shape memory resin of a porous cyan microcapsule exhibits a characteristic longitudinal elasticity coefficient indicated by a solid line, and when a shape memory resin of a porous magenta microcapsule exhibits a characteristic longitudinal elasticity coefficient indicated by a single-chained line, a cyan-producing area, a magenta-producing area and a blue-producing area are defined as a hatched area C, a hatched area M and a hatched area BE, respectively.

As has already been discussed, when a selected temperature and a selected pressure fall in the blue-producing area BE, a blue dot is produced. In this case, as an intersection point TP of the selected temperature and pressure tends toward a boundary between the cyan-producing area C and the blue-producing area BE, a cyan property of the produced blue dot is enhanced. On the contrary, as an intersection point TP of the selected temperature and pressure tends toward a boundary between the magenta-producing area M and the blue-producing area BE, a magenta property of the produced blue dot is enhanced.

Figure 52:
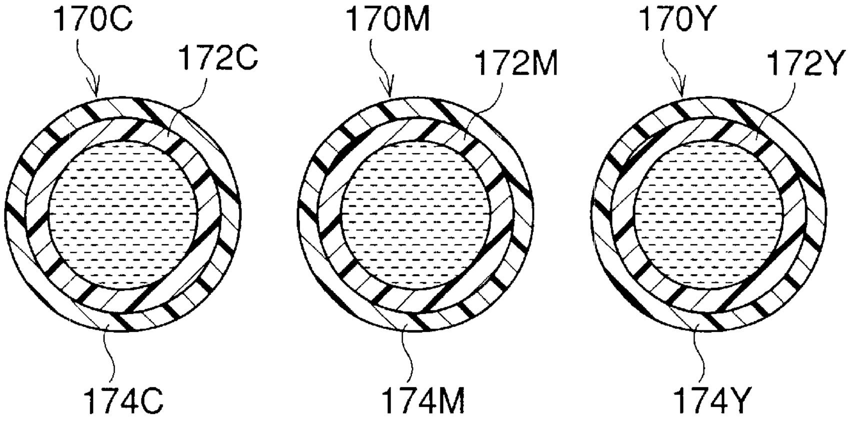
FIG. 52 is a cross sectional view showing three types of cyan, magenta and yellow microcapsules, respectively, as yet another embodiment of a microcapsule according to the present invention.

FIG. 52 shows yet another embodiment of a microcapsule filled with a dye or ink. In this drawing, respective references 170C, 170M and 170Y indicate a cyan microcapsule, a magenta microcapsule, and a yellow microcapsule. A shell wall of each microcapsule is formed as a double-shell wall. The inner shell wall element (172C, 172M, 172Y) of the double-shell wall is formed of a shape memory resin, and the outer shell wall element (174C, 174M, 174Y) is formed of a suitable resin, which does not exhibit a shape memory characteristic.

Figure 53:
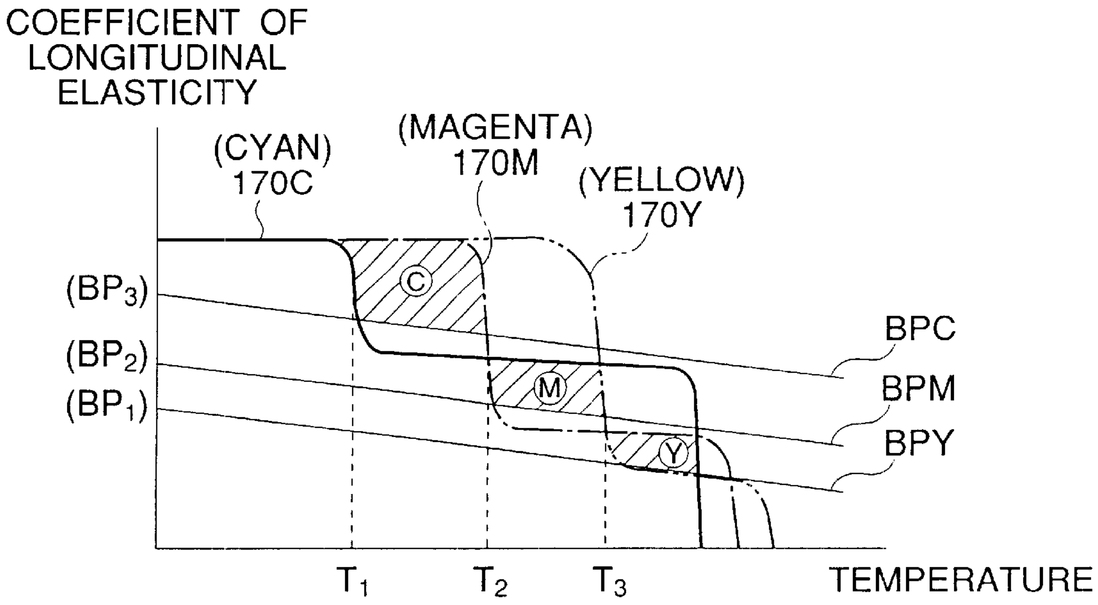
FIG. 53 is a graph showing temperature/pressure breaking characteristics of the cyan, magenta and yellow microcapsules shown in FIG. 52.

As is apparent from a graph of FIG. 53, the inner shell walls 172C, 172M and 172Y exhibit characteristic longitudinal elasticity coefficients indicated by a solid line, a single-chained line and a double-chained line, respectively, and these inner shells are selectively broken and compacted under the temperature/pressure conditions as mentioned above.

Also, the outer shell wall 174C, 174M and 174Y exhibits temperature/pressure breaking characteristics indicated by reference BPC, BPM and BPY, respectively. Namely, the outer shell wall 174C is broken and squashed when being subjected to beyond a pressure $BP_3$; the outer shell wall 174M is broken and squashed when being subjected to beyond a pressure $BP_2$; and the outer shell wall 174Y is broken and squashed when being subjected to a pressure beyond a pressure $BP_1$.

Thus, as shown in the graph of FIG. 53, a cyan-producing area, a magenta-producing area and a yellow-producing area are defined, as a hatched area C, a hatched area M and a hatched area Y, respectively, by a combination of the characteristic longitudinal elasticity coefficients (indicated by the solid line, single-chained line and double-chained line) and the temperature/pressure breaking characteristics BPC, BPM and BPY.

Note, by suitably varying compositions of well-known resins and/or by selecting a suitable resin from among well-known resins, it is possible to easily obtain microcapsules, that exhibit the temperature/pressure breaking characteristics BPC, BPM and BPY.

According to the microcapsules 170C, 170M and 170Y shown in FIG. 52, regardless of the characteristic longitudinal elasticity coefficient of each microcapsule, it is a possible option to accurately determine a critical breaking pressure for each microcapsule.

Note, in the embodiment shown in FIG. 52, the inner shell wall element (172C, 172M, 172Y) and the outer shell wall element (174C, 174M, 174Y) may replace each other. Namely, when the outer shell wall element of the double-shell wall is formed of the shape memory resin, the inner shell wall element is formed of the suitable resin, which does not exhibit the shape memory characteristic.

Figure 54:
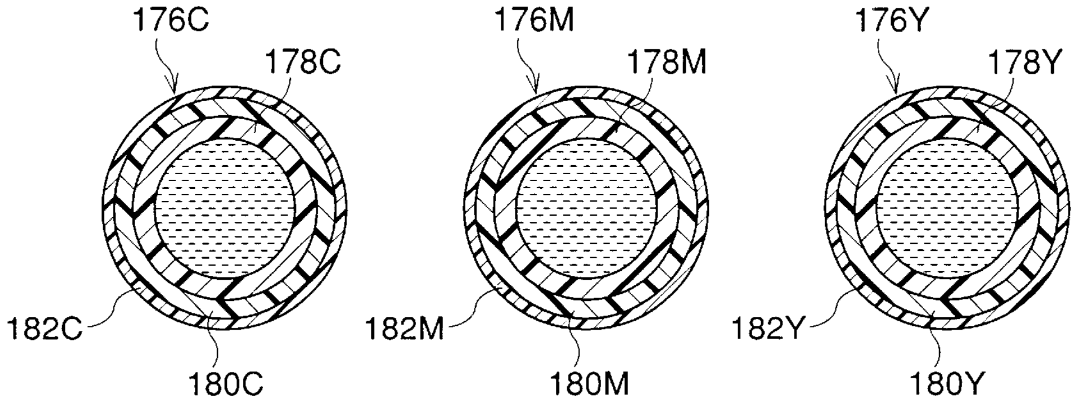
FIG. 54 is a cross sectional view showing three types of cyan, magenta and yellow microcapsules, respectively, as still yet another embodiment of a microcapsule according to the present invention.

FIG. 54 shows still yet another embodiment of a microcapsule filled with a dye or ink. In this drawing, respective references 176C, 176M and 176Y indicate a cyan microcapsule, a magenta microcapsule, and a yellow microcapsule. A shell wall of each microcapsule is formed as a composite shell wall. In this embodiment, each composite shell wall comprises an inner shell wall element (178C, 178M, 178Y), an intermediate shell wall element (180C, 18OM, 180Y) and an outer shell element (182C, 182M, 182Y), and these shell wall elements are formed from suitable resins, which do not exhibit shape memory characteristics.

Figure 55:
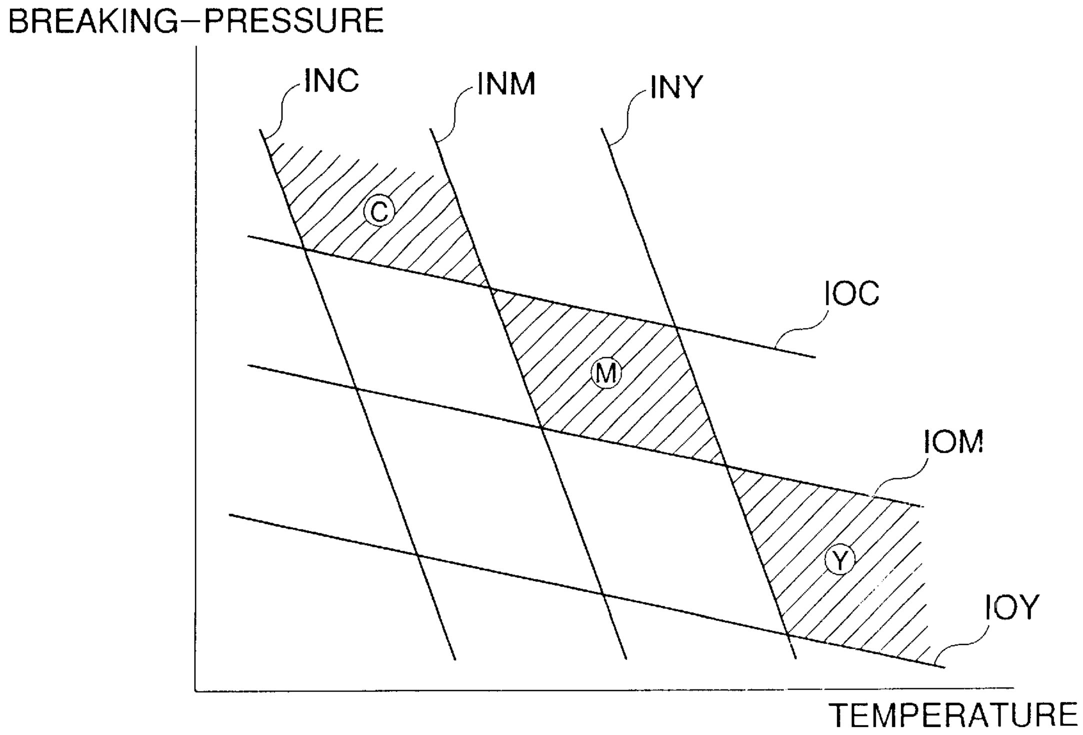
FIG. 55 is a graph showing temperature/pressure breaking characteristics of the cyan, magenta and yellow microcapsules shown in FIG. 54.

In a graph of FIG. 55, the inner shell walls 178C, 178M and 178Y exhibit temperature/pressure breaking characteristics indicated by references INC, INM and INY, respectively. Also, reference IOC indicates a resultant temperature/pressure breaking characteristic of both the intermediate and outer shell walls 180C and 182C; reference IOM indicates a resultant temperature/pressure breaking characteristic of both the intermediate and outer shell walls 180M and 182M; and reference IOY indicates a resultant temperature/pressure breaking characteristic of both the intermediate and outer shell walls 180Y and 182Y.

Thus, as shown in the graph of FIG. 55, by a combination of the temperature/pressure breaking characteristics (INC, INM and INY; IOC, IOM and IOY), a cyan-producing area, a magenta-producing area and a yellow-producing area are defined, as a hatched area C, a hatched area M and a hatched area Y, respectively.

Note, similar to the above-mentioned case, by suitably varying compositions of well known resins, by selecting a suitable resin from among the well-known resins, and/or by suitably regulating a thickness of each shell wall, it is possible to easily obtain resins, exhibiting the temperature/pressure breaking characteristics (INC, INM and INY; IOC, IOM and IOY).

According to the microcapsules 176C, 176M and 176Y shown in FIG. 54, both critical breaking temperature and pressure for each microcapsule can be optimumlly and exactly determined.

The third, fourth, fifth embodiments of the image-forming substrate according to the present invention may be formed as a film type of image-forming substrate, as shown in FIGS. 25 and 26.

For an ink to be encapsulated in the microcapsules, leuco-pigment may be utilized. As is well-known, the leuco-pigment per se exhibits no color. Accordingly, in this case, color developer is contained in the binder, which forms a part of the layer of microcapsules (14, 14', 15, 15', 110).

Also, a wax-type ink may be utilized for an ink to be encapsulated in the microcapsules. In this case, the wax-type ink should be thermally fused at less than a lowest critical temperature, as indicated by reference $T_1$.

Although all of the above-mentioned embodiments are directed to a formation of a color image, the present invention may be applied to a formation of a monochromatic image. In this case, a layer of microcapsules (14, 14', 15, 15', 110) is composed of only one type of microcapsule filled with, for example, a black ink.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Applications No. 9-215779 (filed on Jul. 25, 1997), No. 9-290356 (filed on Oct. 7, 1997) and No. 10-104579 (filed on Apr. 15, 1998) which are expressly incorporated herein, by reference, in their entireties.

What is claimed is:

1. An image-forming system, comprising:

an image-forming substrate that includes a base member, and a layer of microcapsules on said base member, said layer of microcapsules containing at least one type of microcapsules filled with a dye, said microcapsules exhibiting a temperature/pressure characteristic so as to be squashed when being simultaneously subjected to a predetermined pressure above atmospheric pressure and a predetermined temperature above ambient temperature, resulting in a discharge of said dye from said squashed microcapsule; and an image-forming apparatus that forms an image on said image-forming substrate, said image-forming apparatus including a pressure applicator that locally exerts said predetermined pressure on said layer of microcapsules, and a thermal heater that selectively heats a localized area of said layer of microcapsules, on which said predetermined pressure is exerted by said pressure applicator, to said predetermined temperature in accordance with an image-information data, such that said microcapsules in said layer of microcapsules are selectively squashed, and an image is produced on said image-forming substrate.

2. An image-forming system, comprising:

an image-forming substrate that includes a base member, and a layer of microcapsules on said base member, said layer of microcapsules containing at least one type of microcapsules filled with a dye, said microcapsules exhibiting a temperature/pressure characteristic so as to be squashed when being simultaneously subjected to a predetermined pressure above atmospheric pressure and a predetermined temperature above ambient temperature, resulting in a discharge of said dye from said squashed microcapsule; and an image-forming apparatus that forms an image on said image-forming substrate, said image-forming apparatus comprising: an array of piezoelectric elements laterally aligned with each other with respect to a path along which said image-forming substrate passes, each of said piezoelectric elements selectively generating an alternating pressure when being electrically energized by a high-frequency voltage, said alternating pressure having an effective pressure value that corresponds to said predetermined pressure; a platen member that is in contact with said array of piezoelectric elements; and an array of heater elements provided on the respective piezoelectric elements included in said array of piezoelectric elements, each of said heater elements being selectively heatable to said predetermined temperature in accordance with image-information data.

3. An image-forming system, comprising:

an image-forming substrate that includes a base member, and a layer of microcapsules on said base member, said layer of microcapsules containing at least one type of microcapsules filled with a dye, said microcapsules exhibiting a temperature/pressure characteristic so as to be squashed when being simultaneously subjected to a predetermined pressure above atmospheric pressure and a predetermined temperature above ambient temperature, resulting in a discharge of said dye from said squashed microcapsule; and an image-forming apparatus that forms an image on said image-forming substrate, said image-forming apparatus comprising: a platen member laterally provided with respect to a path along which said image-forming substrate passes; a carriage that carries a thermal head, movable along said platen member; and a resilient biasing unit incorporated in said carriage to press said thermal head against said platen member with said predetermined pressure, wherein said thermal head selectively heats a localized area of said layer of microcapsules, on which said predetermined pressure is exerted by said resilient biasing unit, to said predetermined temperature in accordance with an image information data, such that said microcapsules included in said layer of microcapsules are selectively squashed and an image is produced on said image-forming substrate.

4. An image-forming substrate, comprising:

a base member; and a layer of microcapsules on said base member, said layer of microcapsules containing at least one type of microcapsules filled with a dye, wherein said microcapsules exhibit a temperature/pressure characteristic so as to be squashed when being simultaneously subjected to a predetermined pressure above atmospheric pressure and a predetermined temperature above ambient temperature, resulting in a discharge of the dye from said squashed microcapsule, wherein said shell wall is porous, whereby an amount of dye to be discharged from said shell wall is adjustable by regulating said predetermined pressure.

5. The image-forming substrate as set forth in claim 4, wherein said shell wall of said microcapsules comprises a shape memory resin which exhibits a glass-transition temperature corresponding to said predetermined temperature.

6. An image-forming substrate, comprising:

a base member; and a layer of microcapsules on said base member, said layer of microcapsules containing at least one type of microcapsules filled with a dye, wherein said microcapsules exhibit a temperature/pressure characteristic so as to be squashed when being simultaneously subjected to a predetermined pressure above atmospheric pressure and a predetermined temperature above ambient temperature, resulting in a discharge of the dye from said squashed microcapsule, wherein a shell wall of each of said microcapsules comprises a double-shell wall, one shell wall element of said double-shell wall being formed of a first type of resin, and another shell wall element of said double-shell wall being formed of a second type of resin, such that said temperature/pressure characteristic is a resultant temperature/pressure characteristic of both said shell wall elements.

7. The image-forming substrate as set forth in claim 6, wherein said first type of resin comprises a shape memory resin, and said second type of resin comprises a resin, not exhibiting a shape memory characteristic.

8. An image-forming substrate, comprising:

a base member; and a layer of microcapsules on said base member, said layer of microcapsules containing at least one type of microcapsules filled with a dye, wherein:

said layer of microcapsules includes a first type of microcapsules filled with a first dye and a second type of microcapsules filled with a second dye;

each of said first type of microcapsules exhibiting a first temperature/pressure characteristic so as to be squashed when being simultaneously subjected to a first pressure and a first temperature, resulting in a discharge of said first dye from said squashed microcapsule; and each of said second type of microcapsules exhibiting a second temperature/pressure characteristic so as to be squashed when being simultaneously subjected to a second pressure and a second temperature, resulting in a discharge of said second dye from said squashed microcapsule, each of said first and second pressures being above atmospheric pressure and each of said first and second temperatures being above ambient temperature.

9. An image-forming substrate as set forth in claim 8, wherein said first temperature is lower than said second temperature, and said first pressure is higher than said second pressure.

10. An image-forming apparatus that forms an image on an image-forming substrate as set forth in claim 8, comprising:

a first pressure applicator that locally exerts said first pressure on said layer of microcapsules;

a second pressure applicator that locally exerts said second pressure on said layer of microcapsules;

a first thermal heater that selectively heats a first localized area of said layer of microcapsules, on which said first pressure is exerted by said first pressure applicator, to said first temperature in accordance with a first image-information data, such that said first type of microcapsules included in said layer of microcapsules are selectively squashed and a first image is produced on said layer of microcapsules; and a second thermal heater that selectively heats a second localized area of said layer of microcapsules, on which said second pressure is exerted by said second pressure applicator, to said second temperature in accordance with a second image-information data, such that said second type of microcapsules included in said layer of microcapsules are selectively squashed and a second image is produced on said layer of microcapsules.

11. An image-forming apparatus as set forth in claim 10, wherein said first and second thermal heaters comprise a first line type thermal head and a second line type thermal head, respectively, laterally provided with respect to a path along which said image-forming substrate passes, and said first and second pressure applicators comprise a first roller platen member and a second roller platen member, respectively, resiliently pressed against said first and second line type thermal heads.

12. An image-forming apparatus that forms an image on an image-forming substrate as set forth in claim 8, comprising:

a large-diameter roller platen member laterally provided with respect to a path along which said image-forming substrate passes;

a first thermal heater provided along said large-diameter roller platen member;

a second thermal heater provided along said large-diameter roller platen member;

said first and second thermal heaters being arranged with respect to said large-diameter roller platen member so as to be subjected to said first and second pressures, respectively, from said large-diameter roller platen member;

said first thermal heater selectively heating a first localized area of said layer of microcapsules, which is subjected to said first pressure from said large-diameter roller platen member, to said first temperature in accordance with a first image-information data, such that said first type of microcapsules included in said layer of microcapsules are selectively squashed and a first image is produced on said layer of microcapsules; and said second thermal heater selectively heating a second localized area of said layer of microcapsules, which is subjected to said second pressure from said large-diameter roller platen member, to said second temperature in accordance with a second image-information data, such that said second type of microcapsules included in said layer of microcapsules are selectively squashed and a second image is produced on said layer of microcapsules.

13. An image-forming apparatus as set forth in claim 12, wherein said first and second thermal heaters comprise a first line type thermal head and a second line type thermal head, respectively, arranged to be in close proximity to each other, said large-diameter roller platen member being in resilient and diametrical contact with said first line type thermal head.

14. An image-forming apparatus that forms an image on an image-forming substrate as set forth in claim 8, which comprising:

an array of piezoelectric elements laterally aligned with each other with respect to a path along which said image-forming substrate passes, each of said piezoelectric elements selectively generating a first alternating pressure and a second alternating pressure when being electrically energized by a first high-frequency voltage and a second high-frequency voltage, respectively, said first and second alternating pressures having a first effective pressure value and a second effective value, respectively, that correspond to said first and second pressures, respectively;

a platen member that is in contact with said array of piezoelectric elements; and an array of heater elements provided on the piezoelectric elements included in said array of piezoelectric elements, each of said heater elements being selectively heatable to said first and second temperatures.

15. An image-forming apparatus that forms an image on an image-forming substrate as set forth in claim 8, comprising:

a platen member laterally provided with respect to a path, along which said image-forming substrate passes;

a carriage that carries a first thermal head and a second thermal head, movable along said platen member, each of said first and second thermal heads including plural heater elements aligned with each other along said path;

a first resilient biasing unit incorporated in said carriage to press said first thermal head against said platen member with said first pressure; and a second resilient biasing unit incorporated in said carriage to press said second thermal head against said platen member with said second pressure, wherein each of the heater elements of said first thermal head selectively heats a first localized area of said layer of microcapsules, on which said first pressure is exerted by said first resilient biasing unit, to said first temperature in accordance with a first image information data, such that said first type of microcapsules in said layer of microcapsules are selectively squashed and a first image is produced on said layer of microcapsules, and each of the heater elements of said second thermal head selectively heats a second localized area of said layer of microcapsules, on which said second pressure is exerted by said second resilient biasing unit, to said second temperature in accordance with a second image information data, such that said second type of microcapsules in said layer of microcapsules are selectively squashed and a second image is produced on said layer of microcapsules.

16. An image-forming apparatus as set forth in claim 15, wherein said carriage is unidirectionally moved along said platen member during image formation, and the unidirectional movement of said carriage is carried out such that said first thermal head is defined as a leading thermal head when said first pressure is higher than said second pressure.

17. An image-forming apparatus as set forth in claim 15, wherein said carriage is bidirectionally moved along said platen member during image formation, and, when said first pressure is higher than said second pressure, said first and second resilient biasing unit are adjustable such that one of said first and second thermal heads, defined as a leading thermal head, is subjected to said first pressure, the other thermal head, defined as a trailing thermal head, being subjected to said second pressure.

18. An image-forming apparatus that forms an image on an image-forming substrate as set forth in claim 8, comprising:

a roller platen member laterally provided with respect to a path along which said image-forming substrate passes;

a carriage that carries a first thermal head and a second thermal head, movable along said platen member, each of said first and second thermal heads including plural heater elements laterally aligned with each other with respect to said path; and a resilient biasing unit that resiliently biases said carriage toward said roller platen member, said first and second thermal heads being arranged so as to be subjected to said first and second pressures, respectively, from said roller platen member, wherein each of the heater elements of said first thermal head selectively heats a first localized area of said layer of microcapsules, on which said first pressure is exerted by said first resilient biasing unit, to said first temperature in accordance with a first image information data, such that said first type of microcapsules in said layer of microcapsules are selectively squashed and a first image is produced on said layer of microcapsules, and each of the heater elements of said second thermal head selectively heats a second localized area of said layer of microcapsules, on which said second pressure is exerted by said second resilient biasing unit, to said second temperature in accordance with a second image information data, such that said second type of microcapsules in said layer of microcapsules are selectively squashed and a second image is produced on said layer of microcapsules.

19. An image-forming substrate, comprising:

a base member; and a layer of microcapsules on said base member, said layer of microcapsules containing at least one type of microcapsules filled with a dye, wherein:

said layer of microcapsules includes a first type of microcapsules filled with a first dye, a second type of microcapsules filled with a second dye, and a third type of microcapsules filled with a third dye;

each of said first type of microcapsules exhibiting a first temperature/pressure characteristic so as to be squashed when being simultaneously subjected to a first pressure and a first temperature, resulting in a discharge of said first dye from said squashed microcapsule;

each of said second type of microcapsules exhibiting a second temperature/pressure characteristic so as to be squashed when being simultaneously subjected to a second pressure and a second temperature, resulting in a discharge of said second dye from said squashed microcapsule;

each of said third type of microcapsules exhibiting a third temperature/pressure characteristic so as to be squashed when being simultaneously subjected to a third pressure and a third temperature, resulting in discharge of said third dye from said squashed microcapsule, each of said first, second and third pressures being above atmospheric pressure and each of said first, second and third temperatures being above ambient temperature.

20. An image-forming substrate as set forth in claim 19, wherein said first, second and third temperatures are low, medium and high, respectively, and said first, second and third pressure are high, medium and low, respectively.

21. An image-forming substrate as set forth in claim 19, wherein said first, second, and third dyes exhibit three-primary colors.

22. An image-forming substrate as set forth in claim 21, wherein said layer of microcapsules further includes a fourth type of microcapsules filled with a black dye, each of said fourth type of microcapsules exhibiting a temperature characteristic so as to be plastified at a fourth temperature which is higher than said first, second and third temperatures.

23. An image-forming apparatus that forms an image on an image-forming substrate as set forth in claim 22, comprising:

a first pressure applicator that locally exerts said first pressure on said layer of microcapsules;

a second pressure applicator that locally exerts said second pressure on said layer of microcapsules;

a third pressure applicator that locally exerts said third pressure on said layer of microcapsules;

a fourth pressure applicator that locally exerts said fourth pressure on said layer of microcapsules, said forth pressure being lower than said first, second third pressure;

a first thermal heater that selectively heats a first localized area of said layer of microcapsules, on which said first pressure is exerted by said first pressure applicator, to said first temperature in accordance with a first image-information data, such that said first type of microcapsules in said layer of microcapsules are selectively squashed and a first image is produced on said layer of microcapsules;

a second thermal heater that selectively heats a second localized area of said layer of microcapsules, on which said second pressure is exerted by said second pressure applicator, to said second temperature in accordance with a second image-information data, such that said second type of microcapsules in said layer of microcapsules are selectively squashed and a second image is produced on said layer of microcapsules;

a third thermal heater that selectively heats a third localized area of said layer of microcapsules, on which said third pressure is exerted by said third pressure applicator, to said third temperature in accordance with a third image-information data, such that said third type of microcapsules in said layer of microcapsules are selectively squashed and a third image is produced on said layer of microcapsules; and a fourth thermal heater that selectively heats a fourth localized area of said layer of microcapsules, on which said fourth pressure is exerted by said fourth pressure applicator, to said fourth temperature in accordance with said first, second and third image-information data, such that said fourth type of microcapsules in said layer of microcapsules are selectively and thermally plastified or fused and a fourth image is produced on said layer of microcapsules.

24. An image-forming apparatus as set forth in claim 23, wherein said first, second, third and fourth thermal heaters comprise a first line type thermal head, a second line type thermal head, a third line type thermal head and a fourth line type thermal head, respectively, laterally provided with respect to a path along which said image-forming substrate passes, and said first, second, third and fourth pressure applicators comprises a first roller platen member, a second roller platen member, a third roller platen member and a fourth roller platen member, respectively, resiliently pressed against said first, second, third and fourth line type thermal heads, respectively.

25. An image-forming apparatus that forms an image on an image-forming substrate as set forth in claim 22, comprising:

a large-diameter roller platen member laterally provided with respect to a path along which said image-forming substrate passes;

a first thermal heater provided along said large-diameter roller platen member;

a second thermal heater provided along said large-diameter roller platen member;

a third thermal heater provided along said large-diameter roller platen member; and a fourth thermal heater provided along said large-diameter roller platen member, wherein said first, second, third and fourth thermal heaters are arranged with respect to said large-diameter roller platen member so as to be subjected to said first, second, third and fourth pressures, respectively, from said large-diameter roller platen member, said forth pressure being lower than said first, second and third pressures, said first thermal heater selectively heats a first localized area of said layer of microcapsules, which is subjected to said first pressure from said large-diameter roller platen member, to said first temperature in accordance with a first image-information data, such that said first type of microcapsules in said layer of microcapsules are selectively squashed and a first image is produced on said layer of microcapsules, said second thermal heater selectively heats a second localized area of said layer of microcapsules, which is subjected to said second pressure from said large-diameter roller platen member, to said second temperature in accordance with a second image-information data, such that said second type of microcapsules in said layer of microcapsules are selectively squashed and a second image is produced on said layer of microcapsules, said third thermal heater selectively heats a third localized area of said layer of microcapsules, which is subjected to said third pressure from said large-diameter roller platen member, to said third temperature in accordance with a third image-information data, such that said third type of microcapsules in said layer of microcapsules are selectively squashed and a third image is produced on said layer of microcapsules, and said fourth thermal heater selectively heats a fourth localized area of said layer of microcapsules, which is subjected to said fourth pressure from said large-diameter roller platen member, to said fourth temperature in accordance with said first, second and third image-information data, such that said fourth type of microcapsules in said layer of microcapsules are selectively and thermally plastified or fused and a fourth image is produced on said layer of microcapsules.

26. An image-forming apparatus as set forth in claim 25, wherein said first, second, third and fourth thermal heater comprise a first line type thermal head, a second line type thermal head, a third line type thermal head and a fourth line type thermal head, respectively, arranged to be in close proximity to each other, said large-diameter roller platen member being in resilient and diametrical contact with said first line type thermal head.

27. An image-forming apparatus that forms an image on an image-forming substrate as set forth in claim 22, which comprising:

an array of piezoelectric elements laterally aligned with each other with respect to a path along which said image-forming substrate passes, each of said piezoelectric elements selectively generating a first alternating pressure, a second alternating pressure and a third alternating pressure when electrically energized by a first high-frequency voltage, a second high-frequency voltage and a third high-frequency voltage, respectively, said first, second and third alternating pressures having a first effective pressure value, a second effective pressure value and a third effective pressure value, respectively, that correspond to said first, second and third pressures, respectively;

a platen member that is in contact with said array of piezoelectric elements; and an array of heater elements provided on the piezoelectric elements included in said array of piezoelectric elements, each of said heater elements being selectively heatable to said first, second, third and fourth temperatures.

28. An image-forming apparatus that forms an image on an image-forming substrate as set forth in claim 22, comprising:

a platen member laterally provided with respect to a path along which said image-forming substrate passes;

a carriage that carries a first thermal head, a second thermal head, a third thermal head and a fourth thermal head, laterally movable along said platen member, each of said first, second and third thermal heads including plural heater elements aligned with each other along said path;

a first resilient biasing unit incorporated in said carriage to press said first thermal heater against said platen member with said first pressure;

a second resilient biasing unit incorporated in said carriage to press said second thermal heater against said platen member with said second pressure;

a third resilient biasing unit incorporated in said carriage to press said third thermal heater against said platen member with said third pressure; and a fourth resilient biasing unit incorporated in said carriage to press said fourth thermal heater against said platen member with said fourth pressure, wherein each of the heater elements of said first thermal head selectively heats a first localized area of said layer of microcapsules, on which said first pressure is exerted by said first resilient biasing unit, to said first temperature in accordance with a first image information data, such that said first type of microcapsules in said layer of microcapsules are selectively squashed and a first image is produced on said layer of microcapsules, each of the heater elements of said second thermal head selectively heats a second localized area of said layer of microcapsules, on which said second pressure is exerted by said second resilient biasing unit, to said second temperature in accordance with a second image information data, such that said second type of microcapsules in said layer of microcapsules are selectively squashed and a second image is produced on said layer of microcapsules, each of the heater elements of said third thermal head selectively heats a third localized area of said layer of microcapsules, on which said third pressure is exerted by said third resilient biasing unit, to said third temperature in accordance with a third image information data, such that said third type of microcapsules in said layer of microcapsules are selectively squashed and a third image is produced on said layer of microcapsules, and each of the heater elements of said fourth thermal heater selectively heats a fourth localized area of said layer of microcapsules, on which said fourth pressure is exerted by said fourth resilient biasing unit, to said fourth temperature in accordance with said first, second and third image-information data, such that said fourth type of microcapsules in said layer of microcapsules are selectively and thermally plastified or fused and a fourth image is produced on said layer of microcapsules.

29. An image-forming apparatus that forms an image on an image-forming substrate as set forth in claim 22, comprising:

a roller platen member laterally provided with respect to a path along which said image-forming substrate passes;

a carriage that carries a first thermal head, a second thermal head, a third thermal head and a fourth thermal head, which is movable along said platen member, each of said first, second and third thermal heads including plural heater elements laterally aligned with each other with respect to said path; and a resilient biasing unit that resiliently biases said carriage toward said roller platen member, said first, second, third thermal and fourth heads being arranged so as to be subjected to said first, second, third and fourth pressures, respectively, from said roller platen member, said fourth pressure being lower than said first, second and third pressures, wherein each of the heater elements of said first thermal head selectively heats a first localized area of said layer of microcapsules, on which said first pressure is exerted by said first resilient biasing unit, to said first temperature in accordance with a first image information data, such that said first type of microcapsules in said layer of microcapsules are selectively squashed and a first image is produced on said layer of microcapsules, each of the heater elements of said second thermal head selectively heats a second localized area of said layer of microcapsules, on which said second pressure is exerted by said second resilient biasing unit, to said second temperature in accordance with a second image information data, such that said second type of microcapsules in said layer of microcapsules are selectively squashed and a second image is produced on said layer of microcapsules, each of the heater elements of said third thermal head selectively heats a third localized area of said layer of microcapsules, on which said third pressure is exerted by said third resilient biasing unit, to said third temperature in accordance with a third image information data, such that said third type of microcapsules in said layer of microcapsules are selectively squashed and a third image is produced on said layer of microcapsules, and each of the heater elements of said fourth thermal heater selectively heats a fourth localized area of said layer of microcapsules, on which said fourth pressure is exerted by said fourth resilient biasing unit, to said fourth temperature in accordance with said first, second and third image-information data, such that said fourth type of microcapsules in said layer of microcapsules are selectively and thermally plastified or fused and a fourth image is produced on said layer of microcapsules.

30. An image-forming substrate as set forth in claim 21, wherein said layer of microcapsules further includes a fourth type of microcapsules filled with a black dye, and fourth type of microcapsules filled with a black dye, and each of said fourth type of microcapsules exhibits a pressure characteristic so as to be physically squashed under a fourth pressure which is higher than said first, second and third pressures.

31. An image-forming apparatus that forms an image on an image-forming substrate as set forth in claim 30, which comprising:

an array of piezoelectric elements laterally aligned with each other with respect to a path along which said image-forming substrate passes, each of said piezoelectric elements selectively generating a first alternating pressure, a second alternating pressure, a third alternating pressure and a fourth alternating pressure when being electrically energized by a first high-frequency voltage, a second high-frequency voltage, a third high-frequency and a fourth high-frequency voltage, respectively, said first, second, third and fourth alternating pressures having a first effective pressure value, a second effective pressure value, a third effective pressure value and a fourth effective pressure value that correspond to said first, second, third and fourth pressures, respectively;

a platen member that is in contact with said array of piezoelectric elements; and an array of heater elements provided on the piezoelectric elements included in said array of piezoelectric elements, each of said heater elements being selectively heatable to said first, second and third temperatures.

32. An image-forming apparatus that forms an image on an image-forming substrate as set forth in claim 30, comprising:

a first pressure applicator that locally exerts said first pressure on said layer of microcapsules;

a second pressure applicator that locally exerts said second pressure on said layer of microcapsules;

a third pressure applicator that locally exerts said third pressure on said layer of microcapsules;

a fourth pressure applicator that locally and selectively exerts said fourth pressure on said layer of microcapsules, said forth pressure being higher than said first, second and third pressures;

a first thermal heater that selectively heats a first localized area of said layer of microcapsules, on which said first pressure is exerted by said first pressure applicator, to said first temperature in accordance with a first image-information data, such that said first type of microcapsules in said layer of microcapsules are selectively squashed and a first image is produced on said layer of microcapsules;

a second thermal heater that selectively heats a second localized area of said layer of microcapsules, on which said second pressure is exerted by said second pressure applicator, to said second temperature in accordance with a second image-information data, such that said second type of microcapsules in said layer of microcapsules are selectively squashed and a second image is produced on said layer of microcapsules; and a third thermal heater that selectively heats a third localized area of said layer of microcapsules, on which said third pressure is exerted by said third pressure applicator, to said third temperature in accordance with a third image-information data, such that said third type of microcapsules in said layer of microcapsules are selectively squashed and a third image is produced on said layer of microcapsules, wherein said fourth pressure applicator selectively exerts said fourth pressure on a fourth localized area of said layer of microcapsules in accordance with said first, second and third image-information data, such that said fourth type of microcapsules in said layer of microcapsules are selectively squashed or broken and a fourth image-is produced on said layer of microcapsules.

33. An image-forming apparatus as set forth in claim 32, wherein said first, second and third thermal heaters comprise a first line type thermal head, a second line type thermal head and a third line type thermal head, respectively, laterally provided with respect to a path along which said image-forming substrate passes, said first, second and third pressure applicators comprise a first roller platen member, a second roller platen member and a third roller platen member, respectively, and said fourth pressure applicator comprises an array of piezoelectric elements laterally aligned with each other with respect to said path.

34. An image-forming apparatus as set forth in claim 33, wherein each of said piezoelectric elements selectively generates an alternating pressure when electrically energized by a high-frequency voltage, said alternating pressure having an effective pressure value that corresponds to said fourth pressure.

35. An image-forming apparatus that forms an image on an image-forming substrate as set forth in claim 19, comprising:

a first pressure applicator-that locally exerts said first pressure on said layer of microcapsules;

a second pressure applicator that locally exerts said second pressure on said layer of microcapsules;

a third pressure applicator that locally exerts said third pressure on said layer of microcapsules;

a first thermal heater that selectively heats a first localized area of said layer of microcapsules, on which said first pressure is exerted by said first pressure applicator, to said first temperature in accordance with a first image-information data, such that said first type of microcapsules in said layer of microcapsules are selectively squashed and a first image is produced on said layer of microcapsules;

a second thermal heater that selectively heats a second localized area of said layer of microcapsules, on which said second pressure is exerted by said second pressure applicator, to said second temperature in accordance with a second image-information data, such that said second type of microcapsules in said layer of microcapsules are selectively squashed and a second image is produced on said layer of microcapsules; and a third thermal heater that selectively heats a third localized area of said layer of microcapsules, on which said third pressure is exerted by said third pressure applicator, to said third temperature in accordance with a third image-information data, such that said third type of microcapsules in said layer of microcapsules are selectively squashed and a third image is produced on said layer of microcapsules.

36. An image-forming apparatus as set forth in claim 35, wherein said first, second and third thermal heater comprise a first line type thermal head, a second line type thermal head and a third line type thermal head, respectively, laterally provided with respect to a path along which said image-forming substrate passes, and said first, second and third pressure applicators comprise a first roller platen member, a second roller platen member and a third roller platen member, respectively, resiliently pressed against said first, second and third line type thermal heads, respectively.

37. An image-forming apparatus that forms an image on an image-forming substrate as set forth in claim 19, comprising:

a large-diameter roller platen member laterally provided with respect to a path along which said image-forming substrate passes;

a first thermal heater provided along said large-diameter roller platen member;

a second thermal heater provided along said large-diameter roller platen member; and a third thermal heater provided along said large-diameter roller platen member, wherein said first, second and third thermal heaters are arranged with respect to said large-diameter roller platen member so as to be subjected to said first, second and third pressures, respectively, from said large-diameter roller platen member, said first thermal heater selectively heats a first localized area of said layer of microcapsules, which is subjected to said first pressure from said large-diameter roller platen member, to said first temperature in accordance with a first image-information data, such that said first type of microcapsules in said layer of microcapsules are selectively squashed and a first image is produced on said layer of microcapsules, said second thermal heater selectively heats a second localized area of said layer of microcapsules, which is subjected to said second pressure from said large-diameter roller platen member, to said second temperature in accordance with a second image-information data, such that said second type of microcapsules in said layer of microcapsules are selectively squashed and a second image is produced on said layer of microcapsules, and said third thermal heater selectively heats a third localized area of said layer of microcapsules, which is subjected to said third pressure from said large-diameter roller platen member, to said third temperature in accordance with a third image-information data, such that said third type of microcapsules in said layer of microcapsules are selectively squashed and a third image is produced on said layer of microcapsules.

38. An image-forming apparatus as set forth in claim 37, wherein said first, second and third thermal heaters comprise a first line type thermal head, a second line type thermal head and a third line type thermal head, respectively, arranged to be in close proximity to each other, said large-diameter roller platen member being in resilient and diametrical contact with said first line type thermal head.

39. An image-forming apparatus that forms an image on an image-forming substrate as set forth in claim 19, which comprising:

an array of piezoelectric elements laterally aligned with each other with respect to a path along which said image-forming substrate passes, each of said piezoelectric elements selectively generating a first alternating pressure, a second alternating pressure and a third alternating pressure when being electrically energized by a first high-frequency voltage, a second high-frequency voltage and a third high-frequency, respectively, said first, second and third alternating pressures having a first effective pressure value, a second effective value and a third effective pressure, respectively, that correspond to said first, second and third pressures, respectively;

a platen member that is in contact with said array of piezoelectric elements; and an array of heater elements provided on the piezoelectric elements included in said array of piezoelectric elements, each of said heater elements being selectively heatable to said first, second and third temperatures.

40. An image-forming apparatus that forms an image on an image-forming substrate as set forth in claim 19, comprising:

a platen member laterally provided with respect to a path along which said image-forming substrate passes;

a carriage that carries a first thermal head, a second thermal head and a third thermal head, movable along said platen member, each of said first, second and third thermal heads including plural heater elements aligned with each other along said path;

a first resilient biasing unit incorporated in said carriage to press said first thermal heater against said platen member with said first pressure;

a second resilient biasing unit incorporated in said carriage to press said second thermal heater against said platen member with said second pressure; and a third resilient biasing unit incorporated in said carriage to press said third thermal heater against said platen member with said third pressure, wherein each of the heater elements of said first thermal head selectively heats a first localized area of said layer of microcapsules, on which said first pressure is exerted by said first resilient biasing unit, to said first temperature in accordance with a first image information data, such that said first type of microcapsules in said layer of microcapsules are selectively squashed and a first image is produced on said layer of microcapsules, each of the heater elements of said second thermal head selectively heats a second localized area of said layer of microcapsules, on which said second pressure is exerted by said second resilient biasing unit, to said second temperature in accordance with a second image information data, such that said second type of microcapsules in said layer of microcapsules are selectively squashed and a second image is produced on said layer of microcapsules, and each of the heater elements of said third thermal head selectively heats a third localized area of said layer of microcapsules, on which said third pressure is exerted by said third resilient biasing unit, to said third temperature in accordance with a third image information data, such that said third type of microcapsules in said layer of microcapsules are selectively squashed and a third image is produced on said layer of microcapsules.

41. An image-forming apparatus as set forth in claim 40, wherein said carriage is unidirectionally moved along said platen member during image formation, and the unidirectional movement of said carriage is carried out such that said first thermal head is defined as a leading thermal head when said first pressure is higher than said second pressure.

42. An image-forming apparatus as set forth in claim 40, wherein said carriage is bidirectionally moved along said platen member during image formation, and, when said first pressure is higher than said third pressure, said first and third resilient biasing units are adjustable such that one of said first and third thermal heads, which is defined as a leading thermal head, is subjected to said first pressure, the other thermal head, defined as a trailing thermal head, being subjected to said second pressure.

43. An image-forming apparatus that forms an image on an image-forming substrate as set forth in claim 19, comprising:

a roller platen member laterally provided with respect to a path along which said image-forming substrate passes;

a carriage that carries a first thermal head, a second thermal head and a third thermal head, movable along said platen member, each of said first, second and third thermal heads including plural heater elements laterally aligned with each other with respect to said path; and a resilient biasing unit that resiliently biases said carriage toward said roller platen member, said first, second and third thermal heads being arranged so as to be subjected to said first, second and third pressures, respectively, from said roller platen member, wherein each of the heater elements of said first thermal head selectively heats a first localized area of said layer of microcapsules, on which said first pressure is exerted by said first resilient biasing unit, to said first temperature in accordance with a first image information data, such that said first type of microcapsules in said layer of microcapsules are selectively squashed and a first image is produced on said layer of microcapsules, each of the heater elements of said second thermal head selectively heats a second localized area of said layer of microcapsules, on which said second pressure is exerted by said second resilient biasing unit, to said second temperature in accordance with a second image information data, such that said second type of microcapsules in said layer of microcapsules are selectively squashed and a second image is produced on said layer of microcapsules, and each of the heater elements of said third thermal head selectively heats a third localized area of said layer of microcapsules, on which said third pressure is exerted by said third resilient biasing unit, to said third temperature in accordance with a third image information data, such that said third type of microcapsules in said layer of microcapsules are selectively squashed and a third image is produced on said layer of microcapsules.

44. An image-forming apparatus that forms an image on an image-forming substrate having a base member and a layer of microcapsules on said base member, said layer of microcapsules containing at least one type of microcapsules filled with a dye, said microcapsules exhibiting a temperature/pressure characteristic so as to be squashed when being simultaneously subjected to a predetermined pressure above atmospheric pressure and a predetermined temperature above ambient temperature, resulting in a discharge of the dye from said squashed microcapsule, said apparatus comprising:

a pressure applicator that locally exerts said predetermined pressure on said layer of microcapsules; and a thermal heater that selectively heats a localized area of said layer of microcapsules, on which said predetermined pressure is exerted by said pressure applicator, to said predetermined temperature in accordance with an image-information data, such that said microcapsules in said layer of microcapsules are selectively squashed and an image is produced on said layer of microcapsules.

45. An image-forming apparatus that forms an image on an image-forming substrate having a base member and a layer of microcapsules on said base member, said layer of microcapsules containing at least one type of microcapsules filled with a dye, said microcapsules exhibiting a temperature/pressure characteristic so as to be squashed when being simultaneously subjected to a predetermined pressure above atmospheric pressure and a predetermined temperature above ambient temperature, resulting in a discharge of the dye from said squashed microcapsule, said apparatus comprising:

an array of piezoelectric elements laterally aligned with each other with respect to a path along which said image-forming substrate passes, each of said piezoelectric elements selectively generating an alternating pressure when being electrically energized by a high-frequency voltage, said alternating pressure having an effective pressure value that corresponds to said predetermined pressure;

a platen member that is in contact with said array of piezoelectric elements; and an array of heater elements provided on the respective piezoelectric elements included in said array of piezoelectric elements, each of said heater elements being selectively heatable to said predetermined temperature.

46. An image-forming apparatus that forms an image on an image-forming substrate having a base member and a layer of microcapsules on said base member, said layer of microcapsules containing at least one type of microcapsules filled with a dye, said microcapsules exhibiting a temperature/pressure characteristic so as to be squashed when being simultaneously subjected to a predetermined pressure above atmospheric pressure and a predetermined temperature above ambient temperature, resulting in a discharge of the dye from said squashed microcapsule, said apparatus comprising:

a platen member laterally provided with respect to a path along which said image-forming substrate passes;

a carriage that carries a thermal head, movable along said platen member; and a resilient biasing unit incorporated in said carriage to press said thermal head against said platen member with said predetermined pressure, wherein said thermal head selectively heats a local area of said layer of microcapsules, on which said predetermined pressure is exerted by said resilient biasing unit, to said predetermined temperature in accordance with an image information data, such that the microcapsules included in said layer of microcapsules are selectively squashed and an image is produced on said layer of microcapsules.

47. An image-forming apparatus as set forth in claim 46, wherein said thermal head includes plural heater elements aligned with each other along said path.

48. An image-forming apparatus as set forth in claim 46, wherein said thermal head includes plural heater elements laterally aligned with each other with respect to said path.

* * * * *